(12) United States Patent
Tatsumi et al.

(10) Patent No.: US 7,689,163 B2
(45) Date of Patent: *Mar. 30, 2010

(54) TRANSMISSION APPARATUS AND RECEPTION APPARATUS

(75) Inventors: Hidenori Tatsumi, Higashihiroshima (JP); Eiji Ueda, Toyota-gun (JP); Seiji Sakashita, Hirakata (JP)

(73) Assignee: Panasonic Corporation, Osaka (JP)

( * ) Notice: Subject to any disclaimer, the term of this patent is extended or adjusted under 35 U.S.C. 154(b) by 1126 days.

This patent is subject to a terminal disclaimer.

(21) Appl. No.: 11/319,058

(22) Filed: Dec. 28, 2005

(65) Prior Publication Data

US 2006/0111038 A1      May 25, 2006

Related U.S. Application Data

(62) Division of application No. 10/243,743, filed on Sep. 16, 2002, now Pat. No. 7,054,592.

(30) Foreign Application Priority Data

Sep. 18, 2001   (JP)   ............................. 2001-283298

(51) Int. Cl.
    *H04H 40/00*   (2008.01)
(52) U.S. Cl. .................................... 455/3.06; 455/3.02
(58) Field of Classification Search ................. 455/6.3, 455/6.1, 12.1; 348/8, 6, 460; 725/48
    See application file for complete search history.

(56) References Cited

U.S. PATENT DOCUMENTS

| 5,210,611 A | 5/1993 | Yee et al. |
| 5,517,254 A | 5/1996 | Monta et al. |
| 5,565,909 A | 10/1996 | Thibadeau et al. |
| 5,664,948 A | 9/1997 | Dimitriadis et al. |
| 5,790,198 A * | 8/1998 | Roop et al. .................... 725/48 |
| 5,864,753 A | 1/1999 | Morita et al. |

(Continued)

FOREIGN PATENT DOCUMENTS

EP   0 731 572   9/1996

(Continued)

OTHER PUBLICATIONS

European Office Action issued Sep. 20, 2007 in European Application No. 02 765 566.1-1522.

*Primary Examiner*—Nay A Maung
*Assistant Examiner*—Richard Chan
(74) *Attorney, Agent, or Firm*—Wenderoth, Lind & Ponack, L.L.P.

(57) ABSTRACT

Via a mobile communication network, a transmission apparatus receives position information representing a current position of a reception apparatus. Based on the received position information, the transmission apparatus generates notice data indicating that it is necessary to correct preprogrammed program information identifying a program which has been preprogrammed for viewing or preprogrammed for recording and being generated at the reception apparatus, and transmits the generated notice data to the reception apparatus. Accordingly, a transmission apparatus is provided which generates information that allows preprogramming of a broadcast program for viewing or recording to be properly performed at the reception apparatus side, or which generates a correct broadcast program table, and transmits the generated information or program table to the reception apparatus.

12 Claims, 44 Drawing Sheets

U.S. PATENT DOCUMENTS

| | | | |
|---|---|---|---|
| 5,990,928 A * | 11/1999 | Sklar et al. ................. 725/72 |
| 6,544,121 B2 | 4/2003 | DeWeese et al. |
| 6,694,139 B1 | 2/2004 | Sugaya et al. |
| 6,711,379 B1 | 3/2004 | Owa et al. |
| 6,791,472 B1 | 9/2004 | Hoffberg |
| 7,054,592 B2 * | 5/2006 | Tatsumi et al. ............ 455/3.06 |
| 7,283,491 B2 * | 10/2007 | Ichiyoshi .................. 370/321 |
| 2002/0132575 A1 | 9/2002 | Kesling et al. |
| 2002/0137496 A1 | 9/2002 | Nagaoka et al. |

FOREIGN PATENT DOCUMENTS

| | | |
|---|---|---|
| EP | 0813302 | 12/1997 |
| JP | 4-72807 | 6/1992 |
| JP | 8-242213 | 9/1996 |
| JP | 11-261975 | 9/1999 |
| JP | 11-284930 | 10/1999 |
| JP | 2000-183769 | 6/2000 |
| JP | 2001-045460 | 2/2001 |
| JP | 2001-057543 | 2/2001 |
| JP | 2001-119681 | 4/2001 |
| JP | 2001-136454 | 5/2001 |
| JP | 2001-142894 | 5/2001 |
| JP | 3237362 | 10/2001 |
| JP | 2002-183185 | 6/2002 |
| JP | 2002-290354 | 10/2002 |

* cited by examiner

F I G. 1
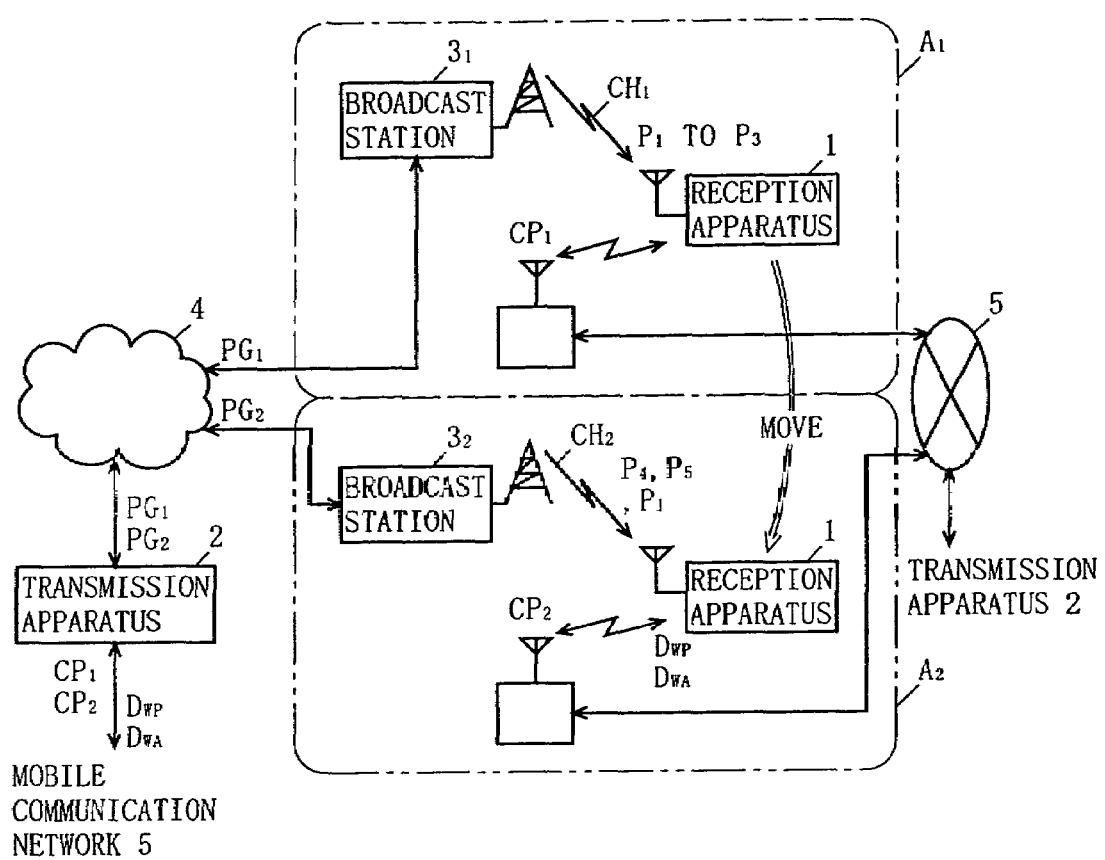

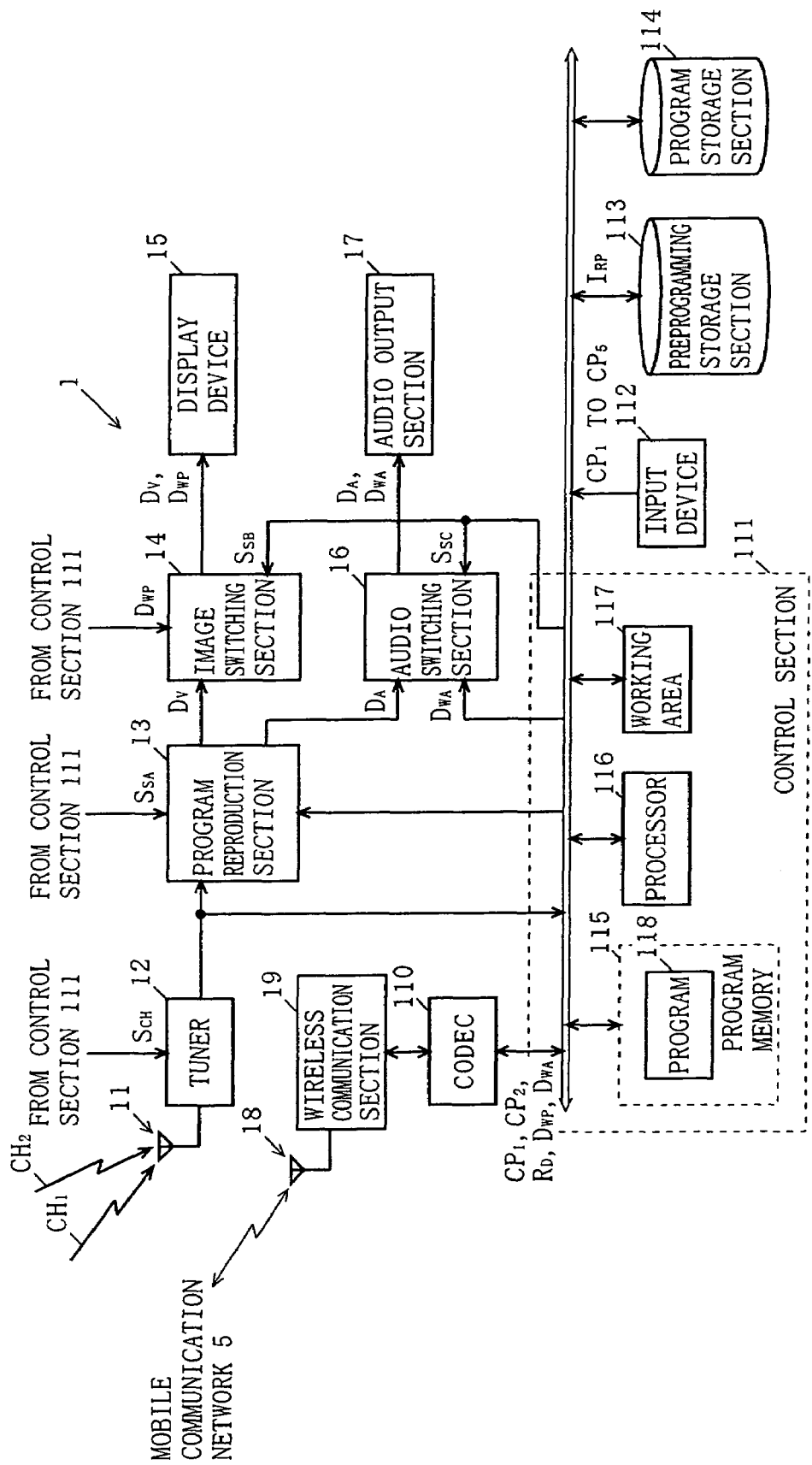
F I G. 4

F I G. 1 5
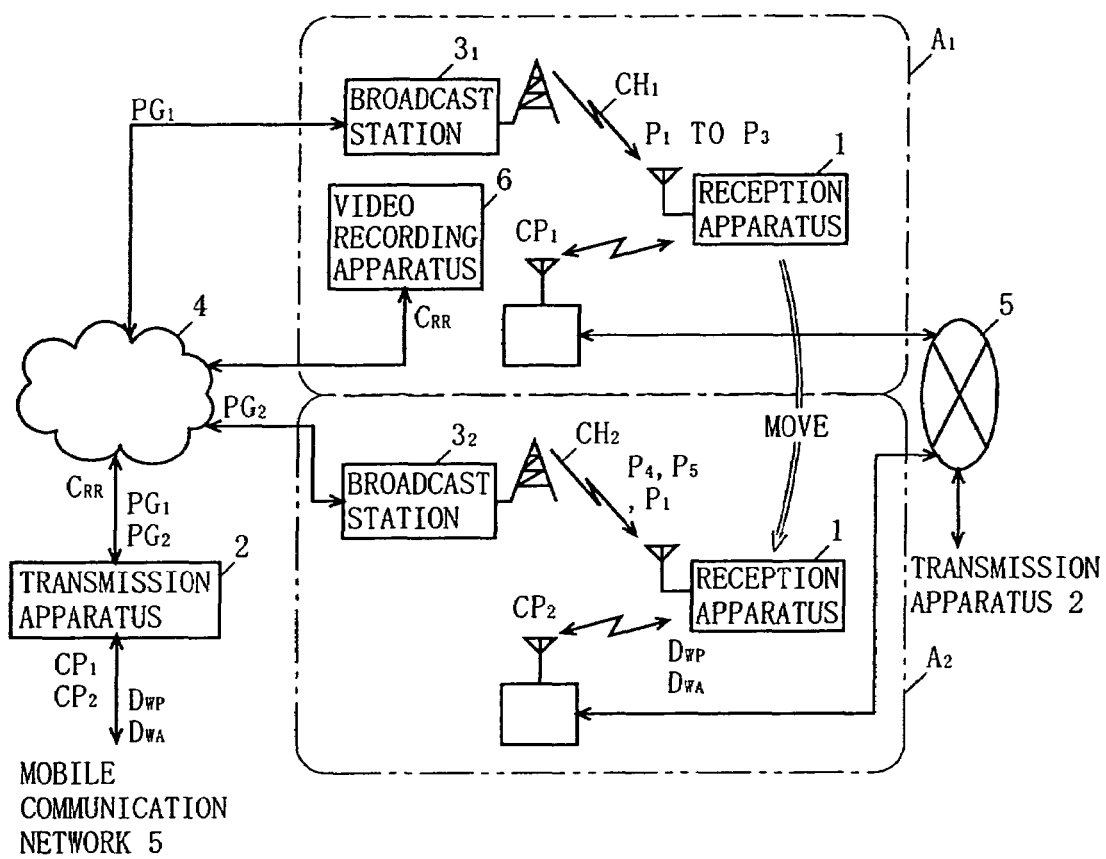

FIG. 26

| PROGRAM DB | AREA $A_1$ | | | | AREA $A_2$ | |
|---|---|---|---|---|---|---|
| | BROADCAST CHANNEL $CH_1$ | | BROADCAST CHANNEL $CH_2$ | | BROADCAST CHANNEL $CH_3$ | BROADCAST CHANNEL $CH_4$ |
| TIME $T_1$ | PROGRAM TITLE $PT_1$ | PROGRAM CODE $PC_1$ | PROGRAM TITLE $PT_4$ | PROGRAM CODE $PC_4$ | PROGRAM TITLE $PT_6$ / PROGRAM CODE $PC_6$ | PROGRAM TITLE $PT_8$ / PROGRAM CODE $PC_8$ |
| TIME $T_2$ | PROGRAM TITLE $PT_2$ | PROGRAM CODE $PC_2$ | PROGRAM TITLE $PT_5$ / PROGRAM CODE $PC_5$ | | PROGRAM TITLE $PT_7$ / PROGRAM CODE $PC_7$ | PROGRAM TITLE $PT_9$ / PROGRAM CODE $PC_9$ |
| TIME $T_3$ | PROGRAM TITLE $PT_3$ / PROGRAM CODE $PC_3$ | | | | PROGRAM TITLE $PT_1$ / PROGRAM CODE $PC_1$ | |

$R_{AR1}$, $R_{AR2}$

| TIME T | |
|---|---|
| TIME T₁ | BROADCAST CHANNEL CH₃<br>PROGRAM TITLE PT₆<br>PROGRAM CODE PC₆ |
| TIME T₂ | BROADCAST CHANNEL CH₄<br>PROGRAM TITLE PT₉<br>PROGRAM CODE PC₉ |
| TIME T₃ | |

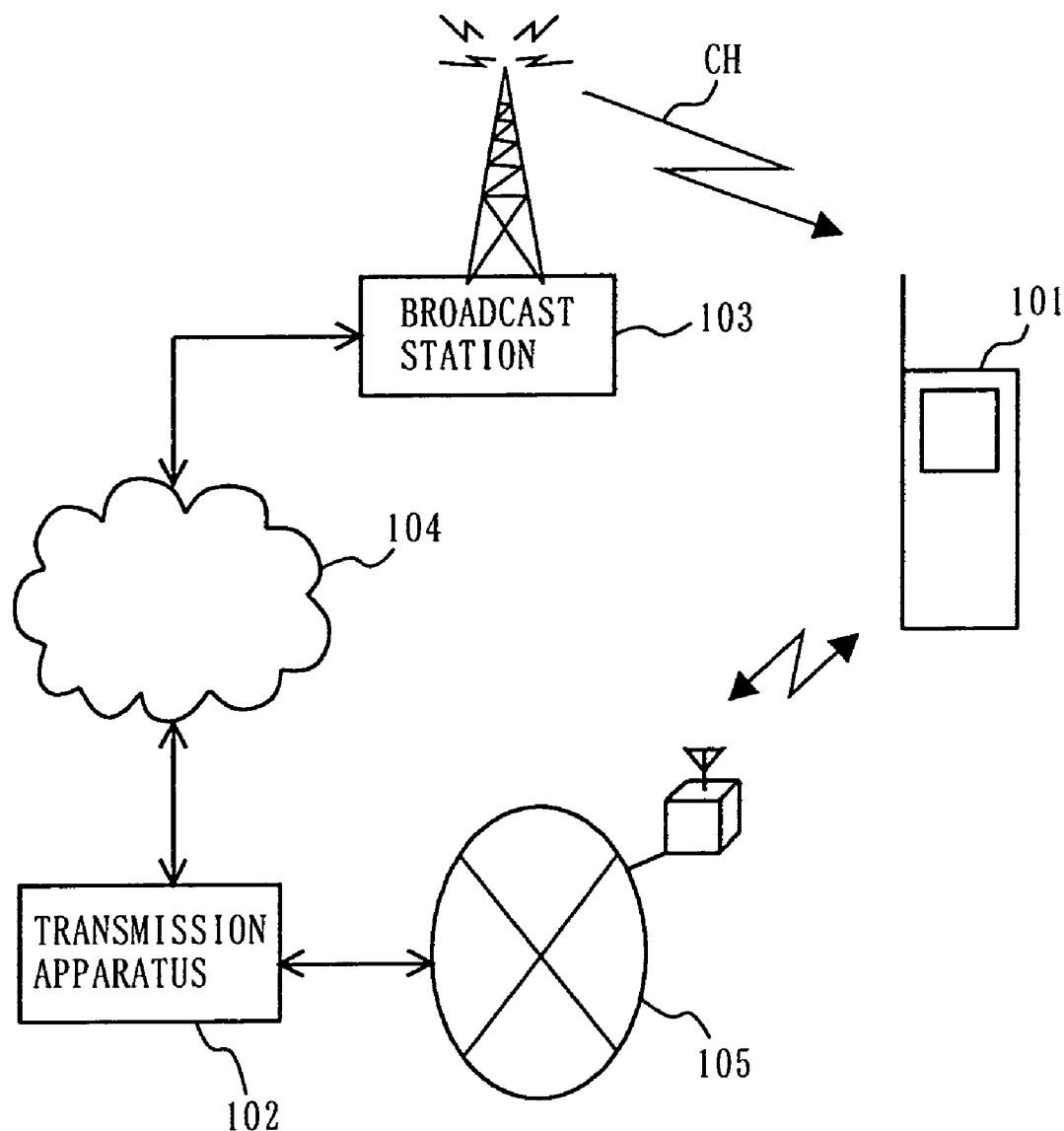
F I G. 3 1

FIG. 37

| | CH1 | CH2 | CH3 | CH4 | ... |
|---|---|---|---|---|---|
| PROGRAM DB | | | | | |
| 18:00 | NEWS | VARIETY SHOW | EVENING NEWS | KIDS' CARTOONS | |
| 18:30 | | | QUIZZES | ANIMATION | |
| 19:00 | BUSINESS NEWS | HOBBY | VARIETY SHOW | PROFESSIONAL BASEBALL | |
| 19:30 | | VOLUNTEERING | | | |
| 20:00 | FRIDAY'S DRAMA | ART THEATER | FRIDAY SPECIAL PROGRAM | | |
| 20:30 | | | | | |
| 21:00 | 9 O'CLOCK NEWS | | DRAMA 21 | FOREIGN MOVIE THEATER | |
| 21:30 | DOCUMENTARY | | | | |
| 22:00 | NEWS 10 | OVERSEAS DOCUMENTARY | NEWS STUDIO | | |
| 22:30 | | | | | |
| 23:00 | ... | ... | ... | ... | |

FIG. 42

| PERSONAL PROGRAM TABLE | UPG |
|---|---|
| | YOUR PROGRAM TABLE |
| 18:00 | CH1 NEWS |
| 18:30 | |
| 19:00 | CH3 DOCUMENTARY β |
| 19:30 | |
| 20:00 | CH2 INFORMATION |
| 20:30 | |
| 21:00 | CH4 MOVIE α |
| 21:30 | |
| 22:00 | |
| 22:30 | |
| 23:00 | |

F I G. 4 3
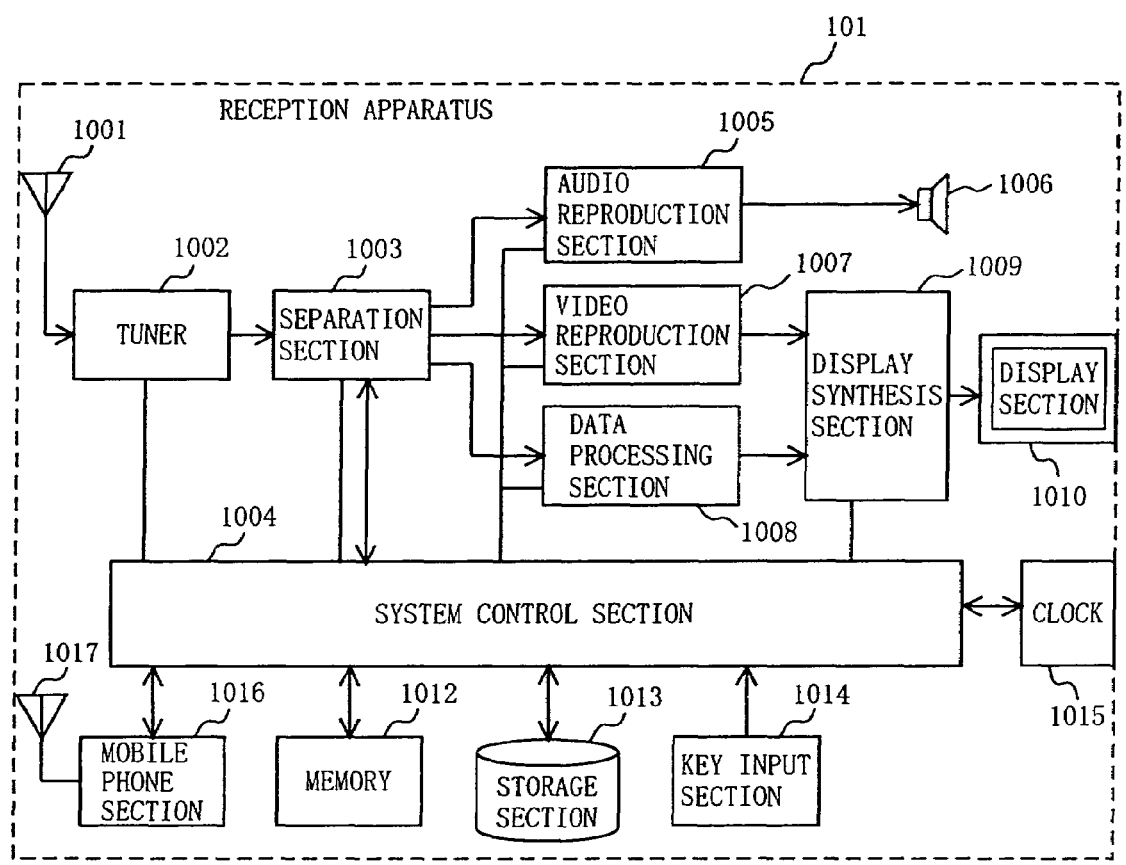

FIG. 50

(a) PROGRAM DB

| | CH1 | CH2 | CH3 | CH4 |
|---|---|---|---|---|
| 18:00 | NEWS | KIDS | NEWS | ANIMATION |
| 18:30 | | | QUIZZES | ANIMATION |
| 19:00 | NEWS | INFORMATION | DOCUMENTARY β | SPORTS |
| 19:30 | | INFORMATION | | |
| 20:00 | ☆ DRAMA | ART | VARIETY SHOW | |
| 20:30 | | | | |
| 21:00 | NEWS | MUSIC | DRAMA | MOVIE α |
| 21:30 | DOCUMENTARY | | | |
| 22:00 | NEWS | DOCUMENTARY | NEWS | |
| 22:30 | | | | |
| 23:00 | | | | |

(b) UPG — PERSONAL PROGRAM TABLE

| | YOUR PROGRAM TABLE |
|---|---|
| 18:00 | CH1 NEWS |
| 18:30 | |
| 19:00 | CH3 DOCUMENTARY |
| 19:30 | β |
| 20:00 | |
| 20:30 | |
| 21:00 | CH4 MOVIE α |
| 21:30 | |
| 22:00 | |
| 22:30 | |
| 23:00 | |

(c) PROGRAM DB

| | CH1 | CH2 | CH3 | CH4 |
|---|---|---|---|---|
| 20:00 | ☆ DRAMA γ | ART | VARIETY SHOW | |
| 20:30 | | | | |
| 21:00 | | | | |

(d) UPG — PERSONAL PROGRAM TABLE

| | YOUR PROGRAM TABLE |
|---|---|
| 18:00 | CH1 NEWS |
| 18:30 | |
| 19:00 | CH3 DOCUMENTARY |
| 19:30 | β |
| 20:00 | ☆ CH1 DRAMA γ |
| 20:30 | |
| 21:00 | CH4 MOVIE α |
| 21:30 | |
| 22:00 | |
| 22:30 | |

| PROGRAM DB | | | | |
|---|---|---|---|---|
| | CH1 | CH2 | CH3 | CH4 |
| 18:00 | NEWS | KIDS | NEWS | ANIMATION |
| 18:30 | | | QUIZZES | ANIMATION |
| 19:00 | NEWS | INFORMATION | DOCUMENTARY | SPORTS |
| 19:30 | | INFORMATION | | |
| 20:00 | ☆ DRAMA | ART | VARIETY SHOW | |
| 20:30 | | | | |
| 21:00 | NEWS | MUSIC | DRAMA | MOVIE α |
| 21:30 | DOCUMENTARY | | | |
| 22:00 | NEWS | DOCUMENTARY | NEWS | |
| 22:30 | | | | |
| 23:00 | | | | |

DESIGNATED TIME ZONE (spans 20:30 to 23:00 in (a))

(b)

| PROGRAM DB | | | | |
|---|---|---|---|---|
| | CH1 | CH2 | CH3 | CH4 |
| 18:00 | NEWS | KIDS | NEWS | ANIMATION |
| 18:30 | | | QUIZZES | ANIMATION |
| 19:00 | NEWS | INFORMATION | DOCUMENTARY | SPORTS |
| 19:30 | | INFORMATION | | |
| 20:00 | ☆ DRAMA | ART | VARIETY SHOW | |
| 20:30 | | | | |
| 21:00 | NEWS | MUSIC | DRAMA | MOVIE α |
| 21:30 | DOCUMENTARY | | | |
| 22:00 | NEWS | DOCUMENTARY | NEWS | |
| 22:30 | | | | |
| 23:00 | | | | |

F I G. 5 3
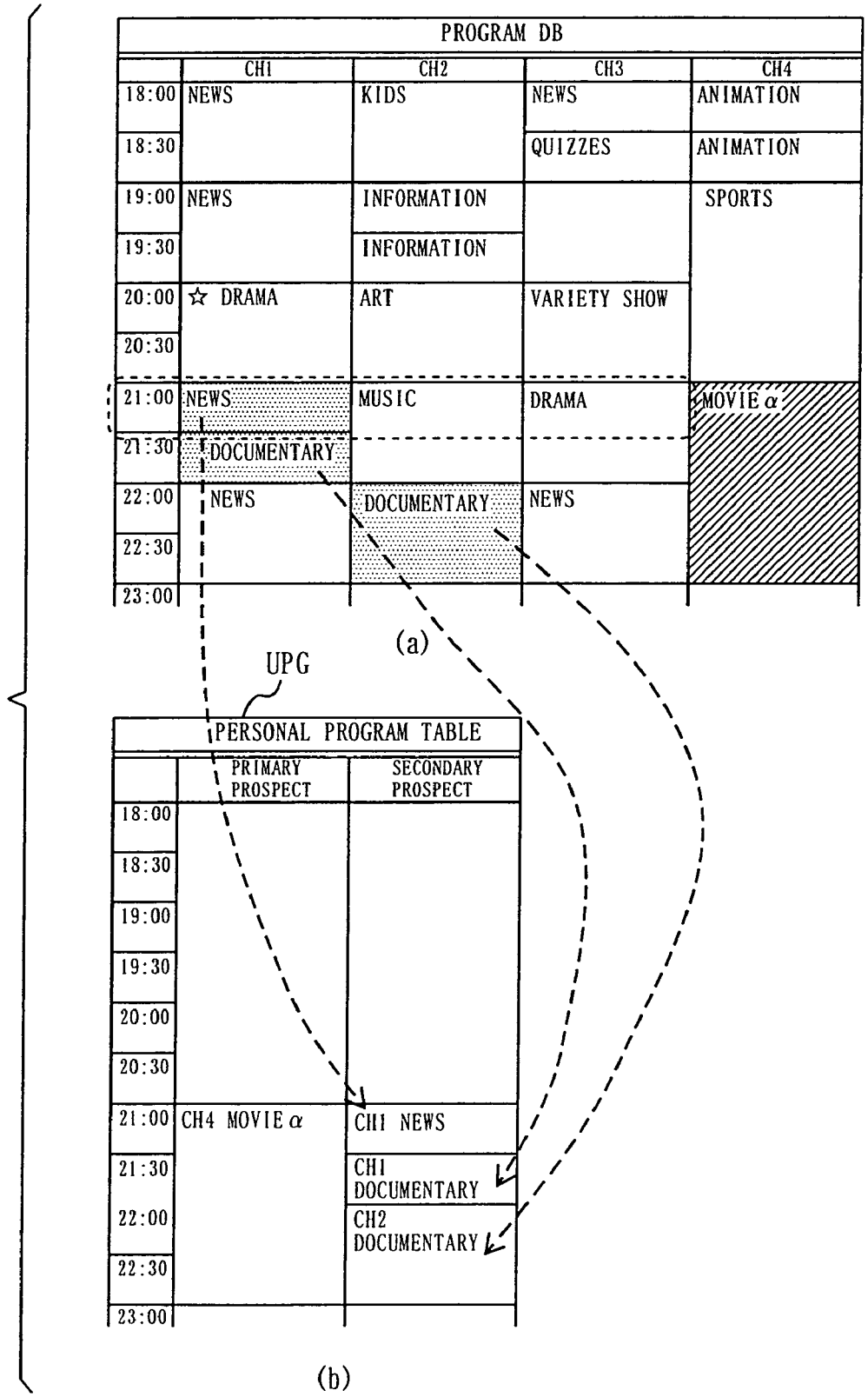

TRANSMISSION APPARATUS AND RECEPTION APPARATUS

This application is a divisional of U.S. application Ser. No. 10/243,743, filed Sep. 16, 2002 now U.S. Pat. No. 7,054,592.

BACKGROUND OF THE INVENTION

1. Field of the Invention

The present invention relates to a transmission apparatus and a reception apparatus. More particularly, the present invention relates to a transmission apparatus for generating and transmitting information or a program table which is necessary for a preprogrammed recording or preprogrammed viewing, and a reception apparatus which enables a preprogrammed recording or preprogrammed viewing of broadcast programs or which is capable of receiving program information.

2. Description of the Background Art

Conventional broadcast stations may sometimes transmit program information representing a broadcast program table (EPG (Electric Program Guide)) in order to facilitate preprogramming of a broadcast program for recording. Furthermore, various techniques have been proposed to improve the ease of using such program information. For example, a certain reception apparatus records information identifying broadcast programs which have been recorded through preprogramming in the past. By referring to such recording information, the reception apparatus calculates the frequency with which a broadcast program has been recorded through preprogramming. Furthermore, by using the calculated frequencies, the reception apparatus gives orders of precedence to the broadcast programs which are described in the program information. More specifically, higher orders of precedence are given to broadcast programs that are associated with higher frequencies. Thereafter, the reception apparatus generates and displays a broadcast program table for users, which lists broadcast programs in accordance with their orders of precedence.

In general, broadcast programs are transmitted toward a reception apparatus which is within a predetermined broadcast area. A plurality of adjoining broadcast areas may have broadcast programs of different contents being transmitted therein, even for the same time zone. Even if broadcast programs of the same content are being transmit in the same time zone in a plurality of broadcast areas, such broadcast programs may be being transmitted through different channels.

In recent years, mobile communication devices are becoming capable of receiving and reproducing broadcast programs as the aforementioned reception apparatuses, and even preprogramming of broadcast programs for viewing or recording. A mobile communication device is typically a mobile phone or a PDA (Personal Digital Assistants), and more broadly includes a notebook-type personal computer. Such a mobile communication device, when borne by a user, can be freely moved between a plurality of broadcast areas. Therefore, even if a broadcast program is preprogrammed for viewing or preprogrammed for recording, the preprogramming of a viewing or a preprogrammed recording may be valid in one broadcast area but moot in another broadcast area. More specifically, if a mobile communication device is located in a different broadcast area, it may not be possible for a user to view or record an intended broadcast program.

Moreover, even if a mobile communication device successfully generates a broadcast program table which is directed to an individual user, the generated broadcast program table may be valid in one broadcast area but may be moot in another broadcast area. More specifically, it is possible that the generated broadcast program table does not properly describe a channel, start time, and end time of a broadcast program which is provided in the other broadcast area.

As will be apparent from the above, the conventional preprogramming of a viewing or preprogramming of a recording, or the conventional generation of a broadcast program table, has a problem in that it is not suitable for mobile communication devices which can be freely moved between a plurality of broadcast areas.

SUMMARY OF THE INVENTION

Therefore, an object of the present invention is to provide a transmission apparatus which generates information, or a proper broadcast program table, that enables the proper preprogramming of a broadcast program for viewing or recording at a reception apparatus, and transmits the information or program table to the reception apparatus.

Another object of the present invention is to provide a reception apparatus which is capable of proper preprogramming of a broadcast program for viewing or recording, or displaying a proper broadcast program table, even in the case where it is possible to freely move between a plurality of broadcast areas.

In order to attain the above objects, a first aspect of the present invention is directed to a transmission apparatus which is capable of communicating with a reception apparatus which is constructed to be capable of receiving a program within a broadcast area. The transmission apparatus comprises a reception section for receiving position information indicating a current position of the reception apparatus; a generation section for, based on the position information received by the reception section, generating notice data indicating that it is necessary to correct preprogrammed program information identifying a program which has been preprogrammed for viewing or preprogrammed for recording and being generated at the reception apparatus, or for generating a personal program table which is specific to a user of the reception apparatus; and a transmission section for transmitting the notice data or the personal program table generated by the generation section to the reception apparatus.

In order to attain the other object described above, a second aspect of the present invention is directed to a reception apparatus which is constructed to be capable of receiving a broadcast program and capable of communicating with a transmission apparatus which provides information concerning the broadcast program. The reception apparatus comprises a transmission section for transmitting position information indicating a current position to the transmission apparatus. Based on the position information transmitted from the transmission section, the transmission apparatus generates notice data indicating that it is necessary to correct preprogrammed program information identifying a program which has been preprogrammed for viewing or preprogrammed for recording and being generated at the reception apparatus, or the transmission apparatus generates a personal program table which is specific to a user of the reception apparatus, and transmits the generated notice data or personal program table to the reception apparatus. The reception apparatus further comprises a reception section for receiving the notice data or personal program table transmitted from the transmission apparatus, and an output section for outputting the notice data or personal program table received by the reception section.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram illustrating an overall structure of a data communication system according to a first embodiment of the present invention.

FIG. 4 is a block diagram illustrating an overall structure of a reception apparatus 1 in FIG. 1.

FIG. 15 is a schematic diagram illustrating a command $C_{RR}$ which is transmitted from a transmission apparatus 2 in FIG. 1 to a video recording apparatus 6.

FIG. 26 is a schematic diagram illustrating an exemplary area record $R_{AR}$ which is stored in a program DB storage section 23 shown in FIG. 24.

FIG. 31 is a schematic diagram illustrating the structure of a data communication system according to a third embodiment of the present invention.

FIG. 37 is a schematic diagram illustrating an exemplary structure of a program DB stored in a transmission apparatus 102 in FIG. 36.

FIG. 42 is a schematic diagram exemplifying a personal program table UPG which is generated by a transmission apparatus 102 in FIG. 36.

FIG. 43 is a block diagram illustrating a detailed structure of a reception apparatus 101 in FIG. 31.

FIG. 50 is a schematic diagram illustrating an exemplary personal program table UPG which is generated by a process performed by a program selection section 2008 in FIG. 49.

FIG. 52 is a schematic diagram illustrating a searched extent in a program DB during a process of FIG. 51.

FIG. 53 is a schematic diagram illustrating an exemplary personal program table UPG which is generated by a process of FIG. 51.

DETAILED DESCRIPTION OF THE PREFERRED EMBODIMENTS

First Embodiment

FIG. 1 is a schematic diagram illustrating an overall structure of a data communication system according to a first embodiment of the present invention. In FIG. 1, the data communication system comprises at least one reception apparatus 1, at least one transmission apparatus 2, and two broadcast stations $3_1$ and $3_2$, which are exemplary of a plurality of broadcast stations.

First, the broadcast stations $3_1$ and $3_2$ will be described. By using a broadcast channel $CH_1$, the broadcast station $3_1$ broadcasts, toward an area $A_1$, three programs $P_1$, $P_2$, and $P_3$ having different contents (e.g., a news program, a documentary program, and a sports program), which are exemplary of a plurality of programs, and which are multiplexed typically onto a transport stream.

The broadcast channel $CH_1$ is a frequency band which is preassigned to the broadcast station $3_1$. The area $A_1$ is defined as an extent range within which the reception apparatus 1 is capable of receiving the broadcast programs $P_1$ to $P_3$ from the broadcast station $3_1$. Generally speaking, the area $A_1$ is determined by the intensity of the transmission wave from the broadcast station $3_1$.

Figure 2:
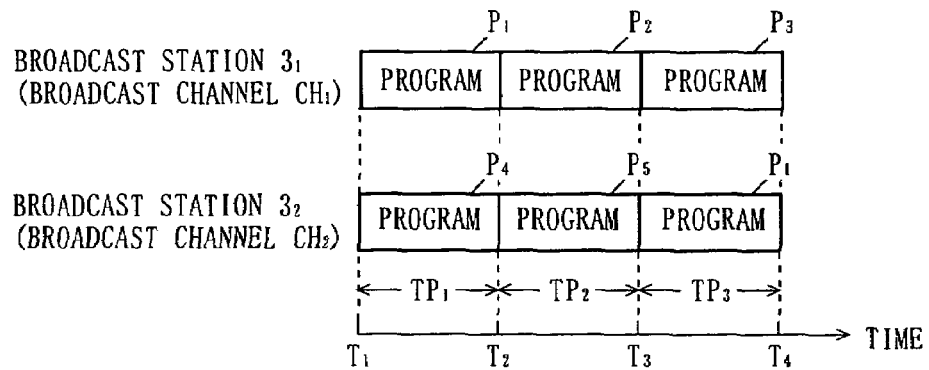
FIG. 2 is a schematic diagram illustrating time zones $TP_1$ to $TP_3$, during which a broadcast station $3_1$ in FIG. 1 transmits programs $P_1$ to $P_3$ and a broadcast station $3_2$ transmits programs $P_4$, $P_5$ and $P_1$.

As shown in FIG. 2, the programs $P_1$ to $P_3$ are broadcast in scheduled and non-overlapping time zones $TP_1$ to $TP_3$, respectively. For the sake of explanation, it is conveniently assumed that the time zones $TP_1$ to $TP_3$ are substantially contiguous along the time axis. The time zone $TP_1$ is between a time $T_1$, at which the broadcast of the program $P_1$ begins, and a time $T_2$, at which the broadcast is over. The time zone $TP_2$ is between a broadcast start time $T_2$ of the program $P_2$ and a broadcast end time $T_3$ thereof. The time zone $TP_3$ is between a broadcast start time $T_3$ of the program $P_3$ and a broadcast end time $T_4$ thereof Program codes $PC_1$ to $PC_3$ are respectively assigned to the programs $P_1$ to $P_3$ so as to allow them to be uniquely identified (see FIG. 3). As described later, the program codes $PC_1$ to $PC_3$ are used when the reception apparatus 1 handles preprogramming of a viewing or preprogramming of a recording.

Figure 3:
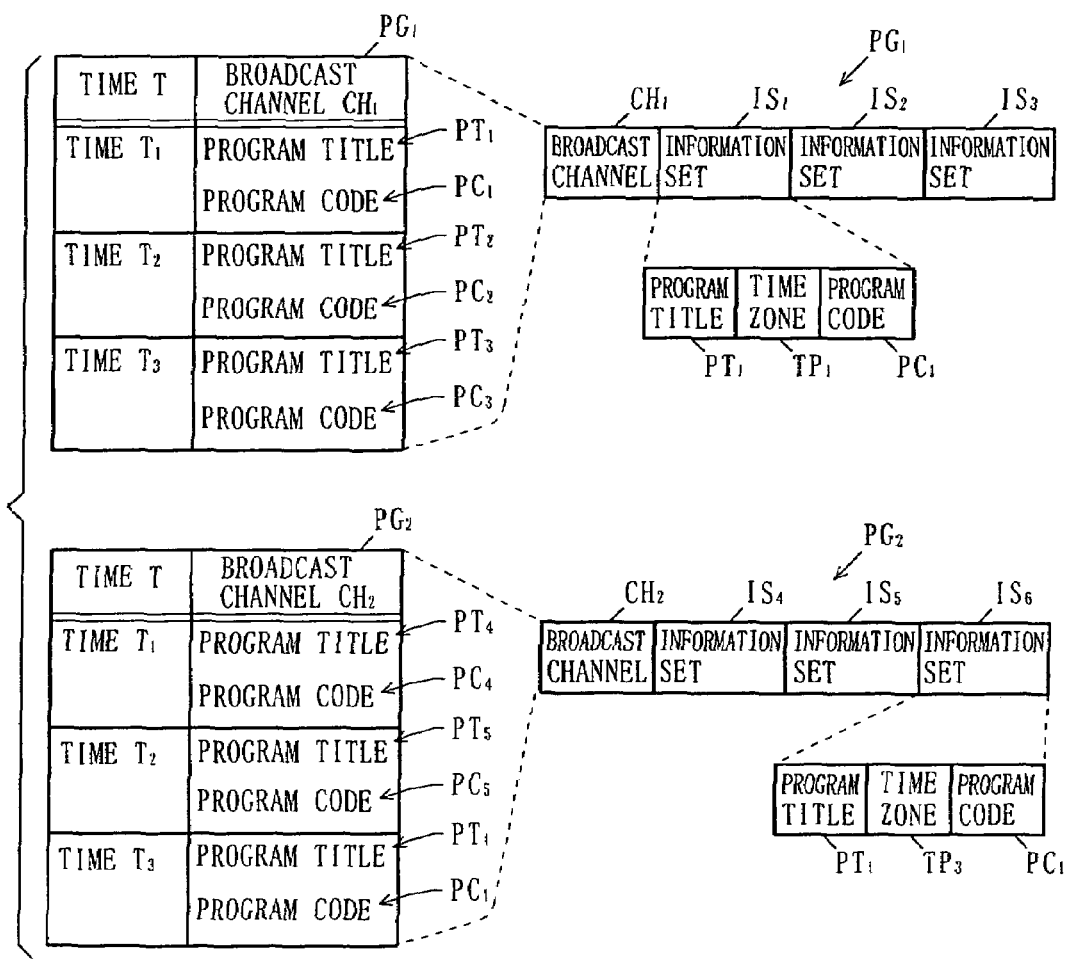
FIG. 3 is a schematic diagram illustrating program tables $PG_1$ and $PG_2$, which are generated in connection with the programs $P_1$ to $P_5$ in FIG. 2.

The broadcast station $3_1$ shown in FIG. 1 transmits a program table (time table) $PG_1$ to the transmission apparatus 2 over a communication network 4, such as the Internet. Herein, as shown in FIG. 3, the program table represents schedules, e.g., EPGs (Electric Program Guides), of the programs $P_1$ to $P_3$ which are broadcast by the broadcast station $3_1$, and the program table $PG_1$ contains the broadcast channel $CH_1$ and three information sets $IS_1$ to $IS_3$. An area code $AC_1$ uniquely identifying the area $A_1$ may be contained in the program table $PG_1$ instead of the broadcast channel $CH_1$. The information set $IS_1$ is composed of a program title $PT_1$, the time zone $TP_1$, and the program code $PC_1$ of the program $P_1$. Although omitted from FIG. 3, the information set $IS_2$ is composed of a program title $PT_2$, the time zone $TP_2$, and the program code $PC_2$ of the program $P_2$; and the information set $IS_3$ is composed of a program title $PT_3$, the time zone $TP_3$, and the program code $PC_3$ of the program $P_3$.

As shown in FIG. 1, by using a broadcast channel $CH_2$, the broadcast station $3_2$ broadcasts programs $P_4$, $P_5$ and $P_1$ having different contents, which are exemplary of a plurality of programs, toward an area $A_2$.

The broadcast channel $CH_2$, which is preassigned to the broadcast station $3_2$, is a frequency band that is different from the aforementioned broadcast channel $CH_1$. The area $A_2$, which is an extent range within which the reception apparatus 1 is capable of receiving the broadcast programs $P_4$, $P_5$ and $P_1$ from the broadcast station $3_2$, covers an extent that is different from the aforementioned area $A_1$, and substantially adjoins the area $A_1$. The area $A_2$ is generally determined by the intensity of the transmission wave from the broadcast station $3_2$.

For the sake of explanation of the first embodiment, as shown in FIG. 2, it is assumed that the programs $P_4$, $P_5$ and $P_1$ are broadcast in the scheduled and non-overlapping time zones $TP_1$, $TP_2$, and $TP_3$, respectively. The first embodiment also assumes that the broadcast programs $P_2$ and $P_3$ from the broadcast station $3_1$ are not broadcast from the broadcast station $3_2$. Note that the program $P_1$ is transmitted by the broadcast stations $3_1$ and $3_2$ in the respectively different time zones $TP_1$ and $TP_3$. For the programs $P_4$ and $P_5$, program codes $PC_4$ and $PC_5$ are assigned, which can uniquely identify them and are further used for preprogramming of a viewing or the like by the reception apparatus 1. Note that the aforementioned program code $PC_1$ is used for the broadcast program $P_1$ from the broadcast station $3_2$.

As shown in FIG. 1, the broadcast station $3_2$ transmits a program table (time table) $PG_2$ representing the schedules of the programs $P_4$, $P_5$ and $P_1$, which are broadcast by the broadcast station $3_2$ itself, to the transmission apparatus 2 via the communication network 4. Herein, the program table $PG_2$ has a data structure which is similar to that of the program table $PG_1$, and the program table $PG_2$ contains a broadcast channel $CH_2$ and information sets $IS_4$ to $IS_6$, as shown in FIG. 3. As is the case with the program table $PG_1$, an area code $AC_2$ uniquely identifying the area $A_2$ may be contained in the program table $PG_2$, instead of the broadcast channel $CH_2$. The information set $IS_6$ is composed of the program title $PT_1$, the time zone $TP_3$, and the program code $PC_1$ of the program $P_1$. Although omitted from FIG. 3, the information set $IS_4$ is composed of a program title $PT_4$, the time zone $TP_1$, and the program code $PC_4$ of the program $P_4$; and the information set $IS_5$ is composed of a program title $PT_5$, the time zone $TP_2$, and the program code $PC_5$ of the program $P_5$.

In FIG. 1, the reception apparatus 1 is a mobile communication device which can be freely moved between the plurality of areas $A_1$ and $A_2$ as carried by a user. The reception apparatus 1 is constructed so as to be capable, at the currently located area $A_1$ or $A_2$, of receiving the programs $P_1$ to $P_3$ or the programs $P_4$, $P_5$ and $P_1$, which are broadcast by the broadcast station $3_1$ or $3_2$, respectively. Furthermore, from among the programs $P_1$ to $P_5$ which can be received by the reception apparatus 1, the reception apparatus 1 reproduces or records those which have been preprogrammed for viewing or recording by the user.

In order to realize the above functions, as shown in FIG. 4, the reception apparatus 1 comprises an antenna 11, a tuner 12, a program reproduction section 13, an image switching section 14, a display device 15, an audio switching section 16, an audio output section 17, an antenna 18, a wireless communication section 19, a CODEC 110, a control section 111, an input device 112, a preprogramming storage section 113, and a program storage section 114.

The antenna 11 receives broadcast waves on the broadcast channels $CH_1$ and $CH_2$, and outputs the received waves to the tuner 12. The tuner 12 sets the broadcast channel $CH_1$ or $CH_2$ as designated by a control signal $S_{CH}$ from the control section 111. Furthermore, the tuner 12 downconverts and/or demodulates the broadcast wave from the broadcast channel $CH_1$ or $CH_2$ having been set, and reproduces a transport stream in a digital format, which is outputted to the program reproduction section 13 or the control section 111. Out of the transport stream from the tuner 12, the program reproduction section 13 reproduces video data $D_V$ and audio data $D_A$ representing one of the received programs $P_1$ to $P_5$. The program reproduction section 13 outputs the reproduced video data $D_V$ to the image switching section 14, and outputs the reproduced audio data $D_A$ to the audio switching section 16. Furthermore, a transport stream which has been read from the program storage section 114 by the control section 111 is inputted to the program reproduction section 13. From the inputted transport stream, the program reproduction section 13 reproduces video data $D_V$ and audio data $D_A$ representing one of the received programs $P_1$ to $P_5$, outputs the reproduced video data $D_V$ to the image switching section 14, and outputs the reproduced audio data $D_A$ to the audio switching section 16. The program reproduction section 13 realizes such switching of the input line in accordance with a control signal $S_{SA}$ from the control section 111.

Other than the video data $D_V$ from the program reproduction section 13, notice data $D_{WP}$ from the control section 111 may be inputted to the image switching section 14. The notice data $D_{WP}$ contains text data or image data (see FIG. 11) representing an alert message which at least indicates that it is necessary to correct preprogrammed program information $I_{RP}$. In response to a control signal $S_{SB}$ from the control section 111, the image switching section 14 selects either the program reproduction section 13 or the control section 111, and outputs the video data $D_V$ or the notice data $D_{WP}$ which is inputted from the selected section to the display device 15. The display device 15 outputs video constituting one of the received programs $P_1$ to $P_5$ in accordance with the inputted video data $D_V$, or outputs an alert message which is expressed in the form of a text or image in accordance with the inputted notice data $D_{WP}$.

Other than the audio data $D_A$ from the program reproduction section 13, notice data $D_{WA}$ from the control section 111 may be inputted to the audio switching section 16. The notice data $D_{WA}$ at least contains audio data (see FIG. 11) representing an alert message which at least indicates that it is necessary to correct the preprogrammed program information $I_{RP}$. In response to a control signal $S_{SC}$ from the control section 111, the audio switching section 16 selects either the program reproduction section 13 or the control section 111, and outputs the audio data $D_A$ or the notice data $D_{WA}$ which is inputted from the selected section to the audio output section 17. The audio output section 17 outputs audio constituting one of the received programs $P_1$ to $P_5$ in accordance with the inputted audio data $D_A$, or outputs an alert message which is expressed in an audio form in accordance with the inputted notice data $D_{WA}$.

Referring to FIG. 4, in the area $A_1$ or $A_2$ in which the reception apparatus 1 is capable of moving, the antenna 18 receives a high frequency signal from one of the base stations accommodated in the mobile communication network 5. Although various information is multiplexed and superimposed onto this high frequency signal, what is necessary for the sake of the first embodiment is the position information $CP_1$ or $CP_2$ for identifying the current position of the reception apparatus 1 and the aforementioned notice data $D_{WP}$ or $D_{WA}$. For conciseness of explanation, it is assumed that the position information $CP_1$ is sent from a base station which is accommodated in the area $A_1$, and that the position information $CP_2$ is sent from a base station in the area $A_2$. Moreover, the notice data $D_{WP}$ or $D_{WA}$ is sent from a base station in the area $A_2$. The antenna 18 outputs the high frequency signal as such to the wireless communication section 19.

The wireless communication section 19 performs processes such as downconversion and demodulation for the high frequency signal outputted from the antenna 18. As a result, the wireless communication section 19 reproduces the multiplex signal in the base band, and outputs the multiplex signal to the CODEC 110. This multiplex signal has various information multiplexed thereon. From the inputted multiplex signal, the CODEC 110 separates the position information $CP_1$ or $CP_2$ and the notice data $D_{WP}$ or $D_{WA}$ directed to the reception apparatus 1, and outputs these to the control section 111.

Figure 5:
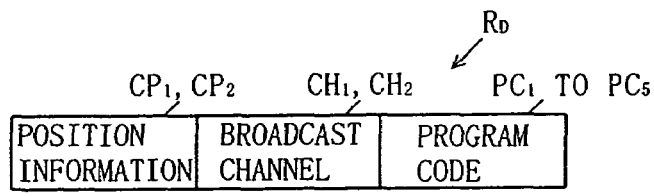
FIG. 5 is a schematic diagram illustrating a data structure of a determination request $R_D$ which is transmitted by a reception apparatus 1 in FIG. 1.

The CODEC 110 further multiplexes a determination request $R_D$ which is generated by the control section 111 onto the multiplex signal. Herein, the determination request $R_D$ is information for requesting the transmission apparatus 2 to determine whether it is necessary to correct the preprogrammed program information $I_{RP}$ due to a movement of the reception apparatus 1, and the determination request $R_D$ at least contains either the position information $CP_1$ and $CP_2$, the broadcast channel $CH_1$ or $CH_2$, and one of the program codes $PC_1$ to $PC_5$, as shown in FIG. 5. The wireless communication section 19 performs a modulation process and superimposes the multiplex signal from the CODEC 110 onto the high frequency signal, which is sent onto the mobile communication network 5 via the antenna 18.

In order to perform various processes which are necessary for a preprogrammed viewing or a preprogrammed recording, the control section 111 includes a program memory 115, a processor 116, and a working area 117. The program memory 115 stores a computer program (simply shown as "program" in FIG. 4) 118 for controlling the elements of the reception apparatus 1. The processor 116 performs the computer program 118 as such. The detailed processes which are performed by the processor 116 will be specifically described later with reference to a flowchart of FIG. 6. The working area 117 is used by the processor 116 during the execution of the computer program 118.

The input device 112 is operated by the user. By operating the input device 112, the user inputs information which is necessary for a preprogrammed viewing or preprogrammed recording. For example, in the case where the user performs a preprogrammed viewing or preprogrammed recording in the area $A_1$, the program table $PG_1$ is employed. More specifically, the user operates the input device 112 to designate one of the program codes $PC_1$ to $PC_3$ described in the program table $PG_1$ which the user desires to preprogram for viewing or recording. As a result, the input device 112 outputs the designated one of the program codes $PC_1$ to $PC_3$ to the control section 111. In the case where the user performs a preprogrammed viewing or preprogrammed recording in the area $A_2$, the user designates program code $PC_4$, $PC_5$ or $PC_1$ described in the program table $PG_2$.

The preprogramming storage section 113 stores preprogrammed program information $I_{RP}$ for identifying those of the programs $P_1$ to $P_5$ which have been chosen by the user for preprogramming of a viewing or preprogrammed recording.

Figure 7:
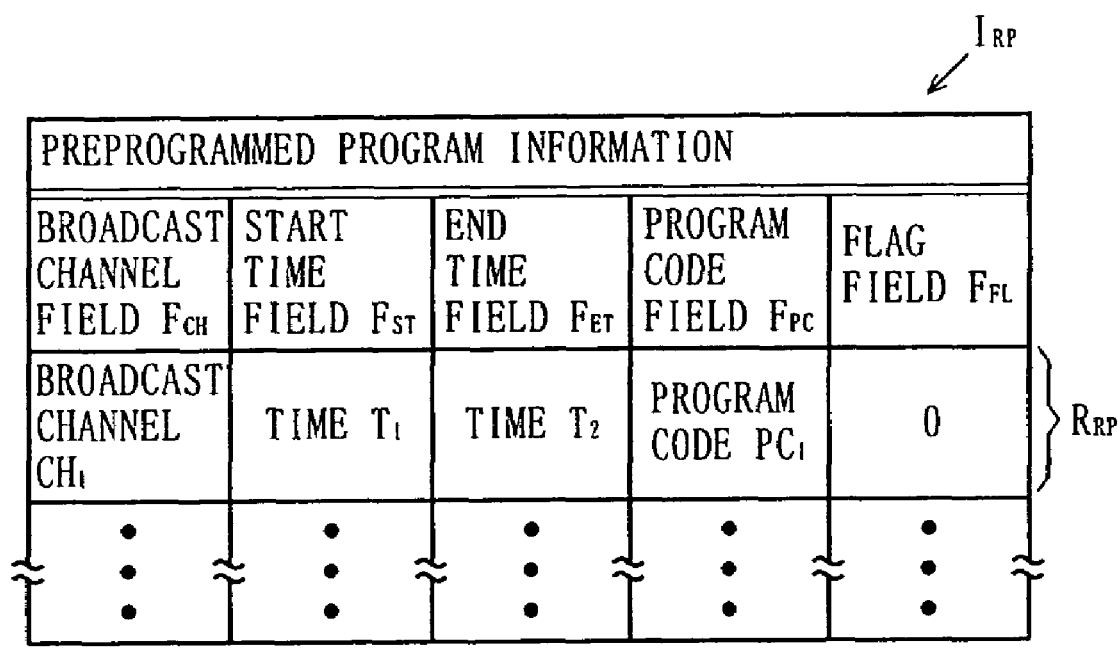
FIG. 7 is a schematic diagram illustrating preprogrammed program information $I_{RP}$ which is stored in a preprogramming storage section 113 in FIG. 4.

As shown in FIG. 7, the preprogrammed program information $I_{RP}$ contains a number of preprogrammed program records $R_{RP}$. One preprogrammed program record $R_{RP}$ is generated for each preprogramming of a viewing or preprogrammed recording. Each preprogrammed program record $R_{RP}$ is composed of at least a broadcast channel field $F_{CH}$, a start time field $F_{ST}$, an end time field $F_{ET}$, a program code field $F_{PC}$, and a flag field $F_{FL}$. The channel $CH_1$ or $CH_2$, on which one of the programs $P_1$ to $P_5$ which is preprogrammed for viewing or preprogrammed for recording is broadcast, is described in the broadcast channel field $F_{CH}$. A broadcast start time and a broadcast end time of one of the programs $P_1$ to $P_5$ which is preprogrammed for viewing or preprogrammed for recording are described in the start time field $F_{ST}$ and the end time field $F_{ET}$. The program code $PC_1$ to $PC_5$ of the relevant program $P_1$ to $P_5$ is described in the program code field $F_{PC}$. A flag indicating whether the relevant one of the programs $P_1$ to $P_5$ is preprogrammed for viewing or preprogrammed for recording is described in the flag field $F_{FL}$. In the first embodiment, "0" or "1" is described in the flag field $F_{FL}$, where "0" means preprogramming of a viewing and 1 means preprogramming of a recording. Although described in more detail later, the preprogrammed program record $R_{RP}$ is generated by the control section 111 and stored in the preprogramming storage section 113. FIG. 7 exemplifies the preprogrammed program information $I_{RP}$ in the case where the program $P_1$, which is broadcast in the area $A_1$, is preprogrammed for viewing. In this preprogrammed program information $I_{RP}$, the broadcast channel $CH_1$ is described in the broadcast channel field $F_{CH}$; the time $T_1$ is described in the broadcast start time field $F_{ST}$; the time $T_2$ is described in the broadcast end time field $F_{ET}$; the program code $PC_1$ is described in the program code field $F_{PC}$; and "0" is described in the flag field $F_{FL}$.

The program storage section 114 stores a transport stream constituting those of the programs $P_1$ to $P_5$ which have been recorded through preprogramming.

In FIG. 1, the transmission apparatus 2 receives the program table $PG_1$ from the broadcast station $3_1$ and the program table $PG_2$ from the broadcast station $3_2$ via the communication network 4, and stores them. Furthermore, in response to the determination request $R_D$ from the reception apparatus 1, the transmission apparatus 2 performs a determination process which is unique to the first embodiment. More specifically, the transmission apparatus 2 determines whether or not it is necessary to correct the preprogrammed program information $I_{RP}$ which is currently stored in the reception apparatus 1. To this end, the transmission apparatus 2 determines whether or not the program code(s) $PC_1$ to $PC_5$ in the received determination request $R_D$ is/are described in the program table $PG_2$ from the broadcast station $3_2$, which covers the area $A_2$. If the program code(s) is/are described in the program table $PG_2$, the transmission apparatus 2 generates either the aforementioned notice data $D_{WP}$ or the notice data $D_{WA}$ indicating whether or not the preprogrammed program information $I_{RP}$ needs to be corrected, and returns this to the reception apparatus 1. Otherwise, either the notice data $D_{WP}$ or the notice data $D_{WA}$ indicating that the correction thereof is unnecessary is generated and transmitted to the reception apparatus 1.

Figure 8:
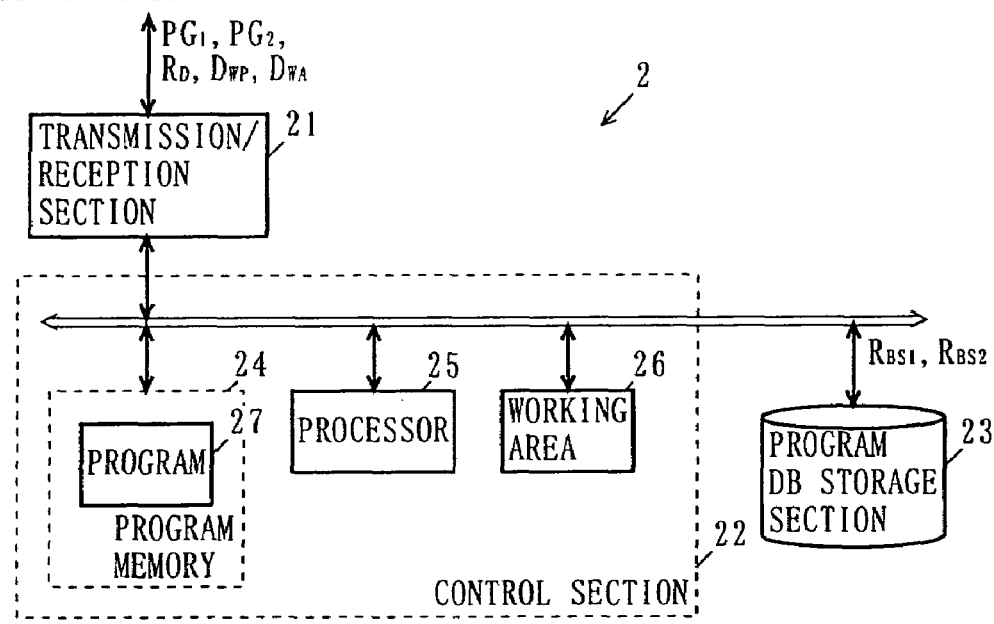
FIG. 8 is a block diagram illustrating an overall structure of a transmission apparatus 2 in FIG. 1.

In order to realize such a function, as shown in FIG. 8, the transmission apparatus 2 comprises a transmission/reception section 21, a control section 22, and a program DB storage section 23.

The transmission/reception section 21 is constructed so as to be capable of receiving data from both the communication network 4 and the mobile communication network 5, and transmitting data to both the communication network 4 and the mobile communication network 5. More specifically, via the communication network 4, the transmission/reception section 21 receives the program table $PG_1$ transmitted from the broadcast station $3_1$ and the program table $PG_2$ transmitted from the broadcast station $3_2$, and transfers them to the control section 22. Moreover, the transmission/reception section 21 receives the determination request $R_D$ transmitted via the mobile communication network 5, and transfers the received determination request $R_D$ to the control section 22. Furthermore, the transmission/reception section 21 sends either one of the notice data $D_{WP}$ and the notice data $D_{WA}$ generated by the control section 22 onto the mobile communication network 5.

In order to perform various processes which are necessary for the aforementioned determination, the control section 22 includes a program memory 24, a processor 25, and a working area 26. The program memory 24 stores a computer program 27 which describes a procedure of each process in the transmission apparatus 2. The processor 25 executes the computer program 27 as such. The characteristic process which is performed by the processor 25 will be described in detail later with reference to a flowchart of FIG. 10. The working area 26 is used by the processor 25 during the execution of the computer program 27.

Figure 9:
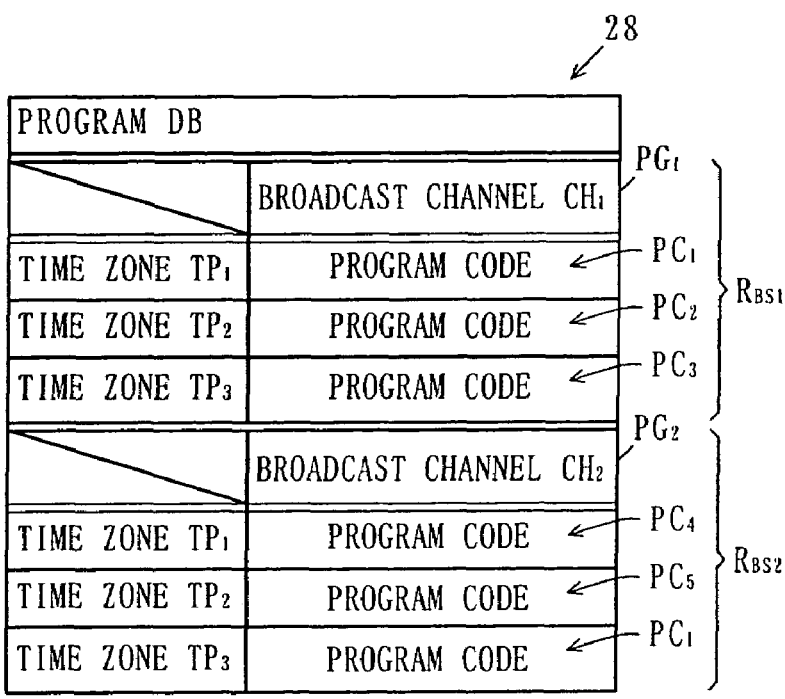
FIG. 9 is a schematic diagram illustrating a structure of a program DB 28 which is stored in a program DB storage section 23 in FIG. 8.

The program DB storage section 23 stores a program database (hereinafter program DB (Data Base)) 28 (see FIG. 9) which is generated by the control section 22. The program DB 28 is generated from the program table $PG_1$ from the broadcast station $3_1$ and the program table $PG_2$ from the broadcast station $3_2$ (see FIG. 3). As shown in FIG. 9, the program DB 28 is composed of broadcast station records $R_{BS1}$ and $R_{BS2}$, which are exemplary of a number of broadcast station records $R_{BS}$ corresponding to the number of broadcast stations. The broadcast station record $R_{BS1}$ is composed of the broadcast channel $CH_1$, a set including the time zone $TP_1$ and the program code $PC_1$, a set including the time zone $TP_2$ and the program code $PC_2$, and a set including the time zone $TP_3$ and the program code $PC_3$. The broadcast station record $R_{BS2}$ is composed of the broadcast channel $CH_2$, a set including the time zone $TP_1$ and the program code $PC_4$, a set including the time zone $TP_2$ and the program code $PC_5$, and a set including the time zone $TP_3$ and the program code $PC_1$. Since the respective information which the program DB 28 is composed of is as described above, the descriptions thereof are omitted. The titles $PT_1$ to $PT_5$ which are set in the program table $PG_1$ or $PG_2$ are not particularly necessary for the processes performed by the transmission apparatus 2, and therefore are removed from the program DB 28. However, in the case where the transmission apparatus 2 distributes the program tables $PG_1$ and $PG_2$, the program DB 28 may be composed of a combination of the program tables $PG_1$ and $PG_2$. Moreover, the broadcast channels $CH_1$ and $CH_2$ may be area codes $AC_1$ and $AC_2$, as described above.

Next, the operation of the data communication system having the above structure will be described. First, in the transmission apparatus 2, at the latest by the time $T_1$, the transmission/reception section 21 receives the program table $PG_1$ from the broadcast station $3_1$ and the program table $PG_2$ from the broadcast station $3_2$, via the communication network 4, and stores them in the working area 26. By removing the titles $PT_1$, to $PT_3$ from the program table $PG_1$ in the working area 26, the processor 25 generates the broadcast station record $R_{BS1}$. Furthermore, by removing the titles $PT_4$, $PT_5$, and $PT_1$ from the program table $PG_2$ in the working area 26, the processor 25 generates the broadcast station record $R_{BS2}$. The processor 25 stores the broadcast station records $R_{BS1}$ and $R_{BS2}$, which have been generated on the working area 26, into the program DB storage section 23 as the program DB 28.

The user of the reception apparatus 1 is currently moving within the area $A_1$ (see FIG. 1). Furthermore, the user operates the input device 112 in order to designate preprogramming of a viewing, and by referring to the program table $PG_1$, further designates the program code $PC_1$ of the program $P_1$ to be transmitted from the broadcast station $3_1$. In response to such designations, the processor 116 generates a preprogrammed program record $R_{RP}$ as exemplified in FIG. 7, and stores the preprogrammed program record $R_{RP}$ in the preprogramming storage section 113. Since the method for acquiring the program table $PG_1$ and the method of preprogramming of a viewing are well-known, the descriptions thereof are omitted. After the above preprogramming of a viewing has been completed, the user moves to the area $A_2$ while carrying the reception apparatus 1.

The processor 116 executes the computer program 118 in the program memory 115 with at least one preprogrammed program record $R_{RP}$ being stored. The processor 116 regularly monitors the broadcast start time field $F_{ST}$ of each preprogrammed program record $R_{RP}$, and begins the process shown in the flowchart of FIG. 6 when the current time is a predetermined time (e.g., 5 minutes) before a given broadcast start time. It is assumed here that the current time is a predetermined time before the time $T_1$.

First, the processor 116 selects the relevant preprogrammed program record $R_{RP}$ from within the preprogrammed program information $I_{RP}$ (step S11). Herein, the relevant preprogrammed program record $R_{RP}$ is defined as that which satisfies the condition: (broadcast start time−predetermined time)=current time. Thereafter, the processor 116 extracts the broadcast channel $CH_1$ or $CH_2$ which is described in the broadcast channel field $F_{CH}$ of the relevant preprogrammed program record $R_{RP}$, and the program code PC (one of the program codes $PC_1$ to $PC_5$) described in the program code field $F_{PC}$ thereof, onto the working area 117 (step S12). Under the above assumptions, the preprogrammed program record $R_{RP}$ exemplified in FIG. 7 is selected at step S11, and the broadcast channel $CH_1$ and the program code $PC_1$ are acquired at step S12.

As described above, in the mobile communication network 5, a base station installed in the area $A_1$ regularly sends out the position information $CP_1$; similarly, a base station in the area $A_2$ sends out the position information $CP_2$. In the reception apparatus 1, a multiplex signal is inputted to the CODEC 110 from the mobile communication network 5, via the antenna 18 and the wireless communication section 19. The CODEC 110 separates the position information $CP_1$ or $CP_2$ from the inputted multiplex signal, and stores the position information $CP_1$ or $CP_2$ in the working area 117. Thus, the processor 116 acquires the position information $CP_1$ or $CP_2$ for identifying the area $A_1$ or $A_2$ in which the reception apparatus 1 is currently located (step S13). Under the above assumptions, the position information $CP_2$ is acquired at step S13.

Next, the processor 116 generates, on the working area 117, a determination request $R_D$ (see FIG. 5) which contains the position information $CP_1$ or $CP_2$, the broadcast channel $CH_1$ or $CH_2$, and one of the program codes $PC_1$ to $PC_5$ stored in the working area 117. Thereafter, via the CODEC 110 and the wireless communication section 19, the processor 116 sends the generated determination request $R_D$ from the antenna 18 onto the mobile communication network 5, so as to be transmitted to the transmission apparatus 2 (step S14). Under the above assumptions, a determination request $R_D$ containing the position information $CP_2$, the broadcast channel $CH_1$, and the program code $PC_1$ is generated and sent onto the mobile communication network 5 at step S14. Once step S14 is completed, the processor 116 waits to receive the notice data $D_{WP}$ or $D_{WA}$ from the transmission apparatus 2 (step S15).

In the transmission apparatus 2, the transmission/reception section 21 receives the determination request $R_D$ from the mobile communication network 5, and thereafter stores the received determination request $R_D$ into the working area 26. The processor 24, which is executing the computer program 27 in the program memory 24, begins a process shown by the flowchart of FIG. 10 once the determination request $R_D$ is stored in the working area 26.

First, the processor 25 extracts the position information $CP_1$ or $CP_2$, the broadcast channel $CH_1$ or $CH_2$, and one of the program codes $PC_1$ to $PC_5$ from the determination request $R_D$ in the working area 26 (step S21). Under the above assumptions, the determination request $R_D$ contains the position information $CP_2$, the broadcast channel $CH_1$, and the program code $PC_1$; therefore, these are extracted at step S21.

Next, the processor 25 determines whether or not an area (hereinafter referred to as the generated area) A in which the reception apparatus 1 was located when the relevant preprogrammed program record $R_{RP}$ was generated coincides with the currently located area (current area) A (step S22). Accordingly, the processor 25 first determines the area $A_1$ or $A_2$ in which the reception apparatus 1 was located when the relevant preprogrammed program record $R_{RP}$ was generated, based on the broadcast channel $CH_1$ or $CH_2$ acquired at step S21. Now, it is known that the broadcast channel $CH_1$ covers the area $A_1$, and that the broadcast channel $CH_2$ covers the area $A_2$. Therefore, based on the broadcast channel $CH_1$ or $CH_2$ in the relevant preprogrammed program record $R_{RP}$, the processor 25 can easily determine whether the generated area A is the area $A_1$ or the area $A_2$. Furthermore, since the extents covered by the areas $A_1$ and $A_2$ are also known, it is possible to easily determine whether the current area A is area $A_1$ or the area $A_2$ based on the position information $CP_1$ or $CP_2$ acquired at step S21.

Figure 10:
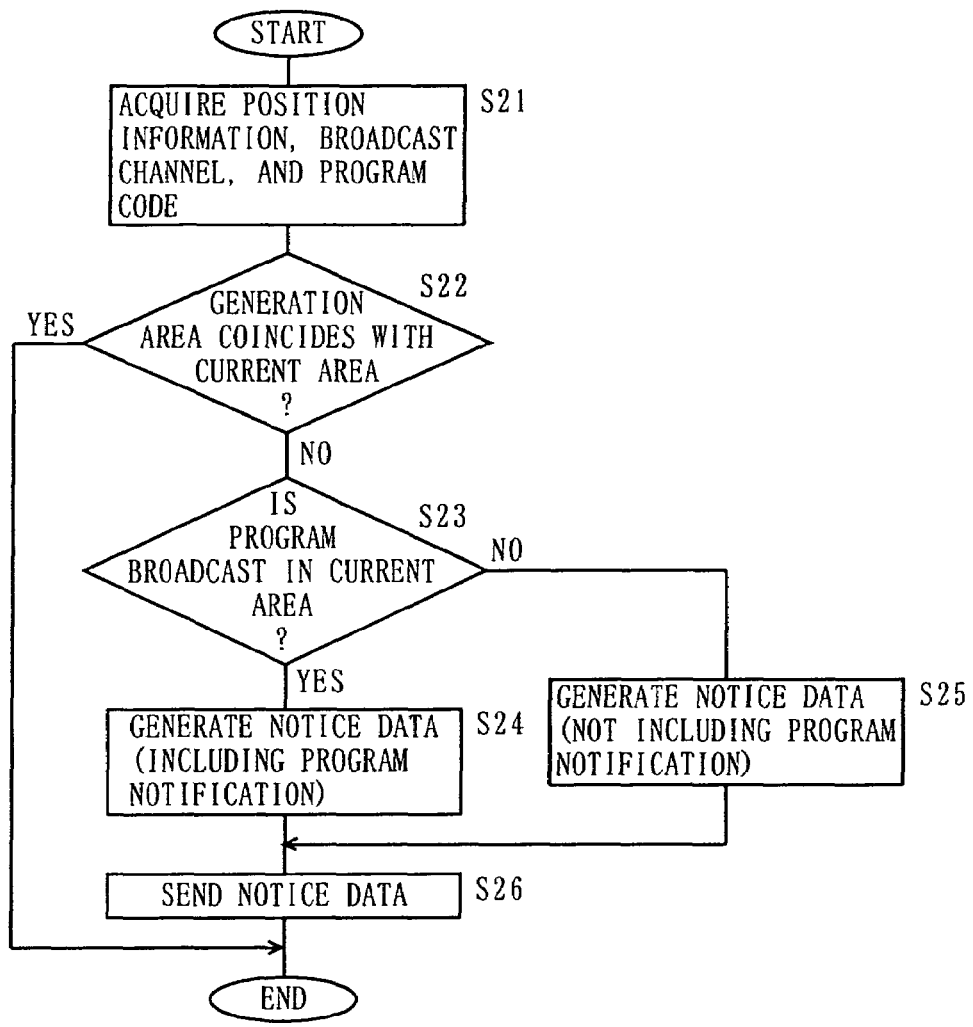
FIG. 10 is a flowchart illustrating a processing procedure which is performed by a processor 25 in FIG. 8.

If step S22 finds that both areas A coincide, the process of FIG. 10 is completed because the reception apparatus 1 can use the relevant preprogrammed program record $R_{RP}$ as it currently is, without anything particular being performed for the reception apparatus 1.

Under the above assumptions, the generated area A is the area $A_1$, and the current area A is the area $A_2$. Therefore, step S22 determines that both areas A do not coincide. In this case, the processor 25 determines whether or not a program P (i.e., one of the programs $P_1$ to $P_5$) which is identified by the relevant preprogrammed program record $R_{RP}$ is to be broadcast in the current area A after the current time (step S23). More specifically, the processor 25 accesses the program DB storage section 23 to determine whether or not a set including one of the program codes $PC_1$ to $PC_5$ acquired at step S21 and any of the time zones $TP_1$ to $TP_3$ that falls after the current time exists in the broadcast station record $R_{BS1}$ or $R_{BS2}$ of the broadcast station $3_1$ or $3_2$ in the current area A. If such a set can be found, the processor 25 will know that the program P which is preprogrammed for viewing is to be broadcast in the current area A after the current time.

Under the above assumptions, the broadcast station record $R_{BS2}$ is found at step S23. Since the time zone $TP_3$, which comes after the current time and the program code $PC_1$ acquired at step S21 are described therein, the processor 25 determines the case to be YES. Upon this determination, the processor 25 generates the notice data $D_{WP}$ and/or the notice data $D_{WA}$ on the working area 26 (step S24). As is shown in the upper portion of FIG. 11, the notice data $D_{WA}$ which is generated at this step contains not only the aforementioned alert message but also text data or image data representing a program notification indicating that the same program is to be broadcast in the current area A. The notice data $D_{WA}$ generated at this step contains not only the aforementioned alert message but also audio data representing the aforementioned program notification.

Figure 11:
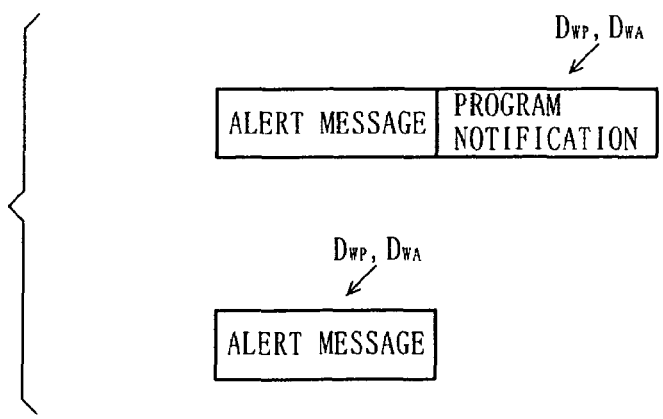
FIG. 11 is a schematic diagram illustrating a data structure of notice data $D_{WP}$ or $D_{WA}$ which is generated during the process of FIG. 10.

If the determination at step S23 is NO, then the same program P is not to be broadcast in the current area A, so that the processor 25, as shown in the lower portion of FIG. 11, generates notice data $D_{WP}$ and/or notice data $D_{WA}$ only containing the aforementioned alert message on the working area 26 (step S25).

After step S24 or S25 is completed as described above, the processor 25 sends the generated notice data $D_{WP}$ and/or notice data $D_{WA}$ onto the mobile communication network 5 via the transmission/reception section 21 (step S26). Once step S26 is completed, the process of FIG. 10 is completed.

Figure 6:
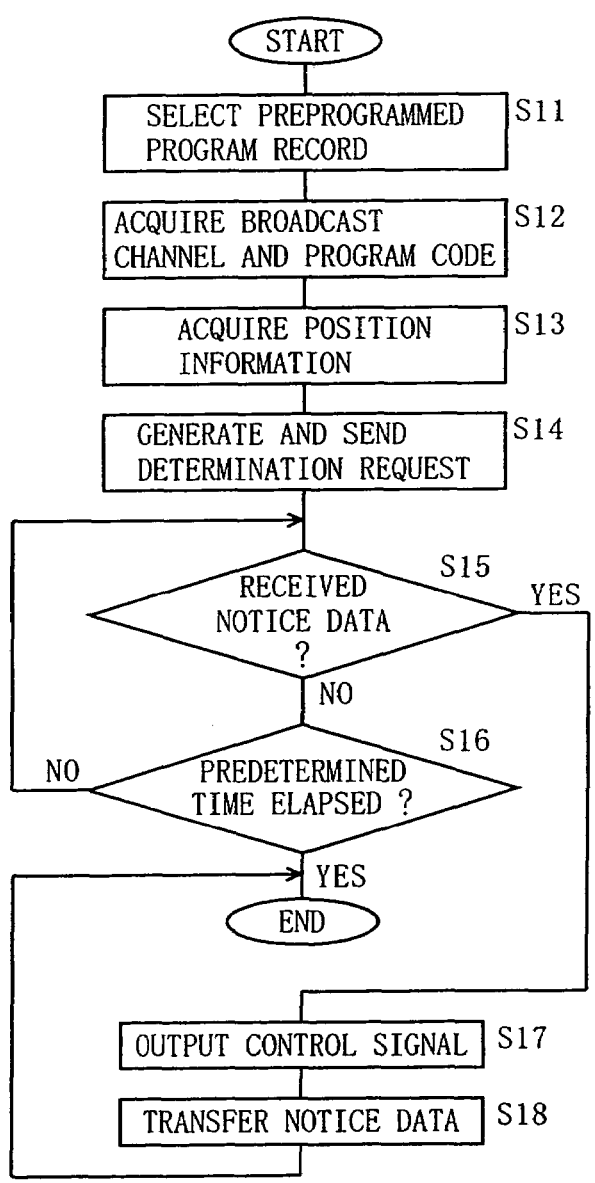
FIG. 6 is a flowchart illustrating a processing procedure which is performed by a processor 116 in FIG. 4.

As described above, the processor 116 of the reception apparatus 1 is waiting to receive the notice data $D_{WP}$ and/or $D_{WA}$ at step S15, and upon determining that this has not been received, determines whether or not a predetermined time has elapsed since the sending of the determination request $R_D$ (step S16). If the predetermined time has elapsed, the processor 116 regards the relevant preprogrammed program record $R_{RP}$ as valid, and the process of FIG. 6 is completed. On the other hand, if the predetermined time has not elapsed, the processor 116 again performs step S15.

The notice data $D_{WP}$ and/or notice data $D_{WA}$ which was sent at step S26 is received by the antenna 18 of the reception apparatus 1 via the mobile communication network 5, and is thereafter stored in the working area 117 via the wireless communication section 19 and the CODEC 110. Based on this storage, the processor 116 determines that the notice data $D_{WP}$ and/or notice data $D_{WA}$ has been received at step S15, generates a control signal $S_{SB}$ and/or $S_{SC}$, and outputs the generated control signal $S_{SB}$ and/or $S_{SC}$ to the image switching section 14 and/or the audio switching section 16 (step S17). The control signal $S_{SB}$ is a signal for instructing the input line of the image switching section 14 to be switched to the side of the control section 111, and the control signal $S_{SC}$ is a signal for instructing the input line of the audio switching section 16 to be switched to the side of the control section 111. In accordance with the control signal $S_{SB}$ and/or the control signal $S_{SC}$ as such, the image switching section 14 and/or the audio switching section 16 respectively switch their input lines to the side of the control section 111.

Next, in step S17, the processor 116 transfers the notice data $D_{WP}$ and/or notice data $D_{WA}$ on the working area 117 to the image switching section 14 and/or the audio switching section 16 (step S18). As a result, the notice data $D_{WP}$ and/or notice data $D_{WA}$ is inputted to the display device 15 and/or the audio output section 17 via the image switching section 14 and/or the audio switching section 16. The display device 15 displays the alert message represented by the received notice data $D_{WA}$ in the form of a text or image. If the received notice data $D_{WA}$ contains a program notification, the display device 15 also displays the program notification. The audio output section 17 outputs the alert message represented by the received notice data $D_{WA}$ in an audio form. If a program notification is contained in the received notice data $D_{WA}$, the audio output section 17 also outputs the program notification in an audio form.

As described above, according to the first embodiment, the reception apparatus 1 is capable of allowing a user to recognize, by using the notice data $D_{WP}$ and/or $D_{WA}$ from the transmission apparatus 2, that it is necessary to correct the preprogramming information record $R_{RP}$ generated in the area $A_1$ due to a movement from the area $A_1$ to the area $A_2$. By using the program table $PG_2$ which can be acquired in the area $A_2$, the user is able to erase, newly generate, or correct the relevant preprogramming information record $R_{RP}$. Since the transmission apparatus 2 adds a program notification in the notice data $D_{WA}$ and/or $D_{WA}$, the user can recognize that a program P which has been preprogrammed for viewing in the area $A_1$ is to be broadcast in the area $A_2$, so that the user can newly generate or correct the preprogramming information record $R_{RP}$ even more easily.

In the above description, the timing for sending the determination request $R_D$ essentially falls a predetermined time before the broadcast start time of the program P which is preprogrammed for viewing. This can contribute to the reduction of the frequency of sending the determination requests $R_D$. In other words, the traffic on the mobile communication network 5 can be reduced. However, the present invention is not limited thereto. The timing for sending the determination request $R_D$ may come immediately after the reception apparatus 1 has moved from the generated area A to the current area A. In this case, although the frequency of sending the determination requests $R_D$ becomes relatively high, the user can promptly recognize the necessity to erase, newly add, or correct the preprogramming information record $R_{RP}$.

After moving from the generated area A to the current area A, the user may go back to the generated area A. Therefore, it is preferable that the processor 116 preprogramming storage section 113 saves the preprogrammed program record $R_{RP}$ which is selected at step S11 of FIG. 6 in a predetermined memory area, rather than erasing it. As a result, when the user returns to the original area A, without requiring the user to operate the input device 112, the processor 116 can reproduce the preprogrammed program P by using the saved preprogrammed program record $R_{RP}$.

In the above description, the process of FIG. 10 is completed when the processor 25 of the transmission apparatus 2 determines the case to be YES at step S22. However, the present invention is not limited thereto. The transmission apparatus 2 may generate notice data indicating that the relevant preprogrammed program record $R_{RP}$ can be used as it is, and transmit the notice data to the reception apparatus 1.

Although not described above, at the broadcast start time in the preprogrammed program record $R_{RP}$ exemplified in FIG. 7, for example, the processor 116 generates a control signal $S_{CH}$ for setting the receiving channel of the tuner 12 to the broadcast channel $CH_1$, and outputs the generated control signal $S_{CH}$ to the tuner 12. Moreover, the processor 116 generates a control signal $S_{SA}$ for setting the input line of the program reproduction section 13 to the side of the tuner 12, and outputs the generated control signal $S_{SA}$ to the program reproduction section 13. Moreover, the processor 116 generates a control signal $S_{SB}$ for setting the input line of the image switching section 14 to the side of the program reproduction section 13, and outputs the generated control signal $S_{SB}$ to the image switching section 14. The audio switching section 16 generates a control signal $S_{SC}$ for setting the input line of the audio switching section 16 to the program reproduction section 13, and outputs the generated control signal $S_{CC}$ to the audio switching section 16. As a result, the display device 15 and the audio output section 17 output video and audio composing the program P which has been preprogrammed for viewing based on the preprogrammed program record $R_{RP}$.

Although the above-described embodiment illustrates the operation of the reception apparatus 1 in the case of preprogramming of a viewing, the operation in the case of preprogrammed recording can also be easily realized by applying the operation for the case of preprogramming of a viewing. More specifically, the user designates preprogramming of a recording in the area $A_1$ by operating the input device 112, and further designates the program code $PC_1$ by referring to the program table $PG_1$. In response to such designations, the processor 116 generates a preprogrammed program record $R_{RP}$ whose flag field $F_{FL}$ is "1". Thus, if the user has moved from the area $A_1$ to the area $A_2$ at a predetermined time before the broadcast start time of the preprogrammed program record $R_{RP}$, the above-described process is performed between the reception apparatus 1 and the transmission apparatus 2.

When the broadcast start time in the preprogrammed program record $R_{RP}$ whose flag field $F_{FL}$ is "1" is reached, the processor 116 generates a control signal $S_{CH}$ for setting the receiving channel of the tuner 12 to the broadcast channel $CH_1$, and outputs the generated control signal $S_{CH}$ to the tuner 12. As a result, the transport stream composing the preprogrammed program P which is outputted from the tuner 12 is stored in the program storage section 114. When the user desires to view the preprogrammed program P in the transport stream stored in the program storage section 114, the processor 116 generates a control signal $S_{SA}$ for setting the input line of the program reproduction section 13 to the side of the control section 111, and outputs the generated control signal $S_{SA}$ to the program reproduction section 13. Moreover, the processor 116 generates a control signal $S_{SB}$ for setting the input line of the image switching section 14 to the side of the program reproduction section 13, and outputs the generated control signal $S_{SB}$ to the image switching section 14. The audio switching section 16 generates a control signal $S_{SC}$ for setting the input line of the audio switching section 16 to the side of the program reproduction section 13, and outputs the generated control signal $S_{SC}$ to the audio switching section 16. As a result, the transport stream which has been read from the program storage section 114 by the processor 116 is outputted to the program reproduction section 13, so that the display device 15 and the audio output section 17 output video and audio composing the program P which has been preprogrammed for recording based on the preprogrammed program record $R_{RP}$.

The above-described embodiment illustrates an example where the reception apparatus 1 and the transmission apparatus 2 are applied to a terrestrial broadcast system. However, the reception apparatus 1 may perform the process shown in FIG. 6 also in the case where the programs $P_1$ to $P_5$ are receivable in a satellite broadcast system.

In the above-described embodiment, the reception apparatus 1 employs the position information $CP_1$ or $CP_2$ outputted from the mobile communication network 5 when generating the determination request $R_D$. However, the present invention is not limited thereto. The reception apparatus 1 may generate the determination request $R_D$ by employing a current position which is calculated by using information from the GPS (Global Positioning System), or may generate the determination request $R_D$ by employing a current position which is detected by using a so-called autonomous navigation sensor.

In the above-described embodiment, the transmission apparatus 2 determines the movement of the reception apparatus 1 from the generated area A to the current area A based on the broadcast channel $CH_1$ or $CH_2$ and the position information $CP_1$ or $CP_2$ contained in the received determination request $R_D$. However, the present invention is not limited thereto. Since the transmission apparatus 2 generates notice data $D_{WP}$ or $D_{WA}$ every time the reception apparatus 1 moves, it is possible to memorize the generated area A of the reception apparatus 1. Then, the reception apparatus 1 may generate a determination request $R_D$ which only contains the position information $CP_1$ or $CP_2$, and send the determination request $R_D$ to the transmission apparatus 2. In this case, the transmission apparatus 2 can recognize that the reception apparatus 1 has moved from the generated area A to the current area A based on the memorized generated area A and the received position information $CP_1$ or $CP_2$.

(First Variant)

Figure 12:
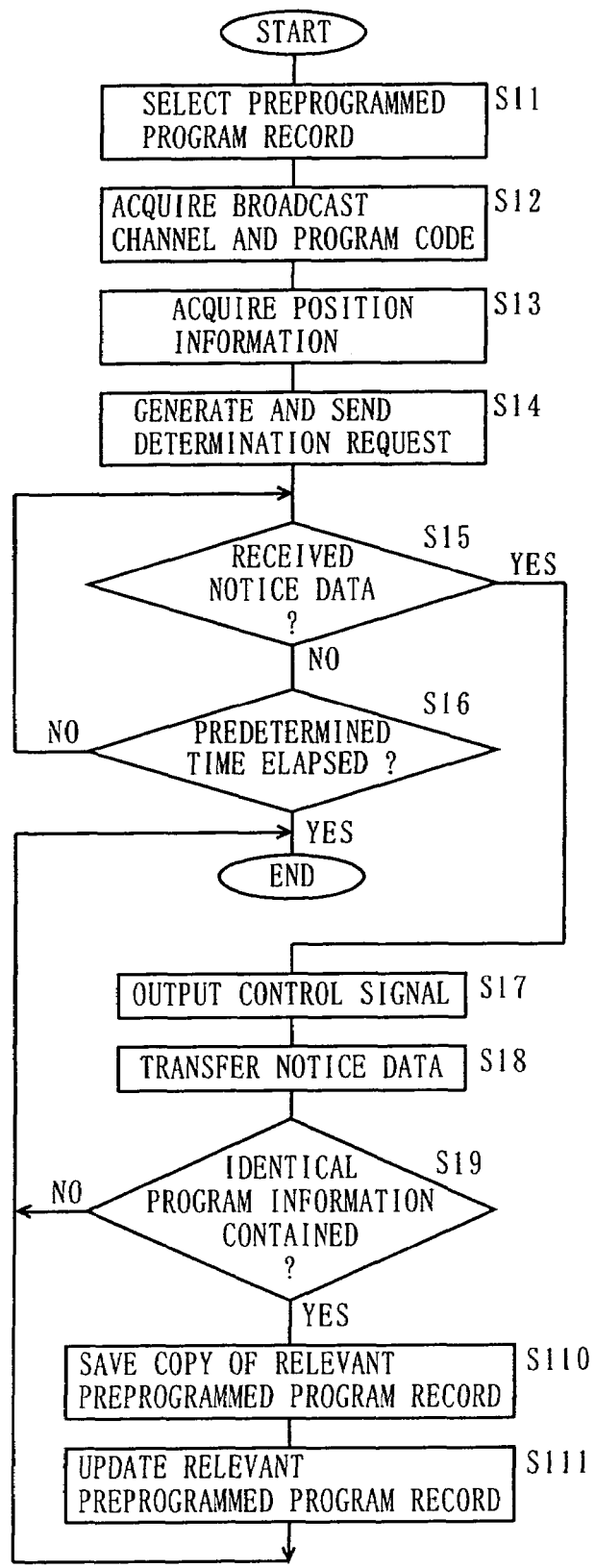
FIG. 12 is a flowchart illustrating a first variant processing procedure of a processor 116 shown in FIG. 4.
Figure 13:
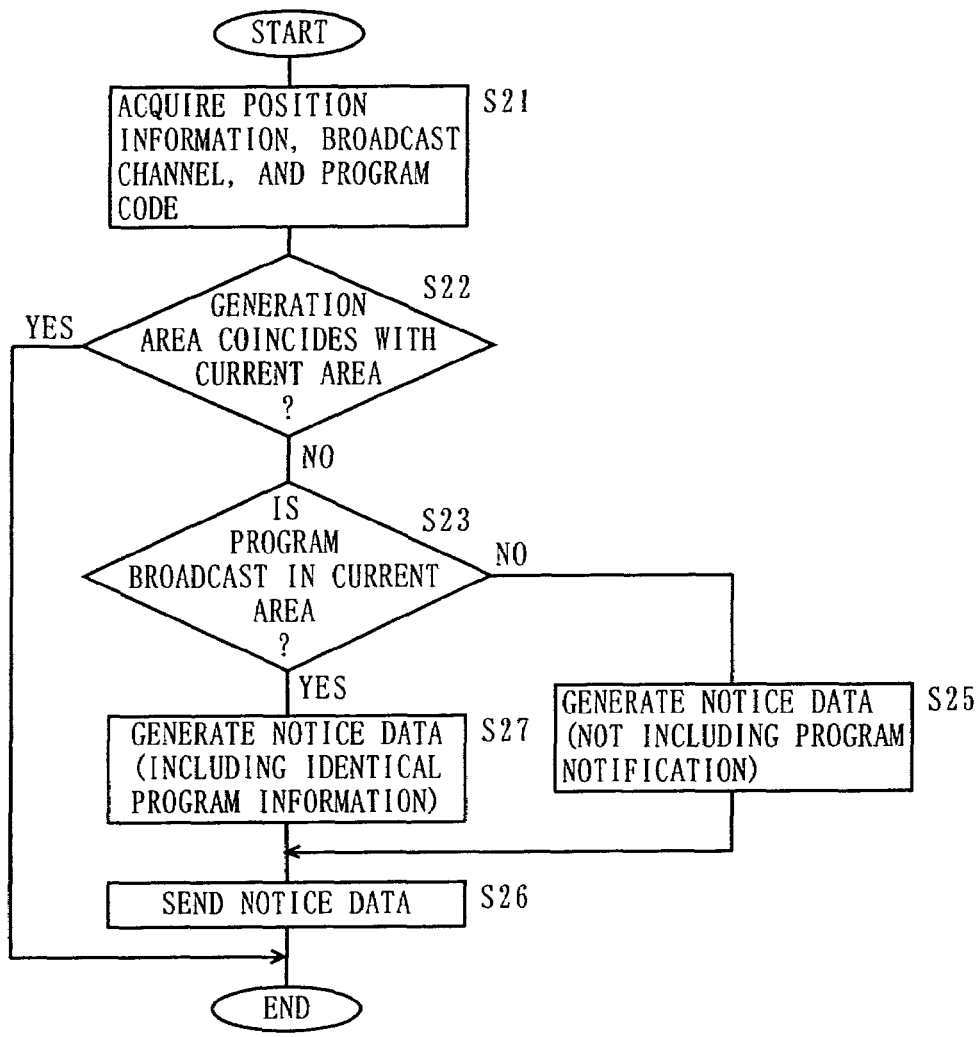
FIG. 13 is a flowchart illustrating a first variant processing procedure of a processor 25 shown in FIG. 8.

Next, a first variant of the process of the processor 116 and the process of the processor 25 will be described. FIG. 12 is a flowchart illustrating a first variant processing procedure of the processor 116. FIG. 12 differs from FIG. 6 in that steps S19 to S111 are further comprised. Since there are no other differences between these two flowcharts, identical step numbers are given to any steps in FIG. 12 that correspond to those in FIG. 6, and the descriptions thereof are omitted. FIG. 13 is a flowchart illustrating a first variant processing procedure of the processor 25. FIG. 13 differs from FIG. 10 in that step S27 is comprised instead of step S24. Since there are no other differences between these two flowcharts, identical step numbers are given to any steps in FIG. 13 that correspond to those in FIG. 10, and the descriptions thereof are omitted.

Figure 14:
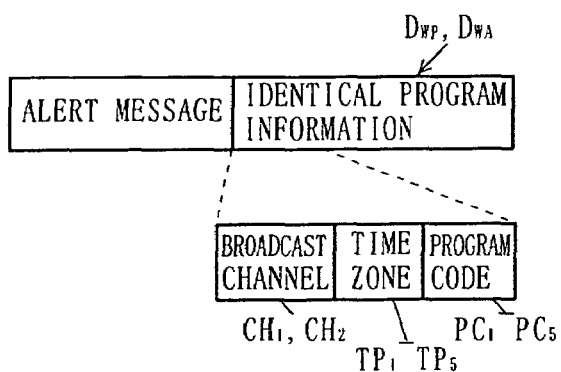
FIG. 14 is a schematic diagram illustrating a data structure of notice data $D_{WP}$ or $D_{WA}$ which is generated during the process of FIG. 13.

In FIG. 13, when the processor 25 of the transmission apparatus 2 determines the case to be YES at step S23, the processor 25 generates notice data $D_{WP}$ and/or notice data $D_{WA}$ on the working area 26 (step S27). More specifically, the processor 25 reads, from the program DB storage section 23 onto the working area 26, a set which was found in step S23, i.e., a set including the broadcast channel $CH_1$ or $CH_2$, one of the time zones $TP_1$ to $TP_3$, and one of the program codes $PC_1$ to $PC_5$. Thereafter, as shown in the upper portion of FIG. 14, the processor 25 generates notice data $D_{WP}$ which contains identical program information $I_{SP}$ as the set that has been read, in addition to the aforementioned alert message. Alternatively, the identical program information $I_{SP}$ may be contained in the notice data $D_{WA}$.

In the first embodiment, it is assumed the preprogrammed program record $R_{RP}$ exemplified in FIG. 7 is selected at step S11. Under this assumption, the identical program information $I_{SP}$ is composed of the broadcast channel $CH_2$, the time zone $TP_3$, and the program code $PC_1$.

After step S27 as described above is completed, the processor 25 sends, at step S26, the generated notice data $D_{WP}$ and/or notice data $D_{WA}$ to the mobile communication network 5 via the transmission/reception section 21.

In FIG. 12, the processor 116 of the reception apparatus 1 determines after step S18 whether or not the received notice data $D_{WP}$ or notice data $D_{WA}$ contains the identical program information $I_{SP}$ (step S19). If the processor 116 determines that the identical program information $I_{SP}$ is not contained, the process of FIG. 12 is over.

If it is determined at step S19 that the identical program information $I_{SP}$ is contained, the processor 116 copies the relevant preprogrammed program record $R_{RP}$, and saves the copy to another recording area in the preprogramming storage section 113 (step S110). As a result, when the reception apparatus 1 returns to the generated area A, the saved preprogrammed program record $R_{RP}$ can be utilized again, as described above.

Furthermore, the processor 116 writes the broadcast channel $CH_1$ or $CH_2$, the broadcast start time and the broadcast end time constituting some of the time zones $TP_1$ to $TP_3$, and one of the program codes $PC_1$ to $PC_5$—from which the identical program information $I_{SP}$ is composed—into the broadcast channel field $F_{CH}$, the start time field $F_{ST}$, the end time field $F_{ET}$, and the program code field $F_{PC}$ composing the preprogrammed program record $R_{RP}$ of the preprogrammed program information $I_{RP}$, thereby updating the relevant preprogrammed program record $R_{RP}$ (step S111). Under the above assumptions, the updated preprogrammed program record $R_{RP}$ is composed of the broadcast channel $CH_2$, the broadcast start time $T_3$, the broadcast end time $T_4$, the program code field $PC_1$, and a flag "0".

As described above, in the first variant, the reception apparatus 1 is capable of automatically updating the preprogrammed program record $R_{RP}$, thereby making it possible to view or record in the current area A a program P which has been preprogrammed for viewing or preprogrammed for recording.

The above-described variant illustrates a case where the processor 116 writes the broadcast channel $CH_1$ or $CH_2$, the broadcast start time and the broadcast end time constituting some of the time zones $TP_1$ to $TP_3$, and one of the program codes $PC_1$ to $PC_5$—from which the identical program information $I_{SP}$ in the preprogrammed program record $R_{RP}$ is composed. However, the present invention is not limited thereto. The processor 116 may only write the necessary portions. For example, since one of the program codes $PC_1$ to $PC_5$ is described in both the identical program information $I_{SP}$ and the preprogrammed program record $R_{RP}$, the program code PC does not need to be rewritten. In some cases, the broadcast start time and the broadcast end time may not even need to be rewritten, either.

In the above-described variant, it is impossible to recognize at the reception apparatus 1 whether or not the same program P is broadcast in the current area A until the notice data $D_{WP}$ or $D_{WA}$ from the transmission apparatus 2 is analyzed. It might even be possible for the same program P to run in the same time zone TP. Therefore, the user of the reception apparatus 1 would wish to update the preprogrammed program record $R_{RP}$ as soon as possible. Therefore, in the first variant, it is preferable that the determination request $R_D$ is sent to the transmission apparatus 2 immediately after a movement from the generated area A to the current area A occurs.

Moreover, in the above-described variant, it is preferable at step S25 to not only send the aforementioned alert message but also to generate notice data $D_{WP}$ and/or notice data $D_{WA}$ which contains a notification that the same program P is not going to be broadcast in the current area A, and to send the notice data $D_{WP}$ and/or notice data $D_{WA}$ at step S27. As a result, the user of the reception apparatus 1 will be able to recognize that the same program P is not going to be broadcast.

As shown in FIG. 15, the user may possess a stationary type video recording apparatus 6 which is capable of accessing the communication network 4. Moreover, such a video recording apparatus 6 basically will not move among a plurality of areas A. In this case, if it is determined at step S23 that the same program P does not exist, then the transmission apparatus 1 may generate a command $C_{RR}$, which is directed to the video recording apparatus 6, for recording a program P identified by the preprogrammed program record $R_{RP}$ selected at step S11, and transmit it via the communication network 4.

In the above-described first embodiment, the user designates preprogramming of a viewing by operating the input device 112, and further designates the program code $PC_1$ of the program $P_1$ transmitted by the broadcast station $3_1$ while referring to the program table $PG_1$. In response to such designations, the processor 116 generates the preprogrammed program record $R_{RP}$ and stores the generated preprogrammed program record $R_{RP}$ in the preprogramming storage section 113. However, the present invention is not limited thereto. The reception apparatus 1 may transmit the generated preprogrammed program record $R_{RP}$ to the transmission apparatus 2, and the transmission apparatus 2 may keep each preprogrammed program record $R_{RP}$ under management. In this case, at a predetermined time before the broadcast start time of a program which has been preprogrammed for viewing or preprogrammed for recording, the transmission apparatus 2 transmits the relevant preprogrammed program record $R_{RP}$ to the reception apparatus 1. Herein, if the user possesses a stationary type video recording apparatus 6 which is capable of accessing the communication network 4 as described above, the transmission apparatus 2 may transmit the preprogrammed program record $R_{RP}$ to the reception apparatus 1, or may transmit the aforementioned command $C_{RR}$ to the video recording apparatus 6, depending on the content of the program P which is identified by the preprogrammed program record $R_{RP}$. For example, as for programs P which are to be viewed on a high-resolution screen, e.g., movies, the transmission apparatus 2 may generate the aforementioned command $C_{RR}$ and transmit it to the video recording apparatus 6, and as for those which do not need to be viewed at a high-resolution screen, e.g., news, the transmission apparatus 2 may transmit the aforementioned preprogrammed program record $R_{RP}$ to the reception apparatus 1.

(Second Variant)

Figure 16:
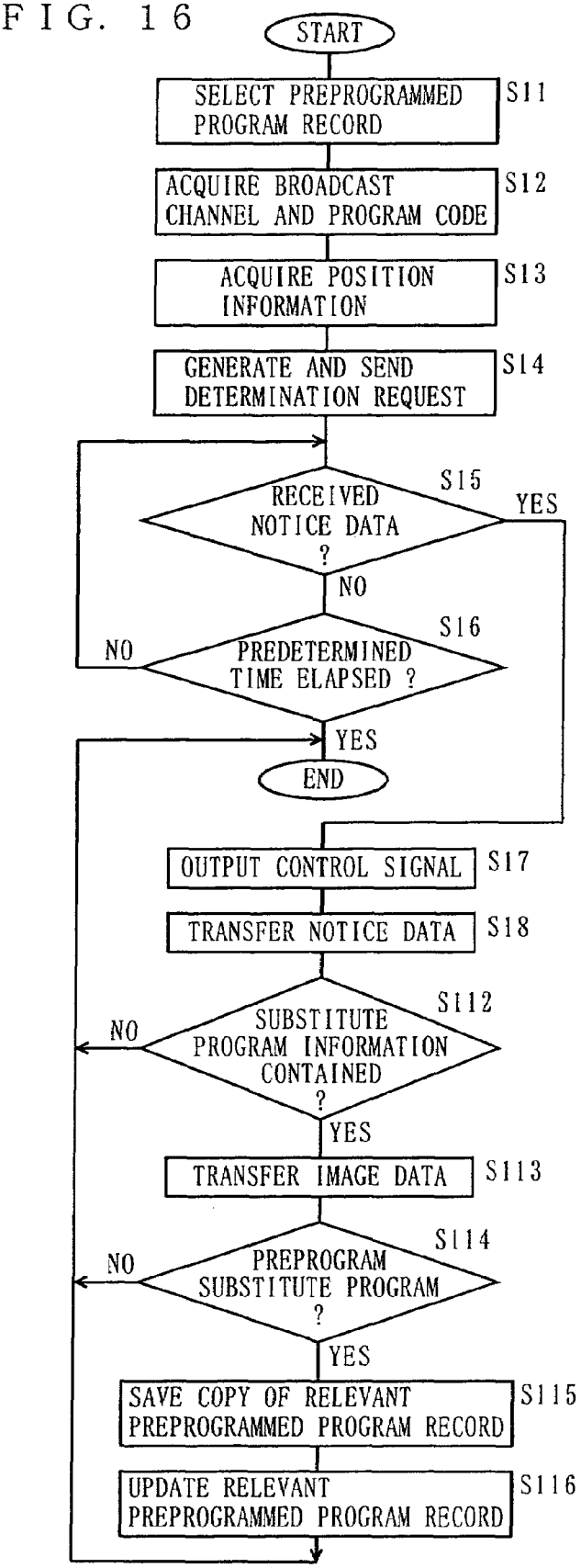
FIG. 16 is a flowchart illustrating a second variant processing procedure of a processor 116 shown in FIG. 4.
Figure 17:
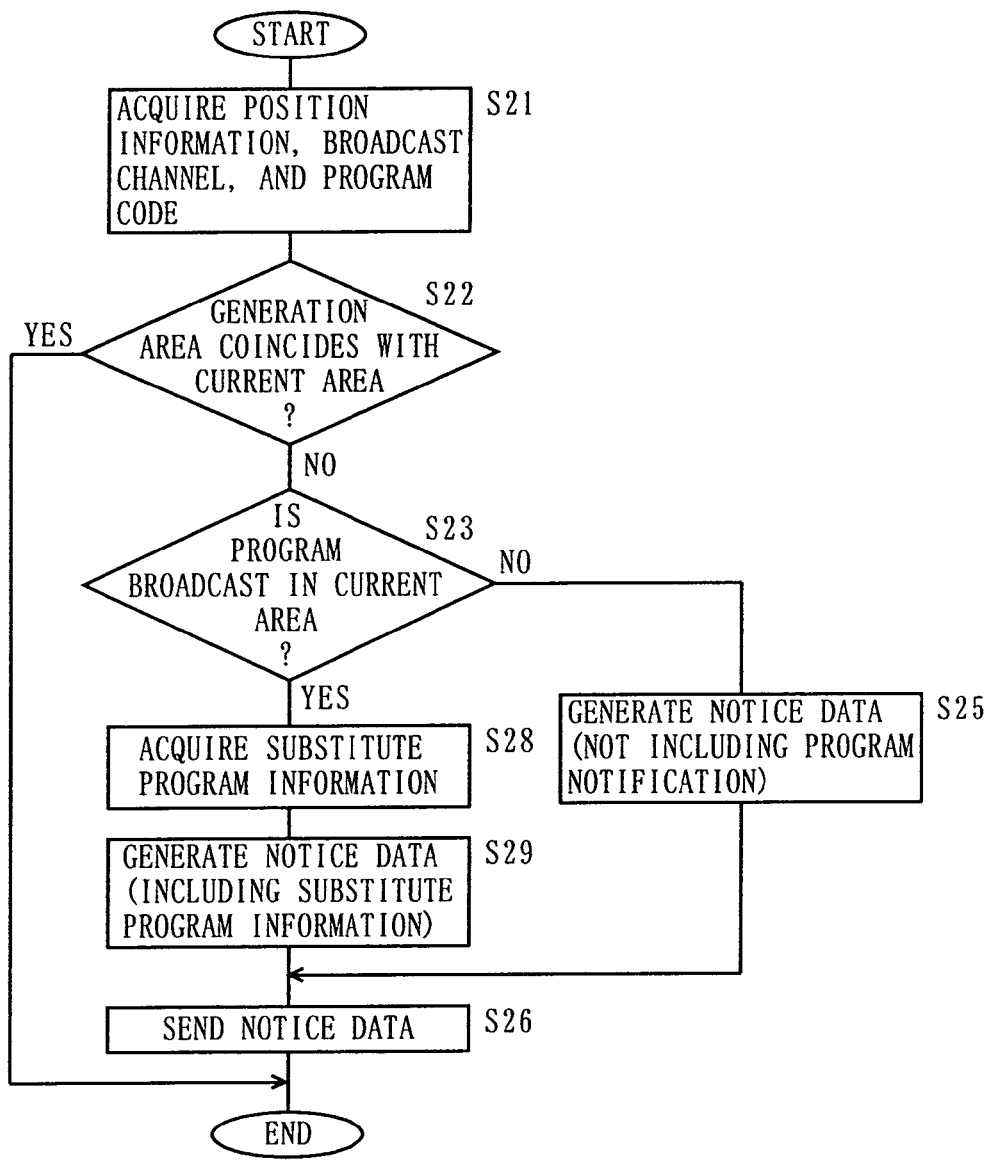
FIG. 17 is a flowchart illustrating a second variant processing procedure of a processor 25 shown in FIG. 8.

Next, a second variant of the process of the processor 116 and the process of the processor 25 will be described. FIG. 16 is a flowchart illustrating a second variant processing procedure of the processor 116. FIG. 16 differs from FIG. 6 in that steps S112 to S116 are further comprised. Since there are no other differences between these two flowcharts, identical step numbers are given to any steps in FIG. 16 that correspond to those in FIG. 6, and the descriptions thereof are omitted. FIG. 17 is a flowchart illustrating a second variant processing procedure of the processor 25. FIG. 17 differs from FIG. 10 in that steps S28 and S29 are comprised instead of step S24. Since there are no other differences between these two flowcharts, identical step numbers are given to any steps in FIG. 17 that correspond to those in FIG. 10, and the descriptions thereof are omitted.

In FIG. 17, if the processor 25 of the transmission apparatus 2 determines the case to be NO at step S23, the processor 25 searches the program DB 28 for a substitute program AP for a program P which has been preprogrammed for viewing or preprogrammed for recording at the reception apparatus 1, and extracts onto the working area 26 the broadcast channel $CH_1$ or $CH_2$ on which the substitute program AP is broadcast, one of the time zones $TP_1$ to $TP_3$, and one of the program codes $PC_1$ to $PC_5$ as substitute program information $I_{AP}$ (step S28). Herein, various programs P are possible candidates for the substitute program AP, e.g., a program P which is broadcast in the current area A in the same time zone TP as the program P which has been preprogrammed for viewing or preprogrammed for recording, or a program P which is broadcast in the current area A and which is selected by the processor 25 based on the preferences of the user.

Next, the processor 25 generates notice data $D_{WP}$ and/or notice data $D_{WA}$ on the working area 26 (step S29). More specifically, as shown in FIG. 17, the processor 25 generates notice data $D_{WP}$ which contains the substitute program information $I_{AP}$ acquired at step S28 in addition to the alert message. Alternatively, the substitute program information $I_{AP}$ may be contained in notice data $D_{WA}$.

For example, if the program $P_4$ shown in FIG. 2 is found at step S28 as a substitute program $AP_4$, the substitute program information $I_{AP}$ which is generated at step S29 is composed of the broadcast channel $CH_2$, the time zone $TP_1$, and the program code $PC_4$.

After step S29 as described above is completed, at step S26, the generated notice data $D_{WP}$ and/or $D_{WA}$ is sent to the mobile communication network 5 via the transmission/reception section 21.

In FIG. 16, the processor 116 of the reception apparatus 1 determines, after step S18, whether or not the substitute program information $I_{AP}$ is contained in the received notice data $D_{WP}$ or $D_{WA}$ (step S112). If the processor 116 determines that the substitute program information $I_{AP}$ is not contained in the received notice data $D_{WP}$ or $D_{WA}$, the process of FIG. 16 is completed.

Figure 18:
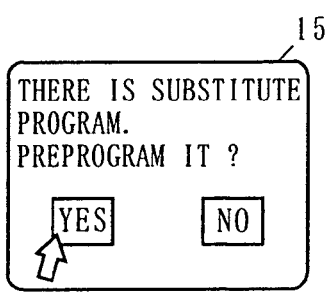
FIG. 18 is a schematic diagram illustrating an image displayed on a display device 15 in accordance with image data $D_{NAP}$ which is generated during the process of FIG. 17.

If it is determined at step S112 that the substitute program information $I_{AP}$ is contained in the received notice data $D_{WP}$ or $D_{WA}$, the processor 116 transfers image data $D_{NAP}$ representing a message indicating the existence of a substitute program AP (hereinafter referred to as a substitute program notification) to the image switching section 14 (step S113). Although the image data $D_{NAP}$ may be added in the notice data $D_{WP}$ or $D_{WA}$, the second variant assumes that the image data $D_{NAP}$ is previously described in the computer program 118. Moreover, as shown in FIG. 18, the image data $D_{NAP}$ is composed so as to enable a user to designate whether to preprogram the substitute program AP for viewing or to preprogram the substitute program AP for recording. As a result of step S113, the image data $D_{NAP}$ is received by the display device 15 via the image switching section 14. As shown in FIG. 18, the display device 15 displays a message which is represented by the image data $D_{NAP}$.

The user determines whether or not to accept the substitute program AP by referring to the screen of the display device 15, and designates whether or not to accept the substitute program AP by operating the input device 112. Based on an output signal from the input device 112, the processor 116 determines whether the user desires to preprogram the substitute program AP for viewing or to preprogram the substitute program AP for recording (step S114). If the user designates non-acceptance, the processor 116 regards the substitute program AP as not being preprogrammed for viewing, and the process of FIG. 16 is over.

On the other hand, if the user designates the substitute program AP to be accepted at step S114, the processor 116 regards the substitute program AP to be preprogrammed for viewing, and the processor 116 copies a relevant preprogrammed program record $R_{RP}$, and saves the copy to another recording area in the preprogramming storage section 113 (step S115). As a result, as described above, the saved preprogrammed program record $R_{RP}$ can be utilized again.

Furthermore, the processor 116 writes the broadcast channel $CH_1$ or $CH_2$, the broadcast start time and the broadcast end time constituting some of the time zones $TP_1$ to $TP_3$, and one of the program codes $PC_1$ to $PC_5$, which compose the substitute program information $I_{AP}$, into the broadcast channel field $F_{CH}$, the start time field $F_{ST}$, the end time field $F_{ET}$, and the program code field $F_{PC}$ composing the preprogrammed program record $R_{RP}$ of the preprogrammed program information $I_{RP}$, thereby updating the relevant preprogrammed program record $R_{RP}$ (step S116). Under the above assumptions, the updated preprogrammed program record $R_{RP}$ is composed of the broadcast channel $CH_2$, the broadcast start time $T_1$, the broadcast end time $T_2$, the program code field $PC_4$, and a flag "0".

As described above, according to the second variant, the reception apparatus 1 automatically updates the preprogrammed program record $R_{RP}$ with that of a substitute program AP, so that an easier-to-use reception apparatus 1 can be provided.

Although the existence of a substitute program AP is notified to the user by image data $D_{NAP}$ representing a substitute program notification in the above-described second variant, the present invention is not limited thereto. The reception apparatus 1 may notify the existence of the substitute program AP to the user in an audio form.

Second Embodiment

Figure 19:
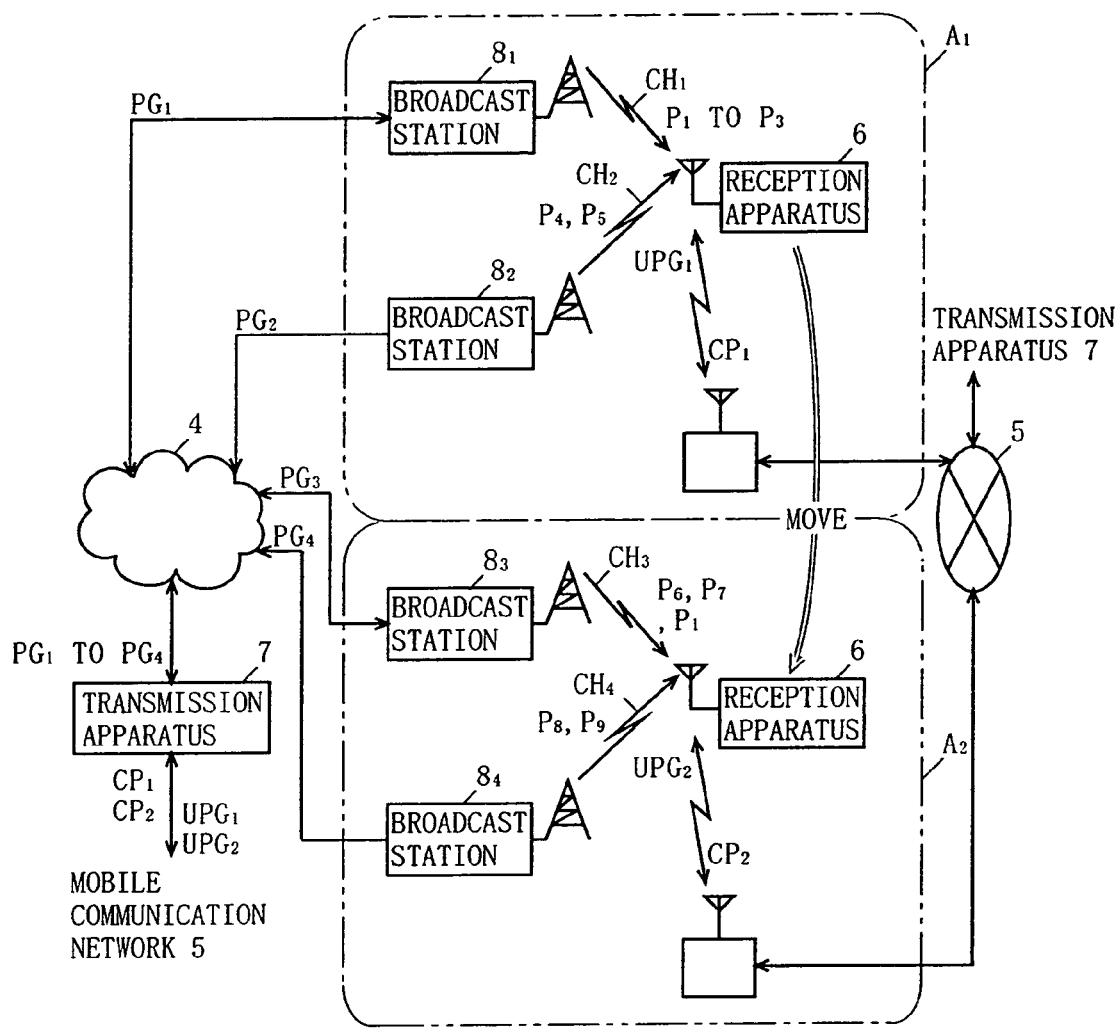
FIG. 19 is a schematic diagram illustrating an overall structure of a data communication system according to a second embodiment of the present invention.

FIG. 19 is a schematic diagram illustrating an overall structure of a data communication system according to a second embodiment of the present invention. In FIG. 19, the data communication system comprises at least one reception apparatus 6, at least one transmission apparatus 7, and four broadcast stations $8_1$ to $8_4$, which are exemplary of a plurality of broadcast stations.

First, the broadcast stations $8_1$ to $8_4$ will be described. By using a broadcast channel $CH_1$, the broadcast station $8_1$ broadcasts, toward an area $A_1$, programs $P_1$ to $P_3$ having different contents, which are exemplary of a plurality of programs, and which are multiplexed typically onto a transport stream. Moreover, the broadcast station $8_1$ transmits a program table (time table) $PG_1$ to the transmission apparatus 7 via a communication network 4. Herein, the broadcast channel $CH_1$, the area $A_1$, the programs $P_1$ to $P_3$, the program table $PG_1$, and the communication network 4 are similar to those in the first embodiment, and therefore the descriptions thereof are omitted in the second embodiment.

By using a broadcast channel $CH_2$, the broadcast station $8_2$ broadcasts, toward the area $A_1$, two programs $P_4$ and $P_5$ having different contents, which are exemplary of a plurality of programs, and which are multiplexed. The broadcast channel $CH_2$, which is preassigned to the broadcast station $8_2$, is a frequency band that is different from the aforementioned broadcast channel $CH_1$. Although the descriptions of the second embodiment conveniently assume that the broadcast stations $8_1$ and $8_2$ both cover the same area $A_1$, the coverage areas of the broadcast stations $8_1$ and $8_2$ may differ depending on the performances of the broadcast stations $8_1$ and $8_2$ or the surrounding environment.

Figure 20:
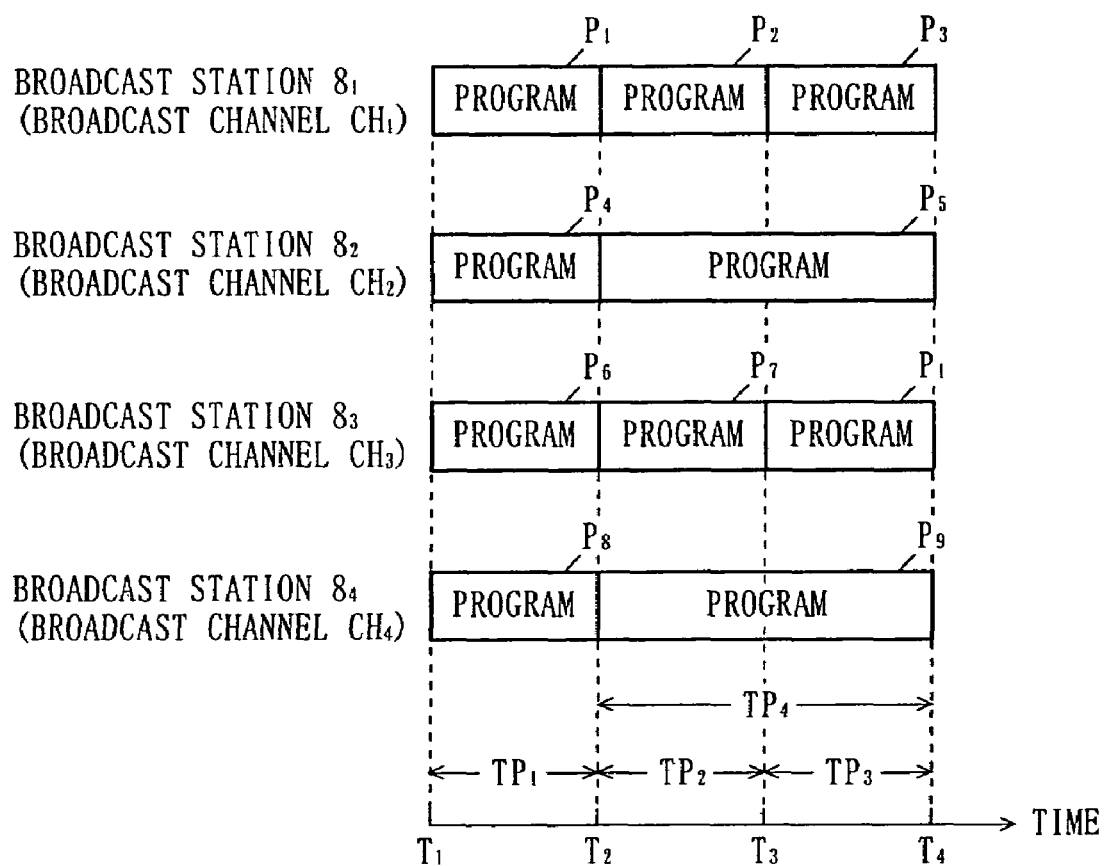
FIG. 20 is a schematic diagram illustrating time zones $TP_1$ to $TP_4$, during which broadcast stations $8_1$ to $8_4$ in FIG. 19 transmit programs $P_1$ to $P_9$.

In the second embodiment, as shown in FIG. 20, it is conveniently assumed that the programs $P_4$ and $P_5$ are respectively broadcast in the scheduled and non-overlapping time zones $TP_1$ and $TP_4$. The time zone $TP_4$, which is composed of the time zones $TP_2$ and $TP_3$, is between a broadcast start time $T_2$ and a broadcast end time $T_4$ of the program $P_5$. Program codes $PC_4$ and $PC_5$ are assigned to the programs $P_4$ and $P_5$ in a manner similar to the first embodiment.

Figure 21:
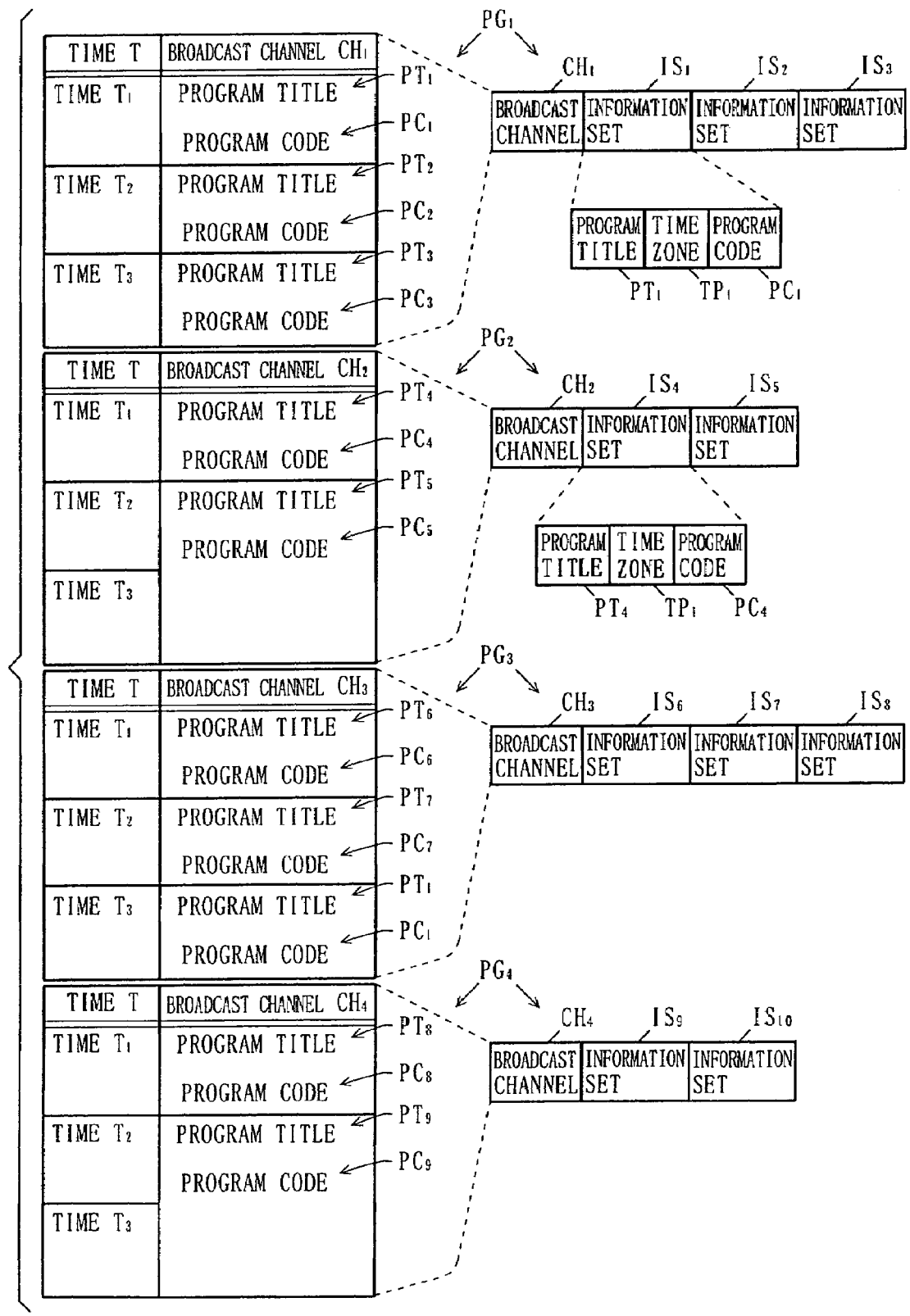
FIG. 21 is a schematic diagram illustrating program tables $PG_1$ to $PG_4$, which are generated in connection with programs $P_1$ to $P_9$ in FIG. 20.

Furthermore, as shown in FIG. 21, the broadcast station $8_2$ transmits a program table (time table) $PG_2$, which represents the schedules of the programs $P_4$ and $P_5$, to the transmission apparatus 7 via the communication network 4. Herein, the program table $PG_2$ has a similar data structure to that of the program table $PG_1$, and as shown in FIG. 21, contains the broadcast channel $CH_2$ and information sets $IS_4$ and $IS_5$. The information set $IS_4$ is composed of a program title $PT_4$, the time zone $TP_1$, and the program code $PC_4$ of the program $P_4$. Although omitted from FIG. 21, the information set $IS_5$ is composed of a program title $PT_5$, the time zone $TP_4$, and the program code $PC_5$ of the program $P_5$.

As shown in FIG. 19, by using a broadcast channel $CH_3$, the broadcast station $8_3$ broadcasts, toward an area $A_2$ programs $P_6$, $P_7$, and $P_1$ having different contents, which are exemplary of a plurality of programs.

The broadcast channel $CH_3$, which is preassigned to the broadcast station $8_3$, is a frequency band that is different from the aforementioned broadcast channels $CH_1$ and $CH_2$. The area $A_2$, which is an extent (range) within which the reception apparatus 6 is capable of receiving the broadcast programs $P_6$, $P_7$ and $P_1$ from the broadcast station $8_3$, covers an extent that is different from the aforementioned area $A_1$, and substantially adjoins the area $A_1$. The area $A_2$ is generally determined by the intensity of the transmission wave from the broadcast station $8_3$.

In the second embodiment, as shown in FIG. 20, it is conveniently assumed that the programs $P_6$, $P_7$ and $P_1$ are broadcast in the aforementioned time zones $TP_1$, $TP_2$, and $TP_3$. Note that the program $P_1$ is transmitted by the broadcast stations $8_1$ and $8_3$ in the respectively different time zones $TP_1$ and $TP_3$. For the programs $P_6$ and $P_7$, program codes $PC_6$ and $PC_7$ are assigned, which are similar to those for the other programs $P_1$ to $P_5$. As in the aforementioned case, the program code $PC_1$ is assigned to the broadcast program $P_1$ from the broadcast station $8_3$.

As shown in FIG. 21, the broadcast station $8_3$ transmits a program table (time table) $PG_3$, which represents the schedules of the broadcast programs $P_6$, $P_7$, and $P_1$, to the transmission apparatus 2 via the communication network 4. Herein, the program table $PG_3$ has a similar data structure to those of the other program tables $PG_1$ and $PG_2$, and as shown in FIG. 21, contains the broadcast channel $CH_3$ and information sets $IS_6$ to $IS_8$. Although omitted from FIG. 21, the information set $IS_6$ is composed of a program title $PT_6$, the time zone $TP_1$, and the program code $PC_6$ of the program $P_6$. The information set $IS_7$ is composed of a program title $PT_7$, the time zone $TP_2$, and the program code $PC_7$ of the program $P_7$. As is clear from the information set $IS_1$, the information set ISis composed of a program title $PT_1$, the time zone $TP_3$, and the program code $PC_1$ of the program $P_1$.

By using a broadcast channel $CH_4$, the broadcast station $8_4$ broadcasts toward the area $A_2$ two programs $P_8$ and $P_9$ having different contents, which are exemplary of a plurality of programs.

The broadcast channel $CH_4$, which is preassigned to the broadcast station $8_4$, is a frequency band that is different from the aforementioned broadcast channels $CH_1$ to $CH_3$. The descriptions of the second embodiment conveniently assume that the broadcast stations $8_3$ and $8_4$ both cover the same area $A_2$.

In the second embodiment, as shown in FIG. 20, it is conveniently assumed that the programs $P_8$ and $P_9$ are broadcast in the scheduled and non-overlapping time zones $TP_1$ and $TP_4$. Program codes $PC_8$ and $PC_9$ are respectively assigned to the programs $P_8$ and $P_9$ in a manner similar to the program $P_1$ and others.

As shown in FIG. 21, the broadcast station $8_4$ transmits a program table (time table) $PG_4$, which represents the schedules of the broadcast programs $P_8$ and $P_9$, to the transmission apparatus 2 via the communication network 4. Herein, the program table $PG_4$ has a similar data structure to those of the program table $PG_1$ and others, and as shown in FIG. 21, contains the broadcast channel $CH_4$ and information sets $IS_9$ and $IS_{10}$. Although omitted from FIG. 21, the information set $IS_9$ is composed of a program title $PT_8$, the time zone $TP_1$, and the program code $PC_8$ of the program $P_8$, as is clear from the information set $IS_1$ and others. The information set $IS_{10}$ is composed of a program title $PT_9$, the time zone $TP_4$, and the program code $PC_9$ of the program $P_9$.

In FIG. 19, the reception apparatus 6 is a mobile communication device, as is the aforementioned reception apparatus 1 of the first embodiment. In the currently located area $A_1$ or $A_2$, the reception apparatus 6 receives and displays at least a personal program table $UPG_1$ or $UPG_2$ which is provided from the transmission apparatus 7. As is the case with the aforementioned reception apparatus 1, the reception apparatus 6 may be constructed so as to be capable of receiving the programs $P_1$ to $P_5$, or the programs $P_1$ and $P_6$ to $P_9$, which are broadcast by the broadcast stations $8_1$ and $8_2$ or the broadcast stations $8_3$ and $8_4$. The reception apparatus 6 may also be constructed so as to be capable of, from among the programs $P_1$ to $P_9$ which can be received by the reception apparatus 6, reproducing or recording those programs which have been preprogrammed for viewing or recording by the user. However, since the feature of the second embodiment lies in the receiving and displaying of the personal program tables $UPG_1$ and $UPG_2$, the descriptions of the program reception, preprogramming of a viewing and preprogramming of a recording will be simplified.

Figure 22:
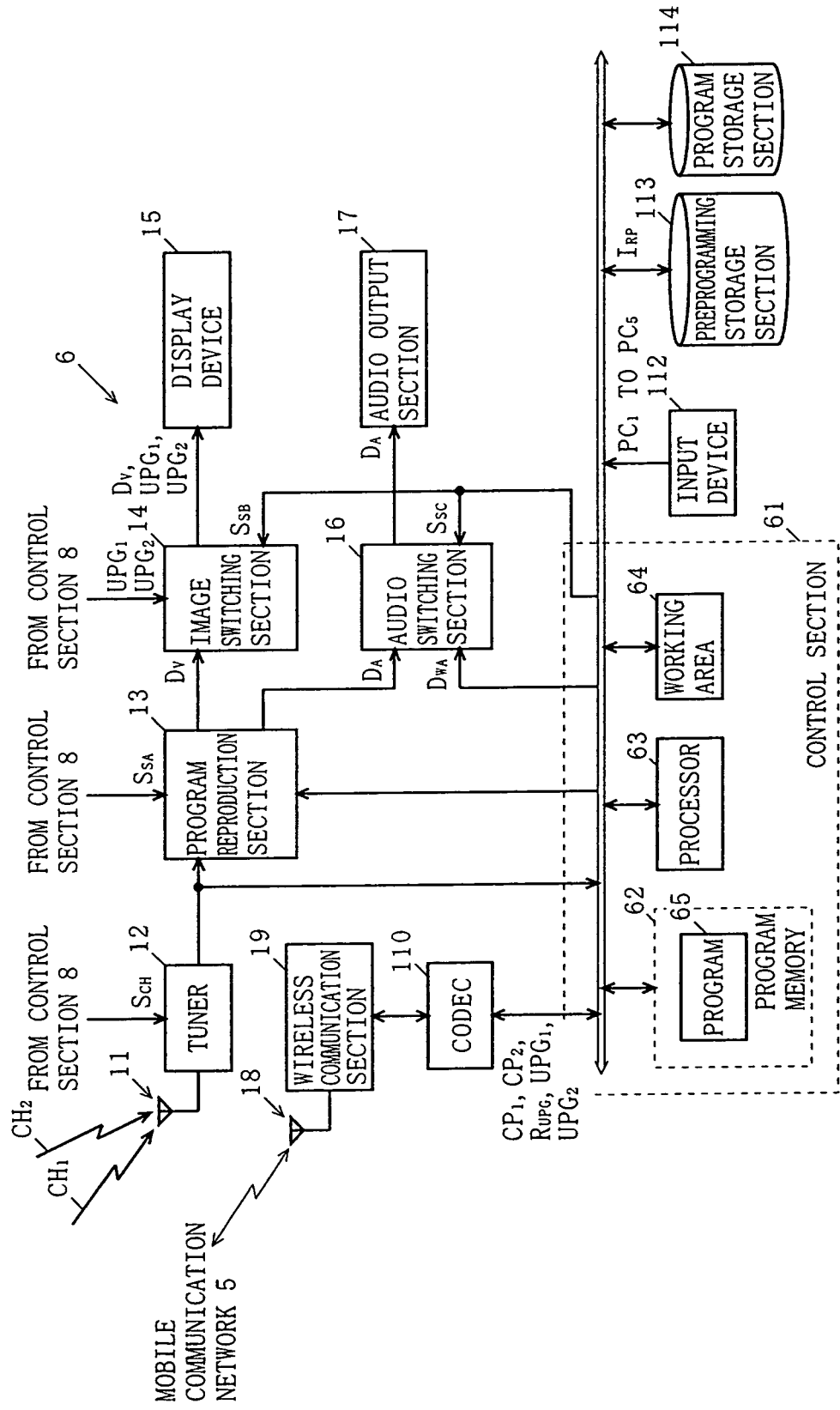
FIG. 22 is a block diagram illustrating an overall structure of a reception apparatus 6 in FIG. 19.

In order to realize the above function, as shown in FIG. 22, the reception apparatus 6 differs from the reception apparatus 1 of FIG. 4 in that a control section 61 is comprised instead of the control section 111. Since there are no other differences in structure and processing between the reception apparatuses 6 and 1, identical reference numerals are given to any components in FIG. 22 which correspond to those in FIG. 4, and the descriptions thereof are simplified. However, the input/output information for some of the components differ from those in the first embodiment.

The program table $UPG_1$ or $UPG_2$ outputted from the control section 61 may be inputted to the image switching section 14. In response to a control signal $S_{SB}$ as described in the first embodiment, the image switching section 14 selects either the program reproduction section 13 or the control section 61. When the control section 61 is selected, the image switching section 14 outputs the program table $UPG_1$ or $UPG_2$ which is sent therefrom to the display device 15. The display device 15 displays the inputted program table $UPG_1$ or $UPG_2$.

From the multiplex signal outputted from the wireless communication section 19, the CODEC 110 separates position information $CP_1$ or $CP_2$ sent to the reception apparatus 6 and the program table $UPG_1$ or $UPG_2$ directed to the reception apparatus 6, and outputs these to the control section 61. The CODEC 110 further multiplexes a program table request $R_{UPG}$ which is generated by the control section 61 onto the multiplex signal. Herein, the program table request $R_{UPG}$ is information for requesting the transmission apparatus 2 for the personal program table $UPG_1$ or $UPG_2$ which is available in the area $A_1$ or $A_2$ into which the reception apparatus 6 has presently entered, and the program table request $R_{UPG}$ at least contains one of the broadcast channels $CH_1$ to $CH_4$ and the position information $CP_1$ or $CP_2$.

In order to perform various processes which are necessary for the reception and displaying of personal program tables, the control section 61 includes a program memory 62, a processor 63, and a working area 64. The program memory 62 stores a computer program (simply shown as "program" in FIG. 22) 65 for controlling the respective components of the reception apparatus 6. The processor 63 executes the computer program 65 as such. The specific process which is performed by the processor 63 will be described in detail later with reference to a flowchart of FIG. 23. The working area 64 is used by the processor 63 during the execution of the computer program 65.

In FIG. 19, the transmission apparatus 7 receives the program tables $PG_1$ to $PG_4$ from the broadcast stations $8_1$ to $8_4$, respectively, via the communication network 4, and stores them. Furthermore, in response to the program table request $R_{UPG}$ from the reception apparatus 6, the transmission apparatus 7 performs a process which is unique to the second embodiment. More specifically, the transmission apparatus 7 generates the personal program table $UPG_1$ or $UPG_2$, and thereafter transmits the generated personal program table $UPG_1$ or $UPG_2$ to the reception apparatus 6 via the mobile communication network 5.

Figure 24:
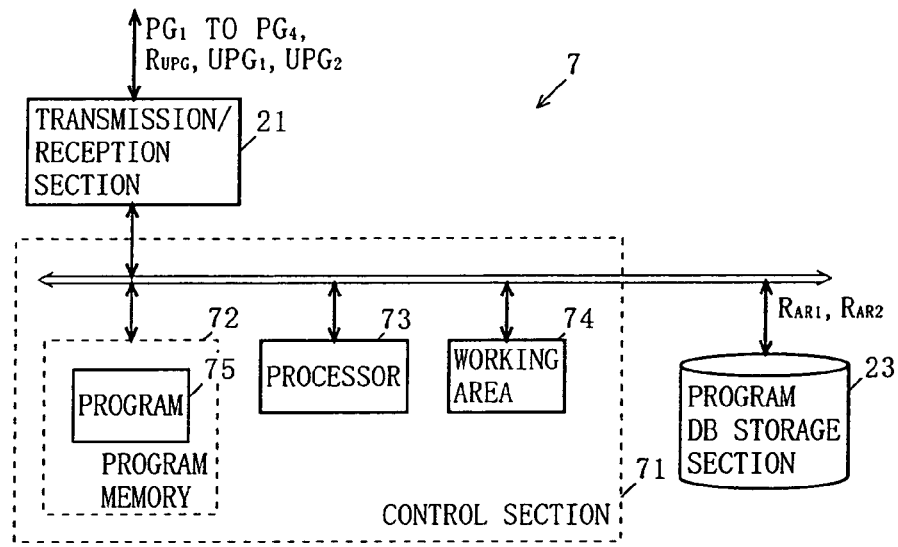
FIG. 24 is a block diagram illustrating an overall structure of a transmission apparatus 7 in FIG. 19.

In order to realize the above functions, as shown in FIG. 24, the transmission apparatus 7 differs from the transmission apparatus 2 in FIG. 8 in that a control section 71 is comprised instead of the control section 22. Since there are no other differences in structure and processing between the transmission apparatuses 7 and 2, identical reference numerals are given to any components in FIG. 24 which correspond to those in FIG. 8, and the descriptions thereof are simplified. However, the input/output information for the transmission/reception section 21, and the information stored in the program DB storage section 23 differ from those in the first embodiment.

Figure 25:
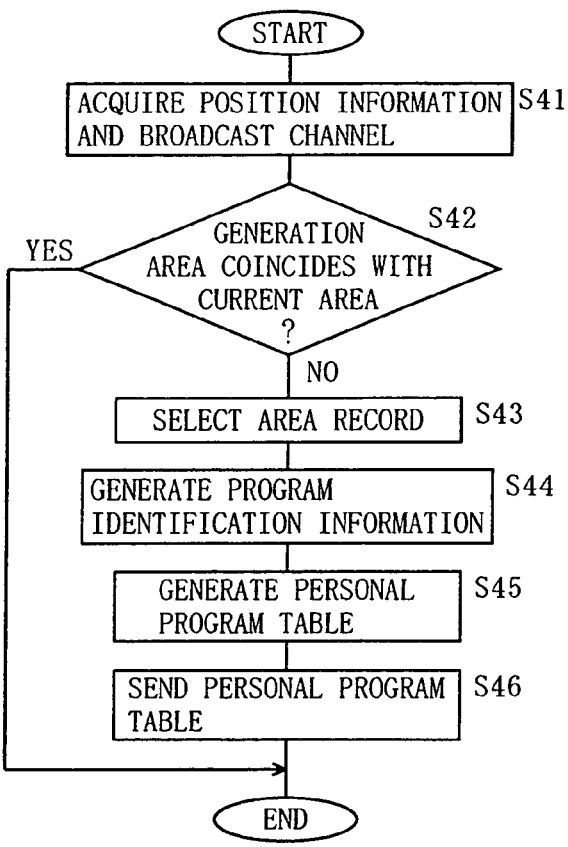
FIG. 25 is a flowchart illustrating a processing procedure of a processor 73 in FIG. 24.

The transmission/reception section 21 receives, via the communication network 4, the program tables $PG_1$ to $PG_4$ which are sent from the broadcast stations $8_1$ to $8_4$, and transfers them to the control section 71. The transmission/reception section 21 receives, via the mobile communication network 5, the program table request $R_{UPG}$ which is sent from the reception apparatus 6, and transfers the received program table request $R_{UPG}$ to the control section 71. Furthermore, the transmission/reception section 21 sends the personal program table $UPG_1$ or $UPG_2$ which is generated by the control section 71 onto the mobile communication network 5. In order to perform a process which is unique to the second embodiment, the control section 71 comprises a program memory 72, a processor 73, and a working area 74. The program memory 72 stores a computer program (simply shown as "program" in FIG. 24) 75 which describes the procedure of each process in the transmission apparatus 7. The processor 73 executes the computer program 75 as such. The process of the processor 73 will be described later in detail with reference to a flowchart of FIG. 25. The working area 74 is used by the processor 73 during the execution of the computer program 75.

The program storage section 23 stores a program DB 76 which is generated by the control section 22. The program DB 76 is generated from the received program tables $PG_1$ to $PG_4$ (see FIG. 21), and, as shown in FIG. 26, is composed of area records $R_{AR1}$ and $R_{AR2}$, which are exemplary of a number of area records $R_{AR}$ corresponding to the number of areas. The area record $R_{AR1}$ is generated from the program tables $PG_1$ and $PG_2$ from the broadcast stations $8_1$ and $8_2$ covering the area $A_1$, and identifies the programs $P_1$ to $P_3$, which are broadcast on the broadcast channel $CH_1$, and the programs $P_4$ and $P_5$, which are broadcast on the broadcast channel $CH_2$, in reference to the respective time T. The area record $R_{AR2}$ is generated from the program tables $PG_3$ and $PG_4$ from the broadcast stations $8_3$ and $8_4$ covering the area $A_2$, and identifies the programs $P_6$, $P_7$ and $P_1$, which are broadcast on the broadcast channel $CH_3$, and the programs $P_8$ and $P_9$, which are broadcast on the broadcast channel $CH_4$, in reference to the respective time T.

Next, the operation of the data communication system having the above structure will be described. First, in the transmission apparatus 7, at the latest by the time $T_1$, the transmission/reception section 21 receives the program table $PG_1$ from the broadcast station $8_1$, the program table $PG_2$ from the broadcast station $8_2$, the program table $PG_3$ from the broadcast station $8_3$, and the program table $PG_4$ from the broadcast station $8_4$ via the communication network 4, and stores them in the working area 74. The processor 73 generates an area record $R_{AR1}$ from the program tables $PG_1$ and $PG_2$ in the working area 74, and an area record $R_{AR2}$ from the program tables $PG_3$ and $PG_4$. The processor 73 stores the set of the area records $R_{AR1}$ and $R_{AR2}$ as such in the program DB storage section 23 as the program DB 76.

The user of the reception apparatus 6 is currently moving within the area $A_1$ (see FIG. 19). Furthermore, a preprogrammed program record $R_{RP}$ is generated in the area $A_1$ in a manner similar to the first embodiment. Thereafter, the user moves to the area $A_2$ while carrying the reception apparatus 6. The processor 63, which is executing the computer program 65, begins the process shown in FIG. 23 at a predetermined time before the broadcast start time in each preprogrammed program record $R_{RP}$. In a manner similar to step S11 described above, the processor 63 selects a relevant preprogrammed program record $R_{RP}$ (step S31), and acquires a broadcast channel CH (one of the broadcast channels $CH_1$ to $CH_4$) from the relevant preprogrammed program record $R_{RP}$ (step S32). Assuming that the relevant preprogrammed program record $R_{RP}$ is that which is exemplified in FIG. 7, the broadcast channel $CH_1$ is acquired.

As described above, in the mobile communication network 5, a base station in the area $A_1$ is regularly sending out position information $CP_1$, and a base station in the area $A_2$ is regularly sending out position information $CP_2$. In the reception apparatus 6, the CODEC 110 separates the position information $CP_1$ or $CP_2$ from the inputted multiplex signal, and stores the position information $CP_1$ or $CP_2$ in the working area 64, as in the first embodiment. Thus, the processor 63 acquires the position information $CP_1$ or $CP_2$ in the area $A_1$ or $A_2$ in which the reception apparatus 6 is currently located (step S33). Under the above assumptions, the position information $CP_2$ is acquired.

Next, the processor 63 generates a program table request $R_{UPG}$ which contains the acquired one of the broadcast channels $CH_1$ to $CH_4$ and the acquired position information $CP_1$ or $CP_2$ on the working area 64, and sends the generated program table request $R_{UPG}$, via the CODEC 110 and the wireless communication section 19, from the antenna 18 to the mobile communication network 5 (step S34). Under the above assumptions, a program table request $R_{UPG}$ that contains the broadcast channel $CH_1$ and the position information $CP_2$ is generated. Thereafter, the processor 63 waits to receive a personal program table $UPG_1$ or $UPG_2$ which is generated in the transmission apparatus 7 (step S35).

In the transmission apparatus 7, the transmission/reception section 21 stores the program table request $R_{UPG}$ which is received from the mobile communication network 5 into the working area 74. The processor 73, which is executing the computer program 75 in the program memory 72, begins the process shown by the flowchart of FIG. 26 once the program table request $R_{UPG}$ is stored into the working area 74.

First, the processor 73 extracts one of the broadcast channels $CH_1$ to $CH_4$ and the position information $CP_1$ or $CP_2$ from the program table request $R_{UPG}$ in the working area 74

(step S41). Under the above assumptions, the broadcast channel $CH_1$ and the position information $CP_2$ are extracted.

Next, in a manner similar to the aforementioned step S22, the processor 73 determines whether or not the generated area A of the relevant preprogrammed program record $R_{RP}$ coincides with the current area A (step S42). If generated area A and the current area A coincide, the process of FIG. 26 is completed because it is unnecessary to perform anything particular for the reception apparatus 6.

On the other hand, if it is determined at step S42 that both areas A do not coincide, the processor 73 accesses the program DB storage section 23 to select the area record $R_{AR1}$ or $R_{AR2}$ for the current area A as determined at step S42 (see FIG. 26) (step S43). Hereinafter, that which is selected at step S43 will be referred to as a "relevant area record $R_{AR}$". Under the above assumptions, the area record $R_{AR2}$ is selected as being relevant. Next, the processor 73 generates some units of program identification information $I_{PI}$ by using the relevant area record $R_{AR}$ (step S44). More specifically, in the relevant area record $R_{AR}$, the processor 73 selects a favorite program P of the user from among a plurality of programs P which are broadcast in the same time zone TP. Then, in order to determine the selected program P, the processor 73 extracts, from the program DB 76, a set including a broadcast channel CH, a program title PT, a program code PC, and a time zone TP, as program identification information $I_{PI}$. The processor 73 executes such a process with respect to every time zone TP. The method for selecting a user's favorite program P at step S44 will be specifically described in a subsequent embodiment. In the second embodiment, it is assumed that program identification information $I_{PI1}$ which is composed of the broadcast channel $CH_3$, the program title $PT_6$, the program code $PC_6$ and the time zone $TP_1$, and program identification information $I_{PI2}$ which is composed of the broadcast channel $CH_4$, the program title $PT_9$, the program code $PC_9$, and the time zone $TP_4$ are generated from the relevant area record $R_{AR2}$ as the program identification information $I_{PI}$.

Figures 27, 28:
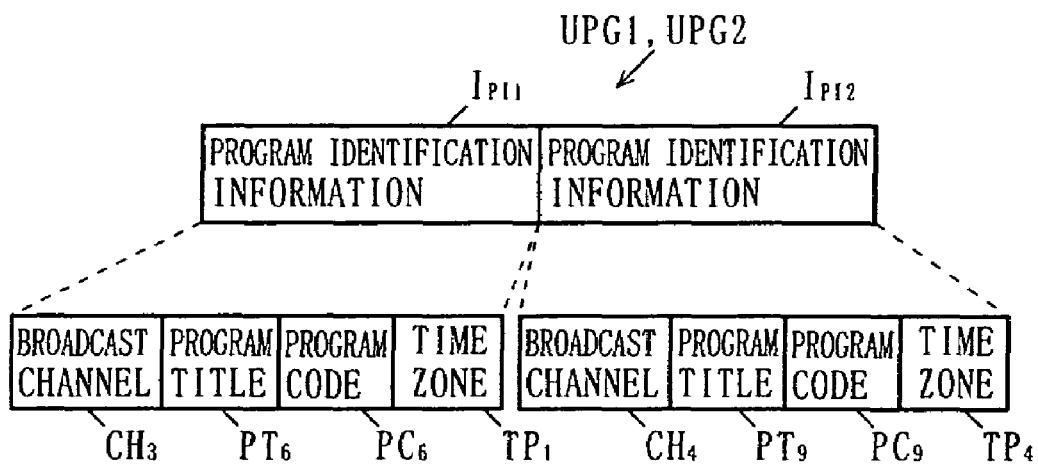
FIG. 27 is a schematic diagram illustrating a personal program table $UPG_1$ or $UPG_2$ generated by a processor 73 in FIG. 24.
FIG. 28 is a schematic diagram illustrating a personal program table $UPG_1$ or $UPG_2$ displayed by a display device 15 in FIG. 22.

Next, the processor 73 arranges the units of program identification information $I_{PI}$ generated at step S44 on the working area 74 in such a manner that the time zones TP become contiguous, thereby generating a personal program table $UPG_1$ or $UPG_2$ as shown in FIG. 27 (step S45). Under the above assumptions, as exemplified in FIG. 27, a personal program table $UPG_2$ is generated which is composed of the program identification information $I_{PI1}$ and $I_{PI2}$. Next, the processor 73 sends the generated personal program table $UPG_1$ or $UPG_2$ onto the mobile communication network 5 via the transmission/reception section 21 (step S46). Once step S46 is completed, the process of FIG. 26 is completed.

Figure 23:
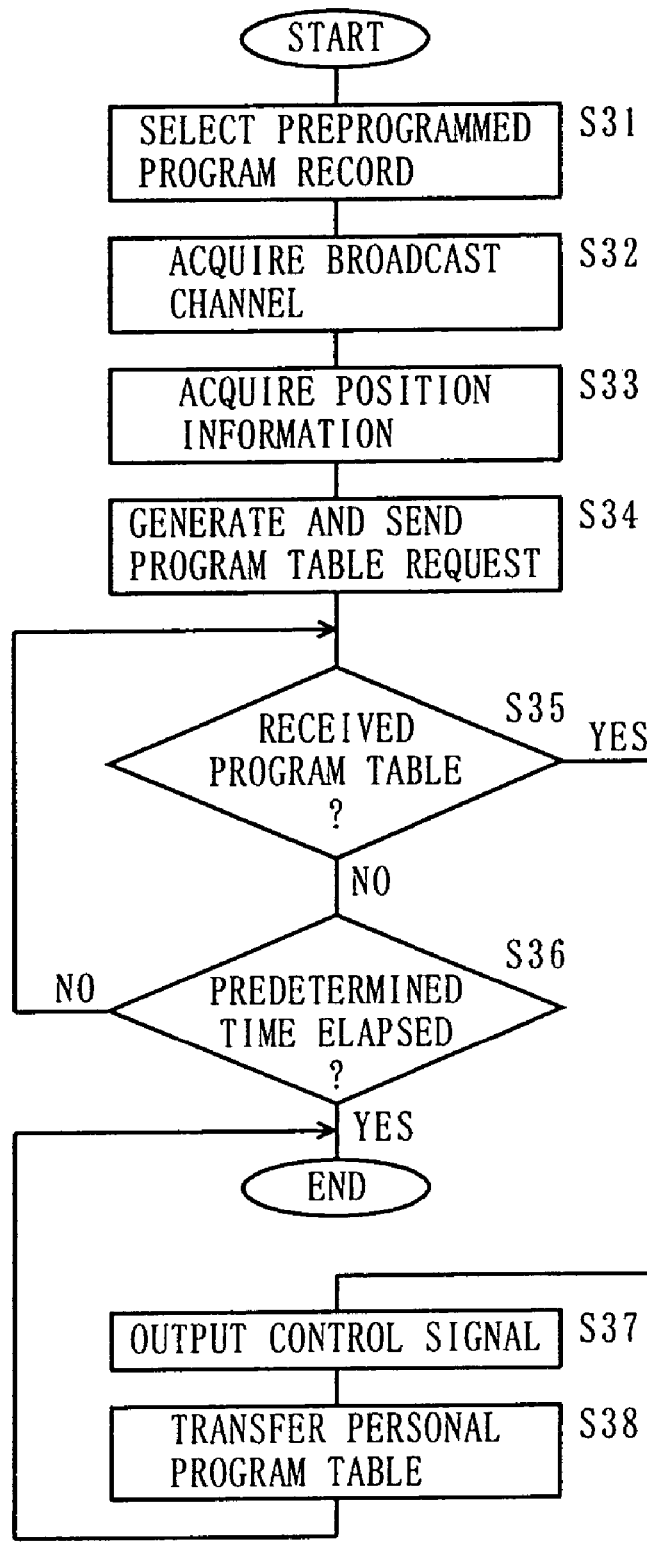
FIG. 23 is a flowchart illustrating a processing procedure of a processor 63 in FIG. 22.

As described above, the processor 63 of the reception apparatus 6 is waiting to receive at step S34 the personal program table $UPG_1$ or $UPG_2$, and upon determining that this has not been received, determines whether or not a predetermined time has elapsed since the sending of the program table request $R_{UPG}$ (step S36). If the predetermined time has elapsed, the processor 63 determines that the generated area A has not been exited, and the process of FIG. 23 is completed. On the other hand, if the predetermined time has not elapsed, the processor 63 again performs step S35.

The personal program table $UPG_1$ or $UPG_2$ which is sent out at step S46 is received by the antenna 18 of the reception apparatus 6 via the mobile communication network 5, and is thereafter stored into the working area 64 via the wireless communication section 19 and the CODEC 110. Based on this storage, the processor 63 determines that the personal program table $UPG_1$ or $UPG_2$ was received at step S35, generates a control signal $S_{SB}$, and outputs the generated control signal $S_{SB}$ to the image switching section 14 (step S37). The control signal $S_{SB}$ is a signal for switching the input line of the image switching section 14 to the side of the control section 61. In accordance with the received control signal $S_{SB}$, the image switching section 14 switches the input line to the side of the control section 61.

Next, the processor 63 transfers the program table $UPG_1$ or the $UPG_2$ in the working area 64 to the image switching section 14 (step S38). As a result, the program table $UPG_1$ or $UPG_2$ is inputted to the display device 15 via the image switching section 14. As shown in FIG. 28, the display device 15 displays the received personal program table $UPG_1$ or $UPG_2$.

As described above, according to the second embodiment, the transmission apparatus 7 determines that the reception apparatus 6 has moved from the generated area A to another area (current area) A, and transmits the personal program table $UPG_1$ or $UPG_2$ which is composed of those of the programs P being broadcast in the current area A which are favorites of a user. The reception apparatus 6 displays the personal program table $UPG_1$ or $UPG_2$ which has been sent from the transmission apparatus 7. As a result, even if the user has moved into another area A without knowing, the personal program table $UPG_1$ or $UPG_2$ which is valid in the current area can be automatically received and displayed, whereby an easier-to-use reception apparatus 6 can be realized.

In the above description, the timing for sending the program table request $R_{UPG}$ essentially falls a predetermined time before the broadcast start time of the program P which is preprogrammed for viewing. This can contribute to the reduction of the frequency of sending the program table requests $R_{UPG}$. In other words, the traffic on the mobile communication network 5 can be reduced. However, the present invention is not limited thereto. The timing for sending the program table request $R_{UPG}$ may come immediately after a movement of the reception apparatus 6 from the generated area A to the current area A is detected. In this case, although the frequency of sending the program table requests $R_{UPG}$ becomes relatively high, the user can promptly acquire the personal program table $UPG_1$ or $UPG_2$ which is valid in the current area A.

After moving to the current area A, the user may go back to the generated area A. Therefore, it is preferable that the reception apparatus 6 saves the personal program table $UPG_1$ or $UPG_2$ acquired in the generated area A in a predetermined memory area. As a result, when the user returns to the original area A, the processor 63 can display the saved personal program table $UPG_1$ or $UPG_2$ without having to newly transmit a program table requests $R_{UPG}$ to the transmission apparatus 7.

The above-described second embodiment illustrates an example where the reception apparatus 6 and the transmission apparatus 7 are applied to a terrestrial broadcast system. However, the reception apparatus 6 may perform the process shown in FIG. 23 also in the case where the programs $P_1$ to $P_{10}$ are receivable in a satellite broadcast system.

In the above-described second embodiment, the reception apparatus 6 employs the position information $CP_1$ or $CP_2$ from the mobile communication network 5 when generating the program table request $R_{UPG}$. However, the present invention is not limited thereto. The reception apparatus 6 may generate the program table request $R_{UPG}$ by employing a current position which is calculated by using information from the GPS (Global Positioning System), or may generate the program table request $R_{UPG}$ by employing a current position which is detected by using a so-called autonomous navigation sensor.

In the above-described second embodiment, the transmission apparatus 6 determines the movement of the reception apparatus 1 from the generated area A to the current area A based on the broadcast channel $CH_1$ or $CH_2$ and the position information $CP_1$ or $CP_2$ contained in the received program table request $R_{UPG}$. However, the present invention is not limited thereto. Since the transmission apparatus 7 generates the program table $UPG_1$ or $UPG_2$ every time the reception apparatus 6 moves, it is possible to memorize the generated area A of the reception apparatus 6. Then, the reception apparatus 6 may generate a program table request $R_{UPG}$ which only contains the position information $CP_1$ or $CP_2$, and send the generated program table request $R_{UPG}$ to the transmission apparatus 7. In this case, the transmission apparatus 7 can recognize that the reception apparatus 6 has moved from the generated area A to the current area A based on the memorized generated area A and the received position information $CP_1$ or $CP_2$.

In the above-described second embodiment, the transmission apparatus 7 generates the personal program table $UPG_1$ or $UPG_2$ after determining that the reception apparatus 6 has moved to the current area A by using the broadcast channel $CH_1$ or $CH_2$ and the position information $CP_1$ or $CP_2$. However, the present invention is not limited thereto. The transmission apparatus 7 can determine the broadcast programs P in the broadcast area (current area)$A_1$ or $A_2$ in which the reception apparatus 6 is currently located, from the position information $CP_1$ or $CP_2$ alone. From the broadcast program P thus determined, the transmission apparatus 7 can generate the personal program table $UPG_1$ or $UPG_2$ for the current area $A_1$ or $A_2$.

Variant of Second Embodiment

Figure 29:
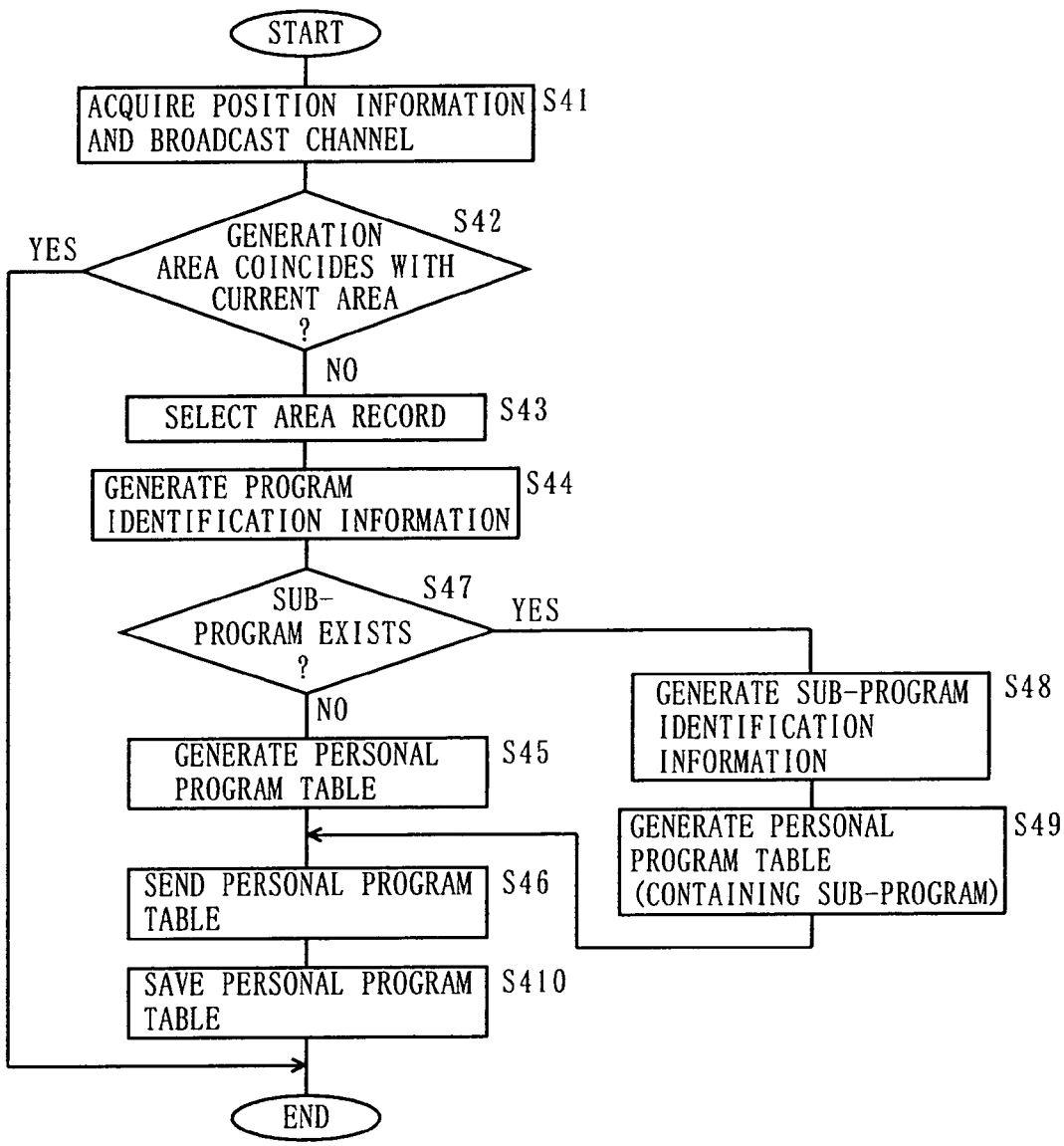
FIG. 29 is a flowchart illustrating a variant of the process which is performed by a processor 73 in FIG. 24.

Next, a variant of the process of the processor 73 will be described. FIG. 29 is a flowchart illustrating a variant processing procedure of the processor 73. FIG. 29 differs from FIG. 25 in that steps S47 to S410 are further comprised. Since there are no other differences between these two flowcharts, identical step numbers are given to any steps in FIG. 29 that correspond to those in FIG. 25, and the descriptions thereof are omitted.

In FIG. 29, in response to the receiving of a given program table request $R_{UPG}$, the processor 73 of the transmission apparatus 7 generates and sends out the program table $UPG_1$ or $UPG_2$ (steps S44 and S45), and thereafter saves the presently-generated personal program table $UPG_1$ or $UPG_2$ in a predetermined recording area (e.g., the working area 74) (step S410).

Thereafter, in response to the receiving of another program table request $R_{UPG}$, as described above, the processor 73 generates some units of program identification information $I_{PI}$ (step S44). Thereafter, the processor 73 determines whether or not there is any program code PC in the area record $R_{AR}$ selected at step S43 that coincides with a program code PC contained in the program table $UPG_1$ or $UPG_2$ which is saved at a previous operation of step S48 but which has not been selected at step S44 (step S47). In other words, it is determined whether or not a program P which was described in the program table $UPG_1$ or $UPG_2$ in the previous area A is being broadcast in the current area A. Hereinafter, a program P which is described in the previous program table $UPG_1$ or $UPG_2$ but not in the current program table $UPG_1$ or $UPG_2$ and which is broadcast in the area A will be referred to as a "sub-program P".

If it is determined that no such sub-program P exists, the processor 73 performs the steps from S44. On the other hand, if it is determined that such a sub-program P exists, the processor 73 generates some units of sub-program identification information $I_{SPI}$ by using the relevant area record $R_{AR}$ (step S48). More specifically, with respect to the relevant area record $R_{AR}$, in order to determine the sub-program P determined at step S46, the processor 73 extracts, from the program DB 76, a set including a broadcast channel CH, a program title PT, a program code PC, and a time zone TP as program identification information $I_{SPI}$. The processor 73 executes such a process with respect to every sub-program P.

Figure 30:
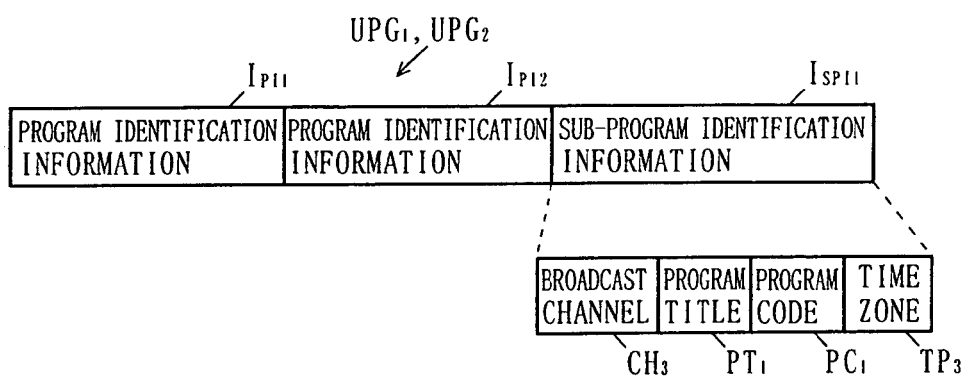
FIG. 30 is a schematic diagram illustrating a personal program table $UPG_1$ or $UPG_2$ which is generated by the process of FIG. 29.

Next, at step S48, the processor 73 arranges the units of program identification information $I_{PI}$ generated at step S44 and the units of sub-program identification information $I_{SPI}$ generated at step S48 on the working area 74 in such a manner that the time zones TP become contiguous, thereby generating the personal program table $UPG_1$ or $UPG_2$ as shown in FIG. 30 (step S49).

For example, in the case where the program table $UPG_1$ generated in the area $A_1$ describes the program $P_1$ (broadcast channel $CH_1$, the program title $PT_1$, the program code $PC_1$, and the time zone $TP_1$), if the reception apparatus 6 moves to the area $A_2$, the program $P_1$ will be broadcast in the time zone $TP_3$ by using the broadcast channel $CH_3$ (see FIG. 21). Therefore, at step S48, a set including the broadcast channel $CH_3$, the program title $PT_1$, the program code $PC_1$, and the time zone $TP_3$ is generated as sub-program identification information $I_{SPI}$. Furthermore, at step S49, a program table $UPG_2$ containing such sub-program identification information $I_{SPI}$ is generated.

After step S49 as described above is completed, the processor 73 sends the generated personal program table $UPG_1$ or $UPG_2$ onto the mobile communication network 5 via the transmission/reception section 21 (step S46). Once step S46 is completed, the process of FIG. 29 is completed.

As described above, according to the present variant, the transmission apparatus 7 can transmit the program table $UPG_1$ or $UPG_2$ containing a sub-program P to the reception apparatus 6. Therefore, the user of the reception apparatus 6 can acquire a program table $UPG_1$ or $UPG_2$ which is easier to use.

Third Embodiment

Figure 32:
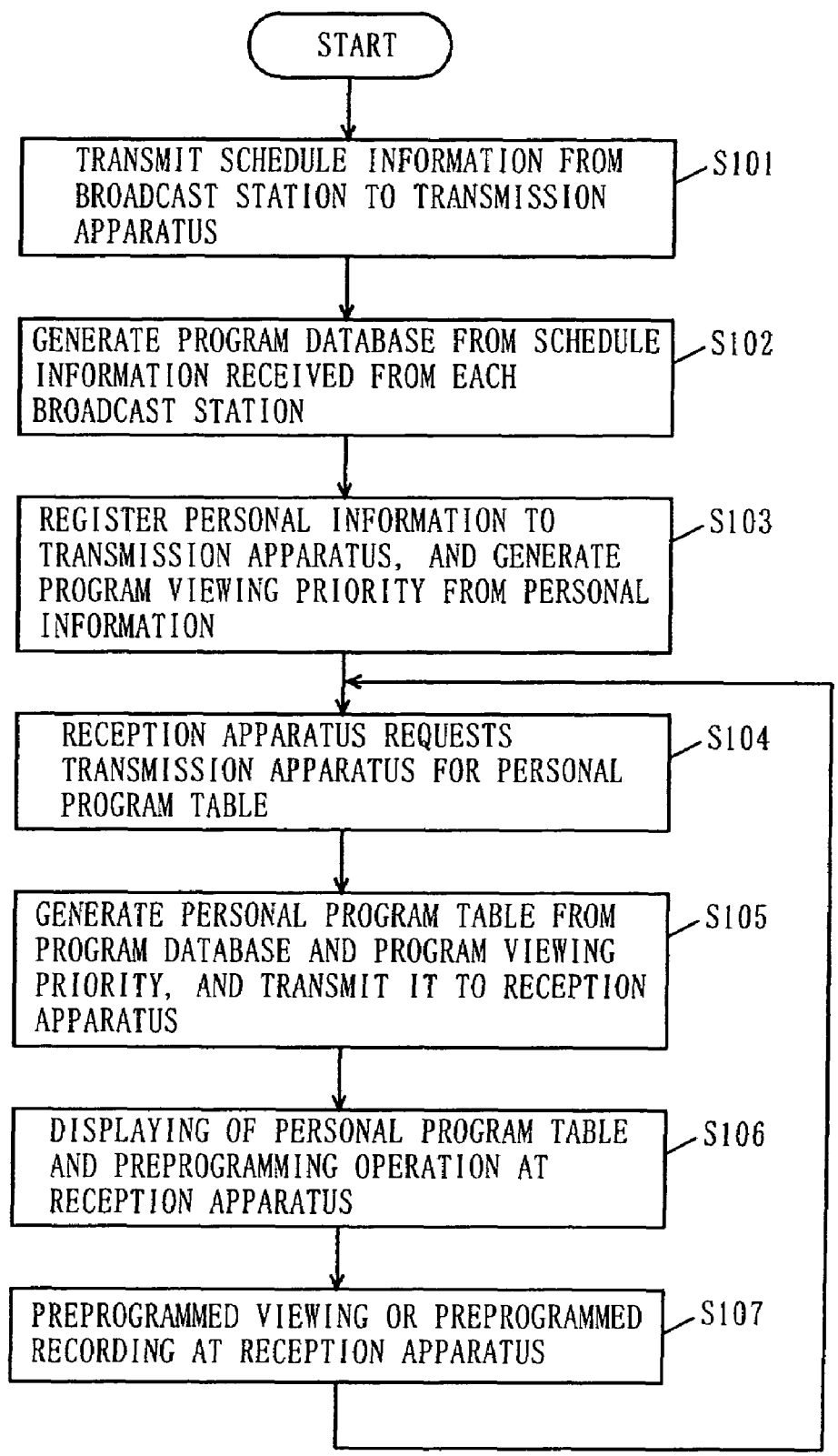
FIG. 32 is a flowchart illustrating an outline of a process which is performed by the data communication system shown in FIG. 31.

Next, with reference to FIG. 31 and FIG. 32, an outline of a data communication system according to a third embodiment of the present invention will be described. FIG. 31 is a schematic diagram illustrating the structure of the present data communication system. In FIG. 31, the data communication system comprises at least one reception apparatus 101, at least one transmission apparatus 102, and a plurality of broadcast stations 103 (only one is shown in FIG. 31). FIG. 32 is a flowchart illustrating an outline of a process which is performed by the present data communication system.

In FIG. 32, each broadcast station 103 transmits schedule information $I_{sch}$ of programs P which are broadcast by itself to the transmission apparatus 102, via a communication network 104 such as the Internet (step S101). Using the schedule information $I_{SCH}$ received by each broadcast station 103, the transmission apparatus 102 generates a program database (hereinafter "program DB" (Data Base)) representing broadcast programs P which are going to be broadcast by each broadcast station 103, with respect to each broadcast channel CH and time T which is previously uniquely assigned to each broadcast station 103 (step S102).

In order to enjoy a distribution service of a personal program table, a user of the reception apparatus 101 contracts an agreement with a program information servicing company which operates the transmission apparatus 102. At this time, the user notifies personal information, such as his/her age, gender, occupation, hobbies, favorite programs, favorite sports, favorite celebrities, to the program information servicing company. The program information servicing company registers the notified personal information to a personal information database (hereinafter referred to as the "personal information DB") in the transmission apparatus 102. Furthermore, the program information servicing company selects from within the notified personal information genres (categories) of programs P which the user is interested in viewing, generates a program viewing priority PL indicating the order of precedence of respective genres, and registers the generated program viewing priority PL to the personal information DB (step S103).

Next, prior to viewing a broadcast program P, the viewer operates the reception apparatus 101 in order to receive a distribution service of a personal program table. In response to this operation, the reception apparatus 101 requests the transmission apparatus 102 for a personal program table UPG via the mobile communication network 105 (step S104).

When receiving a request for a personal program table UPG, the transmission apparatus 102 performs an authentication process to identify the user. Furthermore, in the personal information DB, the transmission apparatus 102 generates a personal program table UPG which is suitable for the preferences of the user, based on the program DB and the program viewing priority PL of the presently identified user. Thereafter, the transmission apparatus 102 transmits the presently-generated personal program table UPG to the reception apparatus 101 via the mobile communication network 105 (step S105).

The reception apparatus 101 receives the personal program table UPG via the mobile communication network 105, and displays the received personal program table UPG. The user refers to the displayed personal program table UPG to select a program P which the user desires to view, and performs an operation which is necessary for a preprogramming of a viewing. As a result, in the reception apparatus 101, preprogrammed program information which is necessary for the preprogrammed viewing is generated (step S106).

When a time designated at the time of the preprogramming of a viewing is reached, the reception apparatus 101 sets itself in a state to be capable of receiving the broadcast program P from the broadcast channel CH as preprogrammed for viewing, and receives and reproduces the broadcast program P (step S107). Thereafter, steps S104 to S107 are repeatedly performed.

Figure 33:
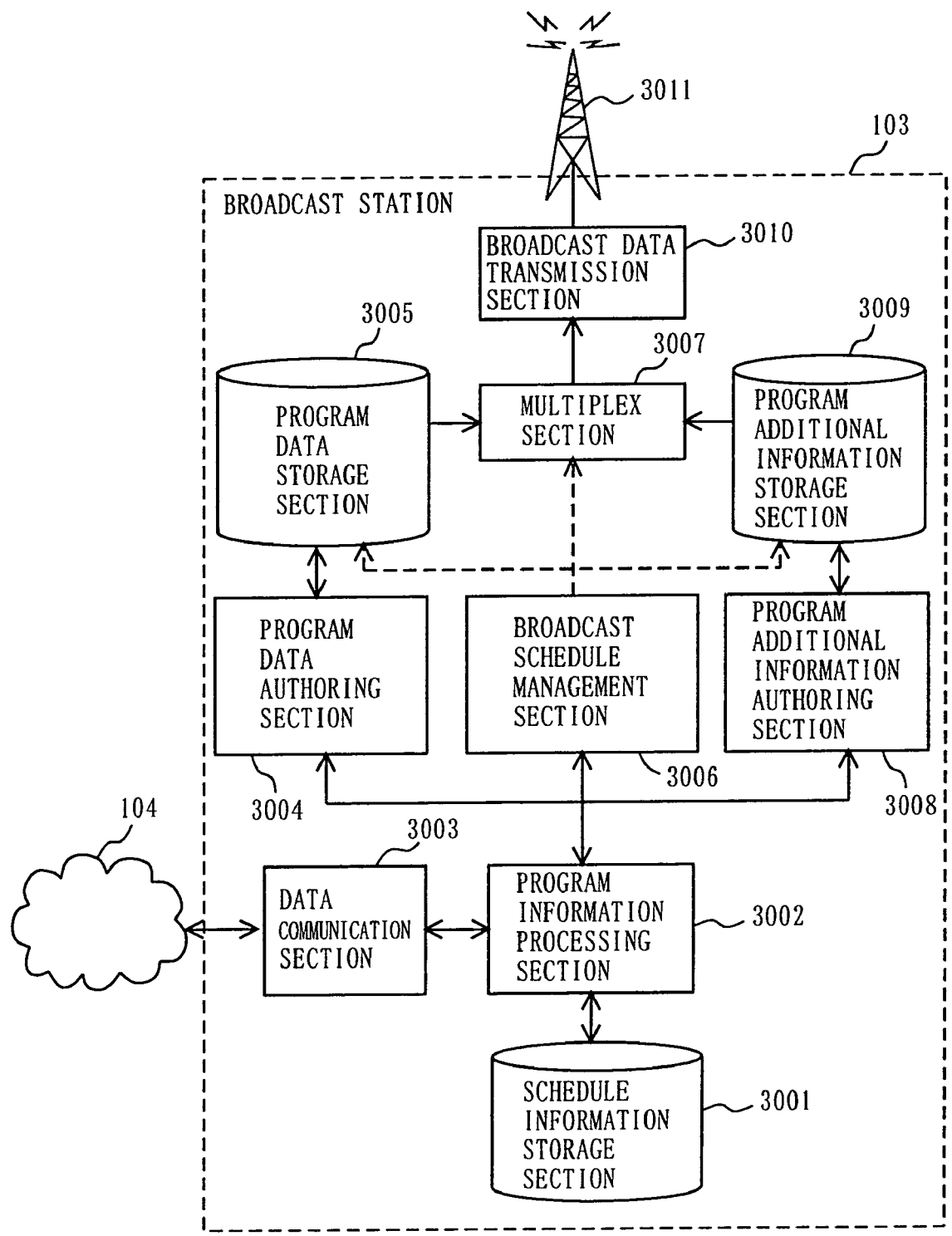
FIG. 33 is a block diagram illustrating a detailed structure of each broadcast station 103 shown in FIG. 31.
Figure 34:
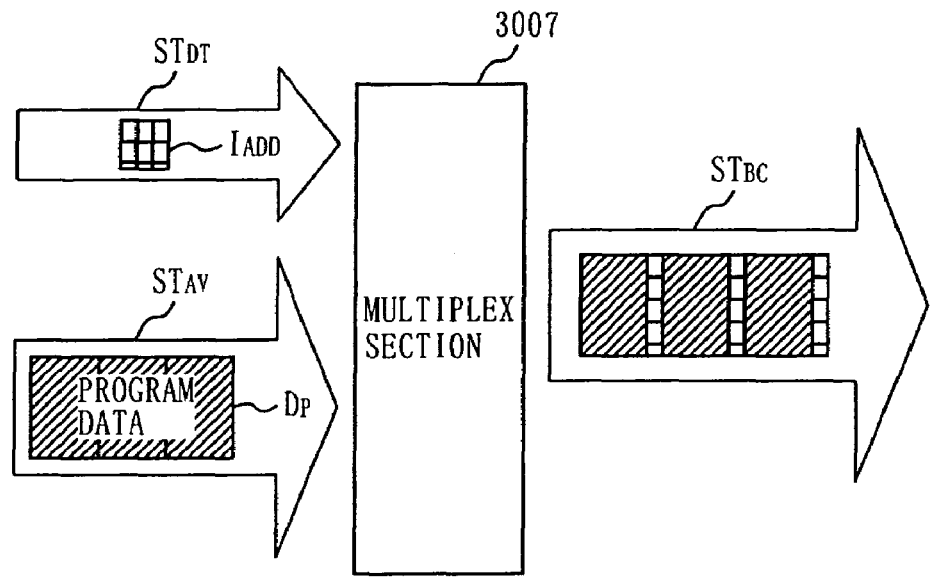
FIG. 34 is a schematic diagram illustrating an outline of a process which is performed by each broadcast station 103 in FIG. 31.
Figure 35:
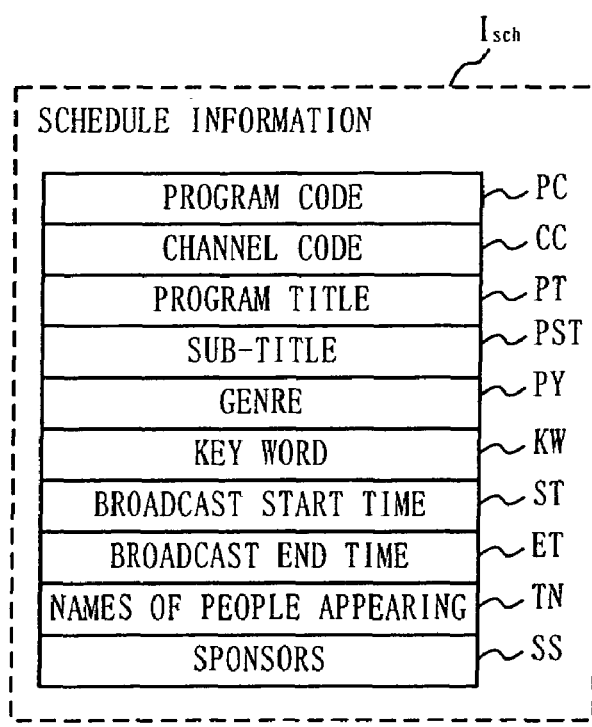
FIG. 35 is a schematic diagram illustrating schedule information $I_{sch}$ which is transmitted by each broadcast station 103 in FIG. 31 to a transmission apparatus 102.

Next, with reference to FIG. 33 to FIG. 35, the broadcast station 103 will be described. FIG. 33 is a block diagram illustrating a detailed structure of each broadcast station 103 shown in FIG. 31. FIG. 34 is a schematic diagram illustrating an outline of a process which is performed by each broadcast station 103 in FIG. 31. FIG. 35 is a schematic diagram illustrating schedule information $I_{sch}$ which is transmitted by each broadcast station 103 in FIG. 31 to the transmission apparatus 102.

First, as shown in FIG. 34, as generally practiced in digital broadcasting, a video audio stream $ST_{AV}$ for broadcasting video and audio and a data broadcast stream $ST_{DT}$ for providing additional services employing still images and/or graphics are multiplexed by the multiplex section 3007, whereby a broadcast stream $ST_{BC}$ is constructed. Herein, the video audio stream $ST_{AV}$ is composed of header information $I_{HD}$ and program data $D_P$ representing a program P. Such a broadcast stream $ST_{BC}$ is broadcast as a broadcast wave from the broadcast station 103, by using a broadcast channel CH.

As shown in FIG. 33, the broadcast station 103 comprises: a program data authoring section 3004 for authoring the program data $D_P$; a program data storage section 3005 for storing program data $D_P$; a program additional information authoring section 3008 for authoring program additional information $I_{ADD}$; and a program additional information storage section 3009 for storing the program additional information $I_{ADD}$. The broadcast station 103 further comprises: a multiplex section 3007 for multiplexing the stored program data $D_P$ and the program additional information $I_{ADD}$ under the control of a broadcast schedule management section 3006 so as to generate the broadcast stream $ST_{BC}$; a broadcast data transmission section 3010 for outputting the generated broadcast stream $ST_{BC}$ as a broadcast wave to a broadcast antenna 3011; and the broadcast antenna 3011 for sending a broadcast wave onto the broadcast channel CH. The broadcast station 103 further comprises: a schedule information storage section 3001 for storing the schedule information $I_{sch}$; a schedule information transmission control section (program information processing section) 3002 for exerting control over the transmission of the stored schedule information $I_{sch}$ to the transmission apparatus 102 with a predetermined timing; and a data communication section 3003 for sending the schedule information $I_{sch}$ which has been read onto the communication network 104 under the control of the schedule information control section 3002.

As shown in FIG. 35, the schedule information $I_{sch}$ is typically composed of: a program code PC which identifies a broadcast program P; a channel code CC which identifies a broadcast channel CH; a program title PT of the program P; a sub-title PST of the program P; a genre (category) PY of the program P; a key word KW which is necessary for searching for the program P; a broadcast start time ST and a broadcast end time ET of the program P; names TN of people appearing in the program P; and sponsors SS.

Figure 36:
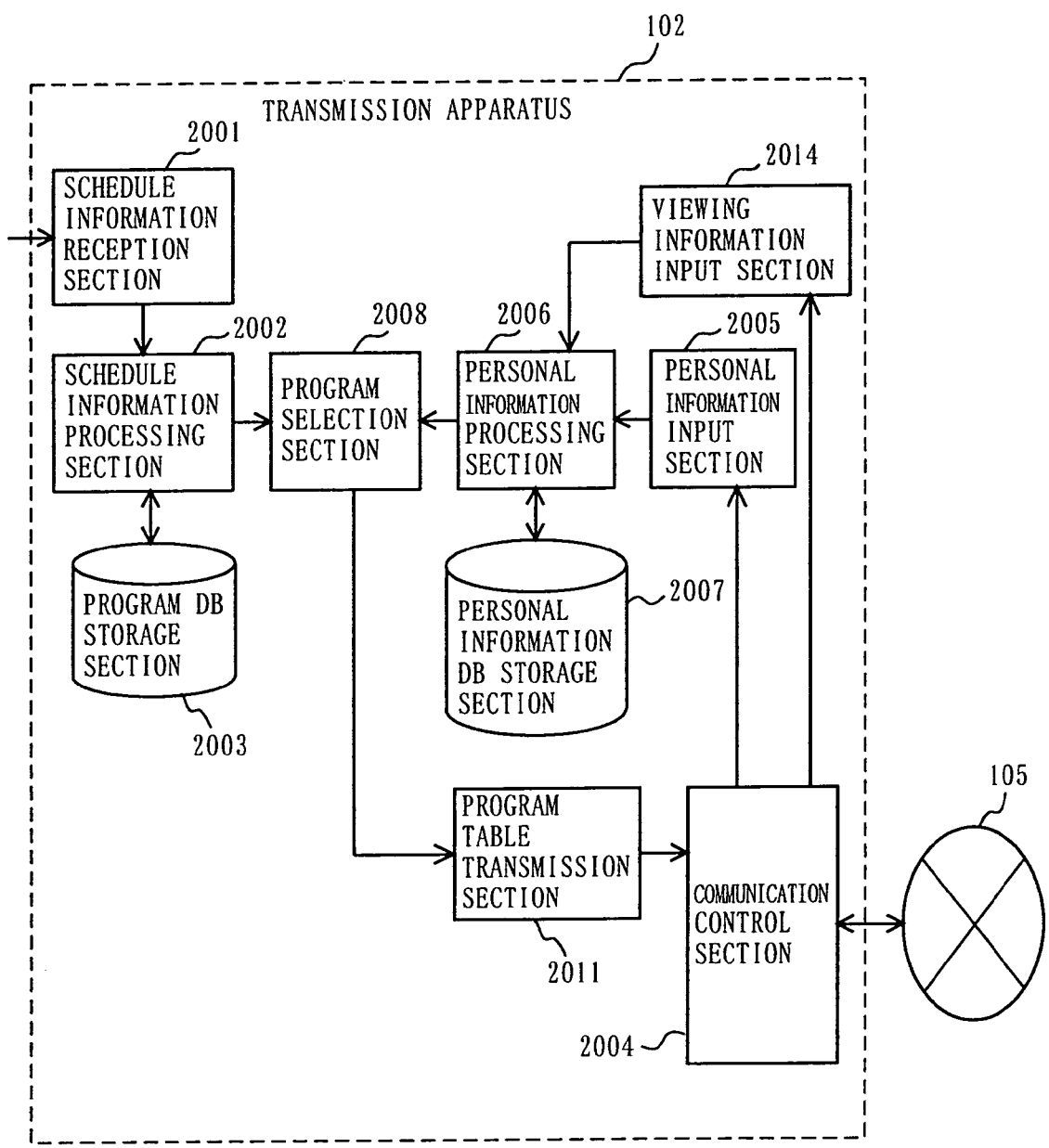
FIG. 36 is a block diagram illustrating a detailed structure of a transmission apparatus 102 shown in FIG. 31.
Figure 38:
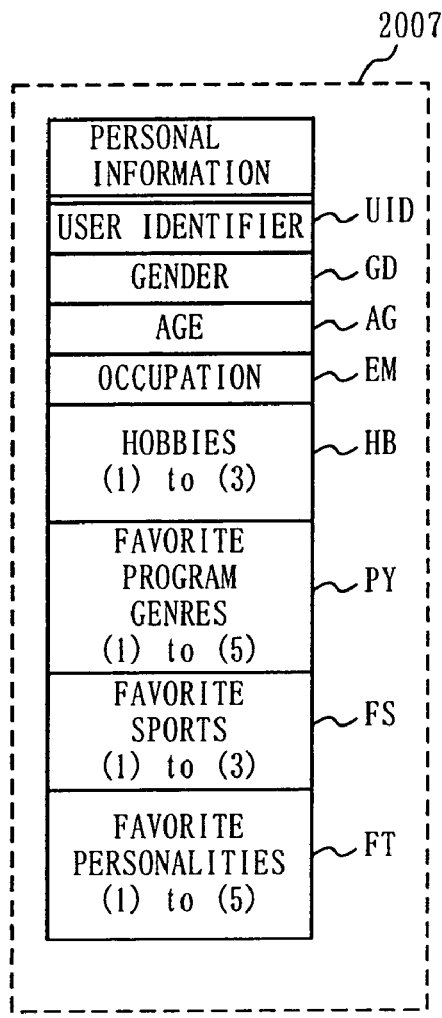
FIG. 38 is a schematic diagram illustrating an exemplary structure of a personal information DB stored in a transmission apparatus 102 in FIG. 36.
Figure 39:
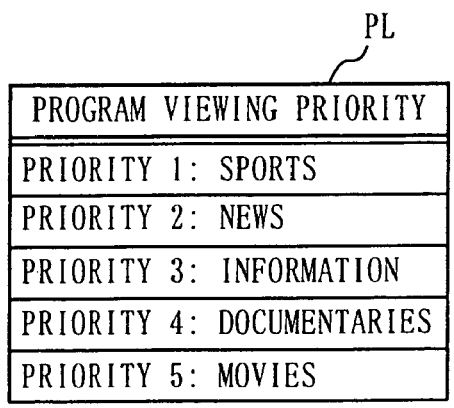
FIG. 39 is a schematic diagram illustrating an exemplary structure of program viewing priority PL stored in a transmission apparatus 102 in FIG. 36.
Figure 40:
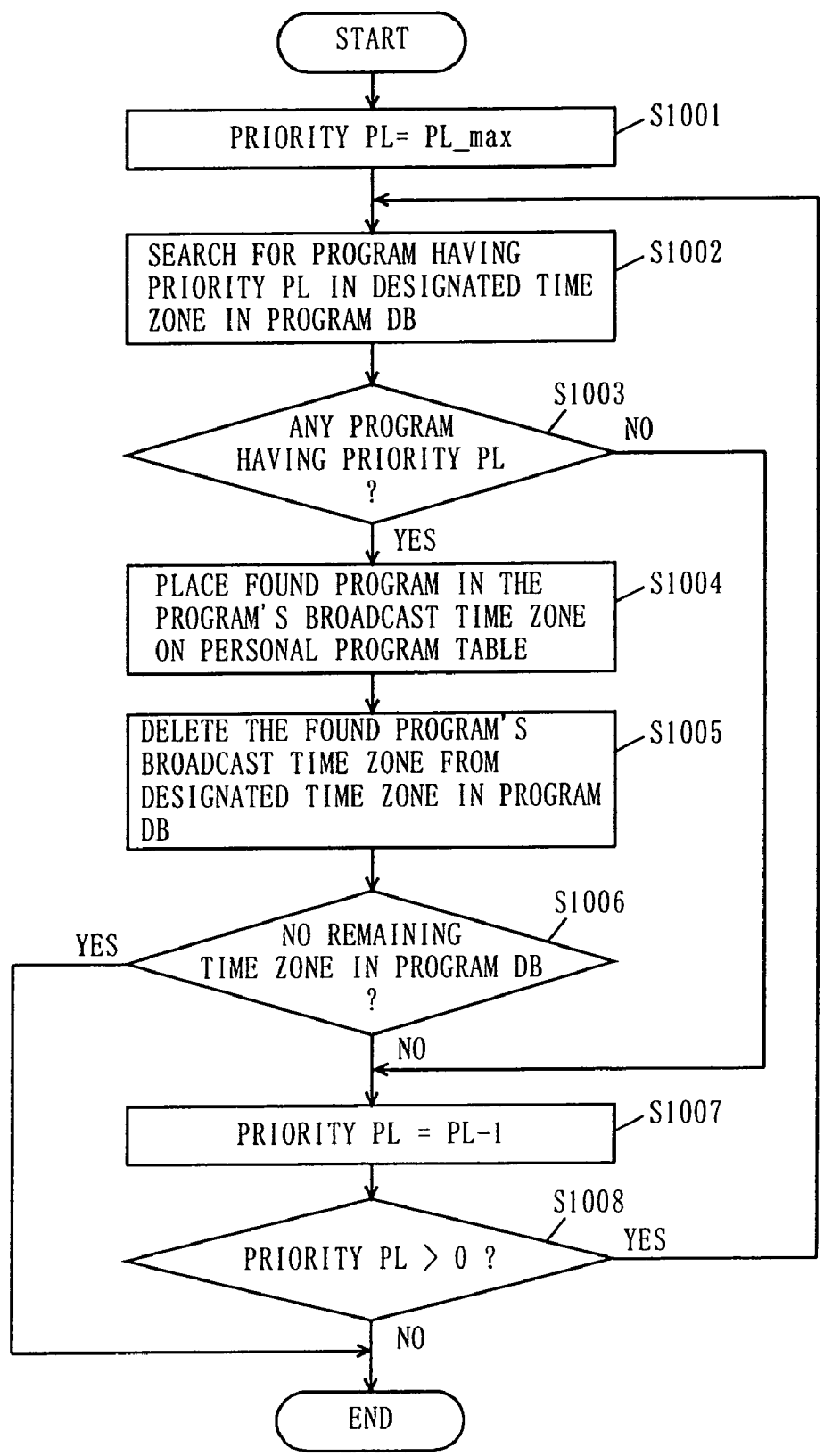
FIG. 40 is a flowchart illustrating a processing procedure of a program selection which is executed by a transmission apparatus 102 in FIG. 36.
Figure 41:
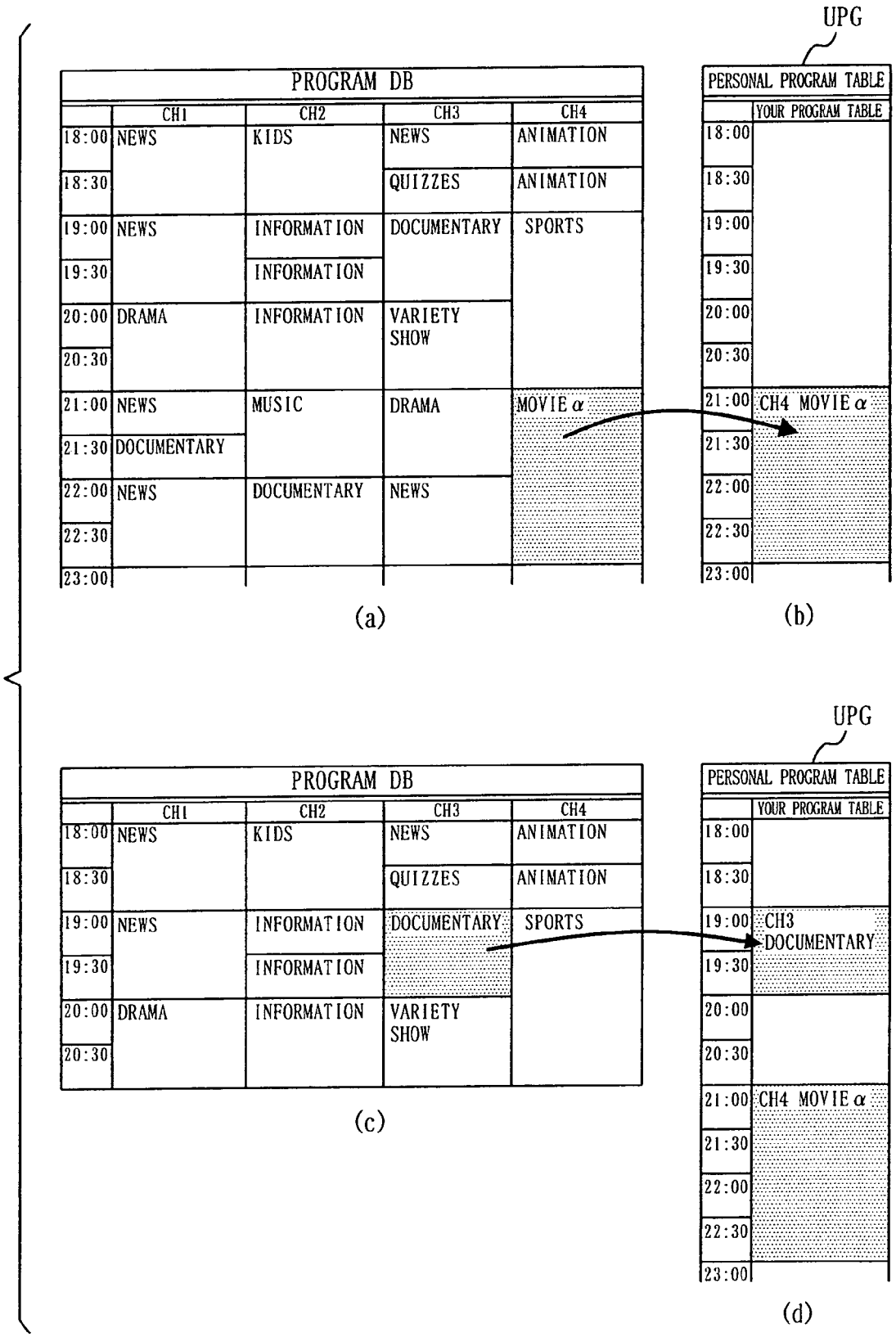
FIG. 41 is a schematic diagram for explaining an exemplary program selection process in FIG. 40.

Next, the transmission apparatus 102 will be described with reference to FIG. 36 to FIG. 42. FIG. 36 is a block diagram illustrating a detailed structure of the transmission apparatus 102 shown in FIG. 31. FIG. 37 is a schematic diagram illustrating an exemplary structure of a program DB which is stored in the transmission apparatus 102. FIG. 38 is a schematic diagram illustrating an exemplary structure of a personal information DB which is stored in the transmission apparatus 102. FIG. 39 is a schematic diagram illustrating an exemplary structure of program viewing priority PL which is stored in the transmission apparatus 102. FIG. 40 is a flowchart illustrating a processing procedure of a program selection which is executed by the transmission apparatus 102. FIG. 41 is a schematic diagram illustrating an exemplary program selection process in FIG. 40. FIG. 42 is a schematic diagram exemplifying a personal program table UPG which is generated by the transmission apparatus 102.

As shown in FIG. 36, the transmission apparatus 102 receives, at a schedule information reception section 2001, the schedule information $I_{sch}$ which is transmitted from each broadcast station 103, and, via a schedule information processing section 2002, stores a program DB which is capable of uniquely identifying broadcast programs P from each broadcast station 103 with respect to each broadcast channel CH and a time T, as shown in FIG. 37, into a program DB storage section 2003.

Prior to the distribution service of the personal program table, the user contracts an agreement with the program information servicing company which operates the transmission apparatus 102, as described above. Thereafter, the program information servicing company registers the personal information which was notified from the user at the time of the agreement in the personal information DB which is stored in a personal information DB storage section 2007. In the third embodiment, as shown in FIG. 38, the personal information is composed of a user identifier UID which is assigned to the user after the agreement, the user's gender GD, age AG, occupation EM, hobby HB, the genres (categories) PY of his/her favorite programs, favorite sports FS, and favorite celebrities (personalities) FT. As for hobbies HB, genres PY of favorite programs, favorite sports FS and favorite celebrities FT, a plurality of items are registered with an order of precedence given to each.

As for the personal information, the user may describe it on a paper form and send it to the program information servicing company, and the program information servicing company may register the personal information in the personal information DB in accordance with the received paper form. Alternatively, personal information which has been inputted by the user by operating the reception apparatus 101 may be transmitted to the transmission apparatus 102 via the mobile communication network 105, and at the transmission apparatus 102, the received personal information may be registered to the personal information DB via a communication control section 2004, a personal information input section 2005, and a personal information processing section 2006. Alternatively, a user may directly register personal information to the personal information DB on a personal computer which is connected to the communication network 104. At the time of registering the personal information as such, priorities are assigned to the respective genres PY of favorites programs P of the user, and the genre-by-genre (category-by-category) PY priority is used as the program viewing priority PL as shown in FIG. 39.

Upon receiving a request from the reception apparatus 101 for a personal program table UPG a program selection section 2008 identifies the user's personal information in the personal information DB, and then generates a personal program table UPG from the identified personal information and the program DB. Next, with reference to FIG. 39 to FIG. 42, the operation of the program selection section 2008 will be described in detail. First, the program selection section 2008 sets the program viewing priority PL to a maximum value $PL_{max}$ (e.g., "5") (FIG. 40; step S1001).

Next, from the personal information DB, the program selection section 2008 reads a genre PY having a priority that is equal to the maximum value $PL_{max}$. Hereinafter, the genre PY which has been read will be referred to as the "relevant genre PY". Next, from the program ID, the program selection section 2008 searches for a program P of the relevant genre PY in a designated time zone m, which is determined by itself (step S1002). Herein, the "designated time zone m" is defined as a time zone which is necessary for constructing the personal program table UPG For example, if the designated time zone m is 18:00 to 23:00, a personal program table UPG for this duration is generated.

Next, if a program P is successfully found at step S1002 (step S1003), the program selection section 2008 places the title PT and the broadcast channel CH of the found program P in the broadcast time zone TP on the personal program table UPG (step S1004). For example, in the personal information DB exemplified in FIG. 39, the genre PY whose program priority PL is "5" is "movies". In this case, the program selection section 2008 searches for "movies" in the designated time zone m(=18:00 to 23:00) in the program DB. Then, since a movie α is going to be broadcast on the broadcast channel $CH_4$ for two hours from 21:00, the found title PT (the movie α) and the broadcast channel $CH_4$ are placed in the two-hour slot from 21:00 on the personal program table UPG; as shown in (a) and (b) of FIG. 41.

If the program P cannot be found at step S1002, the program selection section 2008 performs step S1007.

Next, the program selection section 2008 excludes the broadcast time zone TP of the program P found at step S1002 from the searched range, thus updating the designated time zone m (step S1005). For example, if the movie α from 21:00 to 23:00 is selected, as shown in (c) and (d) of FIG. 41, the designated time zone m is updated to 18:00 to 21:00, excluding the time zone from 21:00 to 23:00 in the program DB.

Next, the program selection section 2008 determines whether the remaining time of the updated designated time zone m is "0" (step S1006). If the remaining time is "0", the process of FIG. 40 is completed. If the remaining time is not "0", the program selection section 2008 decrements the program viewing priority PL by "1" (step S1007), and if the updated program viewing priority PL is PL>0 (step S1008), steps S1002 to S1008 are repeated. In the above example, since PL is updated so that PL=5−1=4 at step S1006, in the current run of steps S1002 to S1007, the programs P in the genre PY whose program viewing priority PL is "4" (i.e., "documentary") are searched for at step S1002 with respect to the range defined by the designated time zone m(=18:00 to 21:00). Then, since a documentary program β is found in a one-hour zone from 19:00 on the broadcast channel $CH_3$, the found title PT (the documentary β) and the broadcast channel $CH_3$ are placed at step S1004 in a one-hour slot from 19:00 on the personal program table UPG, as shown in the lower portion of FIG. 41.

The program selection section 2008 repeatedly executes steps S1002 to S1008 until the program viewing priority PL becomes "0" at step S1008. As a result, as shown in FIG. 42, a personal program table UPG is generated that includes a program, which has been selected from among the programs P which are broadcast on the plurality of broadcast channels CH based on the user's favorite genres PY, placed in each time zone TP. The generated personal program table UPG is sent from the communication control section 2004 onto the mobile communication network 105 via a program table transmission section 2011. The above process of FIG. 40 may also be applied to step S44 in the second embodiment.

Next, referring to FIG. 43, the reception apparatus 101 will be described. FIG. 43 is a block diagram illustrating a detailed structure of the reception apparatus 101. In FIG. 43, a broadcast wave from each broadcast station 103 is inputted from an antenna 1001 to a tuner 1002. After the tuner 1002 receives and demodulates the inputted broadcast wave, it is separated by a separation section 1003 into a video stream $ST_V$ and an audio stream $ST_A$ composing the program data $D_P$ and a data broadcast stream $ST_{DT}$, as shown in FIG. 34. The audio stream $ST_A$ is decoded by an audio reproduction section 1005 so as to be reproduced as an audio signal, and is then outputted by a loudspeaker 1006 as audio. The video stream $ST_V$ is decoded by a video reproduction section 1007, so as to be reproduced as a video signal. The data broadcast stream $ST_{DT}$ is reproduced by the data processing section 1008 as a video signal of a service screen which is expressed by still images and/or graphics. Thereafter, both video signals $ST_V$ and $ST_{DT}$ are synthesized by a display synthesis section 1009, and are then outputted by a display section 1010 as video. On the other hand, the personal program table UPG which has been transmitted from the transmission apparatus 102 is inputted from an antenna for mobile phones 1017 to a system control section 1004, via a mobile phone section 1016. The system control section 1004 constructs the personal program table UPG in a format supporting the display section 1010. The above personal program table UPG is subjected, by the display synthesis section 1009, to a synthesis with the video signal representing the program, or switching, and is thereafter displayed by the display section 1010.

Now, referring to FIG. 44, an exemplary displayed image of the personal program table UPG in the reception apparatus 101 will be described. As shown in (a) of FIG. 44, from the transmission apparatus 102, the reception apparatus 101 receives m hours of personal program table UPG (five hours of such is illustrated in (a) of FIG. 44), including the current time. As shown in (b) of FIG. 44, from the m hours of personal program table UPG n hours, i.e., a time which is displayable on the reception apparatus 101, of personal program table UPG (where m>n, two hours of such is illustrated in (b) of FIG. 44) is displayed by the display section 1010, being switched from the video of the program P by the synthesis section 1009. In order to display any extent of time beyond the currently-displayed time slot of personal program table UPG the user operates scroll keys of a key input section 1014 of the reception apparatus 101 so as to allow the relevant portion of the personal program table UPG to be displayed on the display section 1010, while moving the n hours of the displayed slot up and down.

Figure 44:
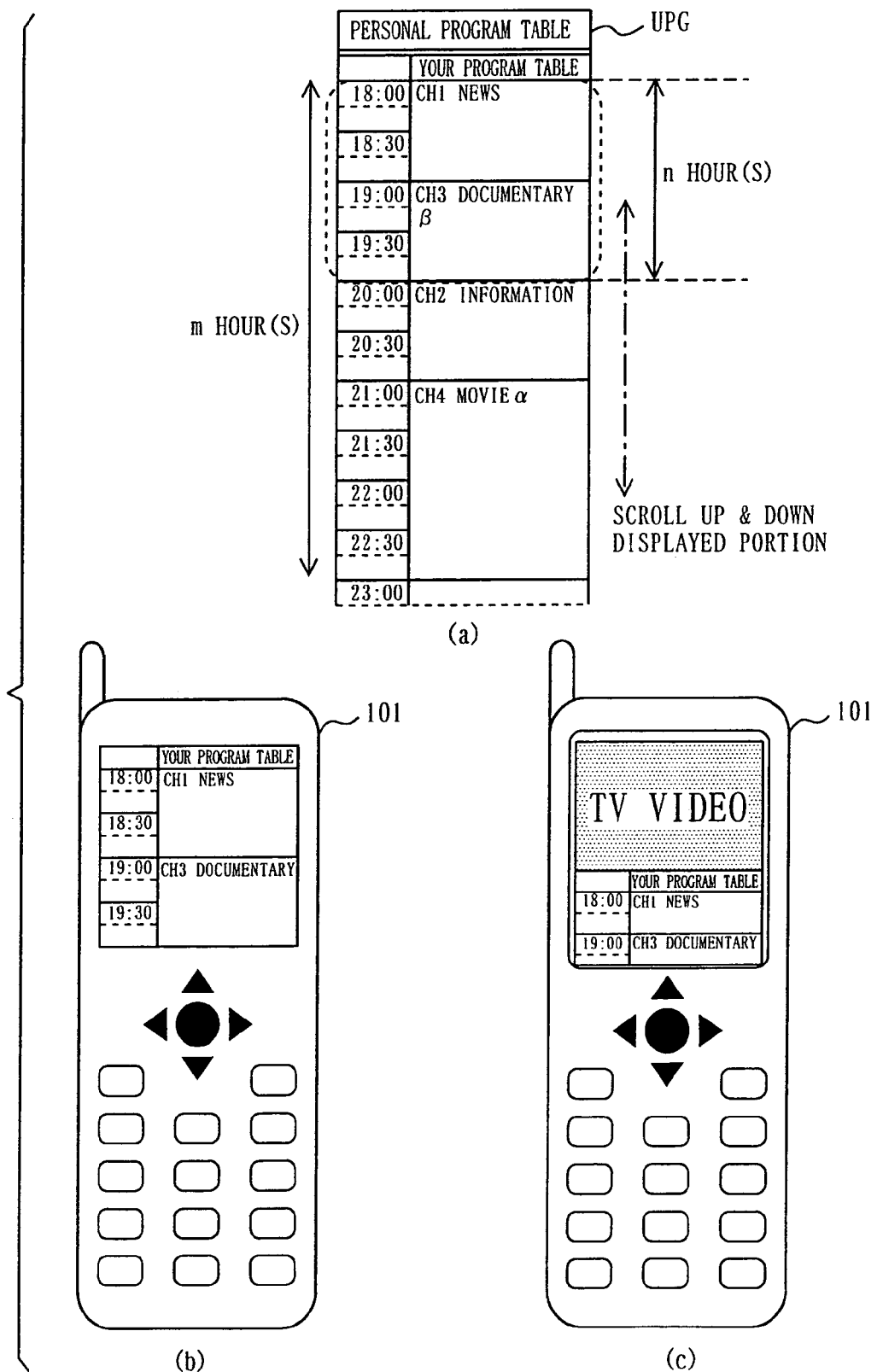
FIG. 44 is a schematic diagram illustrating an exemplary displayed image of a personal program table UPG on a reception apparatus 101 in FIG. 31.

The above description in reference to (b) of FIG. 44 illustrates a case where the video of the program P and the personal program table UPG are switched for display; however, as shown in FIG. 44(c), the n hours of slot out of the personal program table UPG may be displayed on the display section 1010 so as to come below the video of the program P, as synthesized by the display synthesis section 1009. In order to display any extent of time beyond the currently-displayed time slot of personal program table UPQ the user operates scroll keys in the up and down directions as above. FIG. 44 illustrates the personal program table UPG as being synthesized below the video of the program P, based on the assumption that the display section 1010 has a portrait-type screen; however, the personal program table UPG may be synthesized so as to be displayed to the side of the video of the program P.

Figure 45:
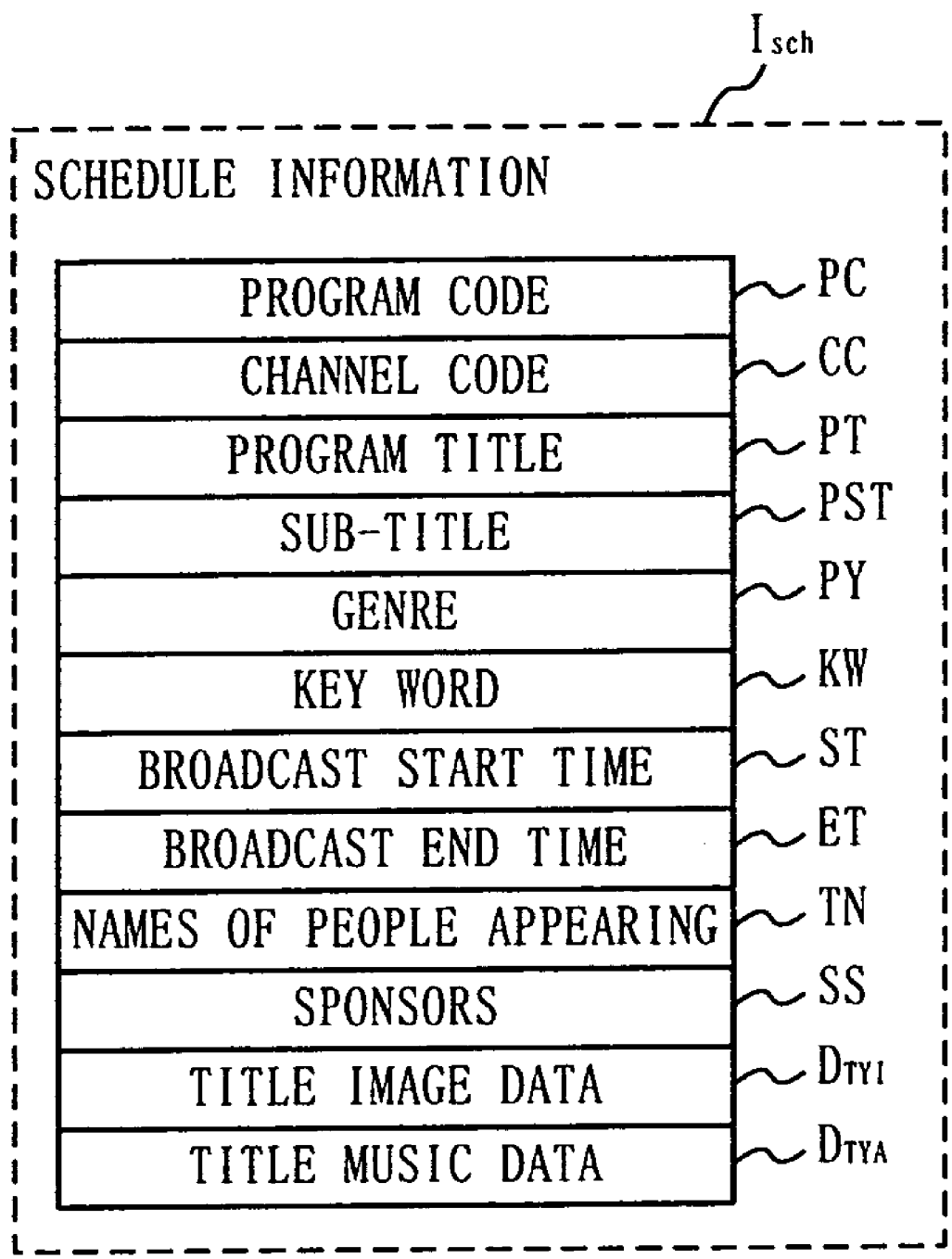
FIG. 45 is a schematic diagram illustrating title image data $D_{TYI}$ and title music data $D_{TYA}$ which can be added to the personal program table UPG by a transmission apparatus 102 in FIG. 36.

In the above description, the personal program table UPG is constructed of text information. However, the present invention is not limited thereto. Any image or music which identifies programs P may be added. For example, as shown in FIG. 45, title image data $D_{TYI}$ of a logo or a representative still image for each program P, or title music data $D_{TYA}$ representing a portion of a theme song that is played in each program P may be added to the schedule information $I_{sch}$ which is transmitted from the broadcast station 103 to the transmission apparatus 102. According to the earlier-described procedure, the transmission apparatus 102 adds the aforementioned title image data $D_{TYI}$ and/or title music data $D_{TYA}$ to the personal program table UPG which is generated for the user, and transmits it to the reception apparatus 101. The reception apparatus 101 displays the personal program table UPG, and after reproducing, by means of the system control section 1004, the title image data $D_{TYI}$ which is assigned to the program P that has been designated by the user on the personal program table UPG, synthesizes it with the personal program table UPG by means of the display synthesis section 1009, and outputs the synthesized image from the display section 1010, as exemplified in FIG. 46. Furthermore, in the reception apparatus 101, the system control section 1004 sends the title music data $D_{TYA}$ to the audio reproduction section 1005, the audio reproduction section 1005 reproduces an audio signal from the title music data $D_{TYA}$, and the loudspeaker 1006 outputs audio in accordance with the reproduced audio signal, as exemplified in FIG. 46. By displaying and/or outputting the title image data $D_{TYI}$ and/or title music data $D_{TYA}$ as such, an easier-to-use personal program table UPG can be provided.

Figures 46, 47:
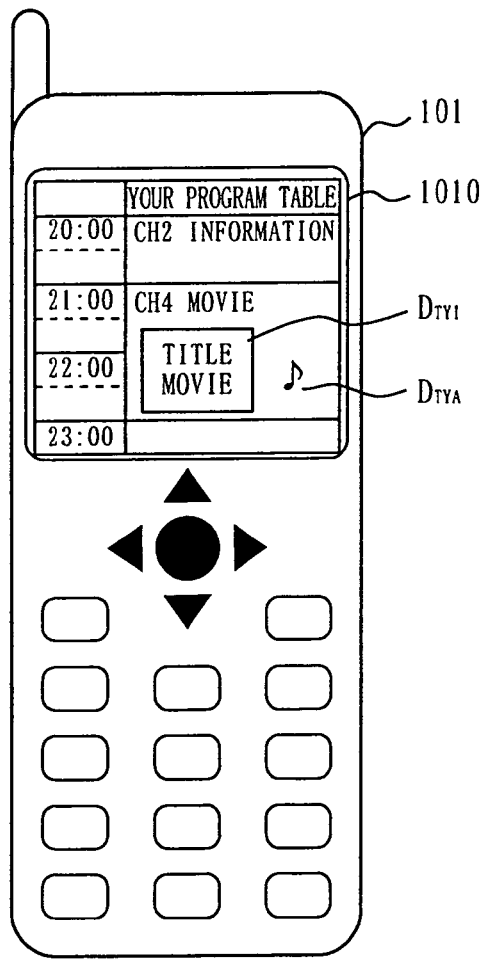
FIG. 46 is a schematic diagram illustrating an exemplary displayed image of title image data $D_{TYI}$ and title music data $D_{TYA}$ in FIG. 45 on a reception apparatus 101.
FIG. 47 is a schematic diagram illustrating the structure of preprogrammed program information $I_{RP}$ which is generated by a reception apparatus 101 in FIG. 43.

When the user views a program P that is preprogrammed by referring to the personal program table UPG, the user operates the keys of the key input section 1014 to select a program P which is the subject of preprogrammed viewing. Through such an operation, preprogrammed program information $I_{RP}$ as shown in FIG. 47, which is composed of a preprogramming type RT identifying preprogramming of a viewing or preprogramming of a recording, a program code PC, a channel code CC, a program title PT, a broadcast start time ST, and a broadcast end time ET, is generated and memorized in a memory 1012; and an operation start time AST, which is obtained by subtracting a predetermined preparation time from a broadcast start time ST, is set in a clock 1015. Herein, the preparation time is a wait time for the reception apparatus 101, which is in a standby state, to become capable of receiving a program by turning ON those components which are necessary for program reception, e.g., the tuner 1002 and the video reproduction section 1007.

When the time for preprogrammed viewing is reached, an interrupt signal is generated from the clock 1015, the preprogrammed program information $I_{RP}$ in the memory 1012 is read, a source voltage is fed to the respective components which are necessary for program reception, and the receiving channel of the tuner 1002 is set to the channel code CC which is described in the preprogrammed program information $I_{RP}$. As a result, the reception apparatus 101 becomes capable of receiving programs. Thereafter, if the preprogramming type RT described in the preprogrammed program information $I_{RP}$ is preprogramming of a viewing, the reception apparatus 101 generates an alarm sound indicating that the viewing time has been reached, thereby prompting the user to view the program. Because of this alarm sound, the user operates a viewing button of the key input section 1014, to which a viewing commencing function is assigned. As a result, the display section 1010 becomes capable of displaying, so that the user is able to view the program P which has been preprogrammed for viewing. Also, in the case of preprogramming of a recording, through a similar procedure to that in the case of the preprogramming of a viewing, a program P which has been preprogrammed for recording by the user is recorded in the reception apparatus 101.

In the above-described third embodiment, the reception apparatus 101 controls preprogrammed viewing or preprogrammed recording with the preprogrammed program information $I_{RP}$ being memorized in the memory 1012; however, the present invention is not limited thereto. It is possible to control the preprogrammed viewing or preprogrammed recording in the reception apparatus 101 from the transmission apparatus 102. For example, when the user has performed an operation which is necessary for preprogrammed viewing or preprogrammed recording, a program code PC identifying the designated program P and a preprogramming type RT are transmitted to the transmission apparatus 102, and the transmission apparatus 102 stores the received program code PC and the preprogramming type RT in the personal information DB. As a result, the transmission apparatus 102 can recognize a broadcast start time ST of the program P which has been has been subjected to preprogrammed viewing or preprogrammed recording. The transmission apparatus 102 transmits, to the reception apparatus 101, the channel code CC, the broadcast start time ST and the broadcast end time ET as preprogrammed program information $I_{RP}$, immediately before a time which is obtained by subtracting the preparation time in the reception apparatus 101 from the broadcast start time ST. In accordance with the received preprogrammed program information $I_{RP}$, the reception apparatus 101 performs a process necessary for the viewing or recording of the relevant program P, through an operation similar to the above.

Although the transmission apparatus 102 in the third embodiment generates a personal program table UPG based on a user's favorite genres (categories) PT, the present invention is not limited thereto. As described in the prior art section, a personal program table UPG may be generated based on a frequency with which a broadcast program P has been subjected to preprogrammed viewing or preprogrammed recording.

Although the title image data $D_{TYT}$ and/or title music data $D_{TYA}$ are displayed and/or outputted in the above-described third embodiment, the present invention is not limited thereto. These may be replaced by program advertisement data representing an advertisement for a program P. Although such title image data $D_{TYT}$, title music data $D_{TYA}$, and program advertisement data may be added to the aforementioned personal program table UPG, the present invention is not limited thereto. Data representing the existence of title image data $D_{TYT}$, title music data $D_{TYA}$, and program advertisement data may be added to the personal program table UPG; whereas the title image data $D_{TYT}$, the title music data $D_{TYA}$, and the program advertisement data may be stored in the transmission apparatus 102, and the reception apparatus 101 and the transmission apparatus 102 may be constructed so that, upon referring to the personal program table UPG, if necessary, the user downloads the title image data $D_{TYT}$, the title music data $D_{TYA}$, and the program advertisement data from the transmission apparatus 102.

Fourth Embodiment

Next, an outline of a data communication system according to the fourth embodiment of the present invention will be described. Since the outline of the structure and process of the data communication system according to the fourth embodiment are similar to those according to the third embodiment (see FIG. 31 and FIG. 32), the descriptions thereof are omitted. However, the transmission apparatus 102 of the fourth embodiment differs in that a personal program table UPG which is different from that of the third embodiment is generated at step S105. Specifically, in the third embodiment, a personal program table UPG is generated based on a user's favorite genres (categories) PT, but the transmission apparatus 102 may not be able to find a program P matching any favorite genre PT. In such a case, the corresponding time zone TP on the personal program table UPG will be empty. In order to address this problem, according to the fourth embodiment, a program RP recommended by the broadcast station 103 is incorporated into an empty time zone TP on the personal program table UPG for transmission to the reception apparatus 101 of the user.

Figure 48:
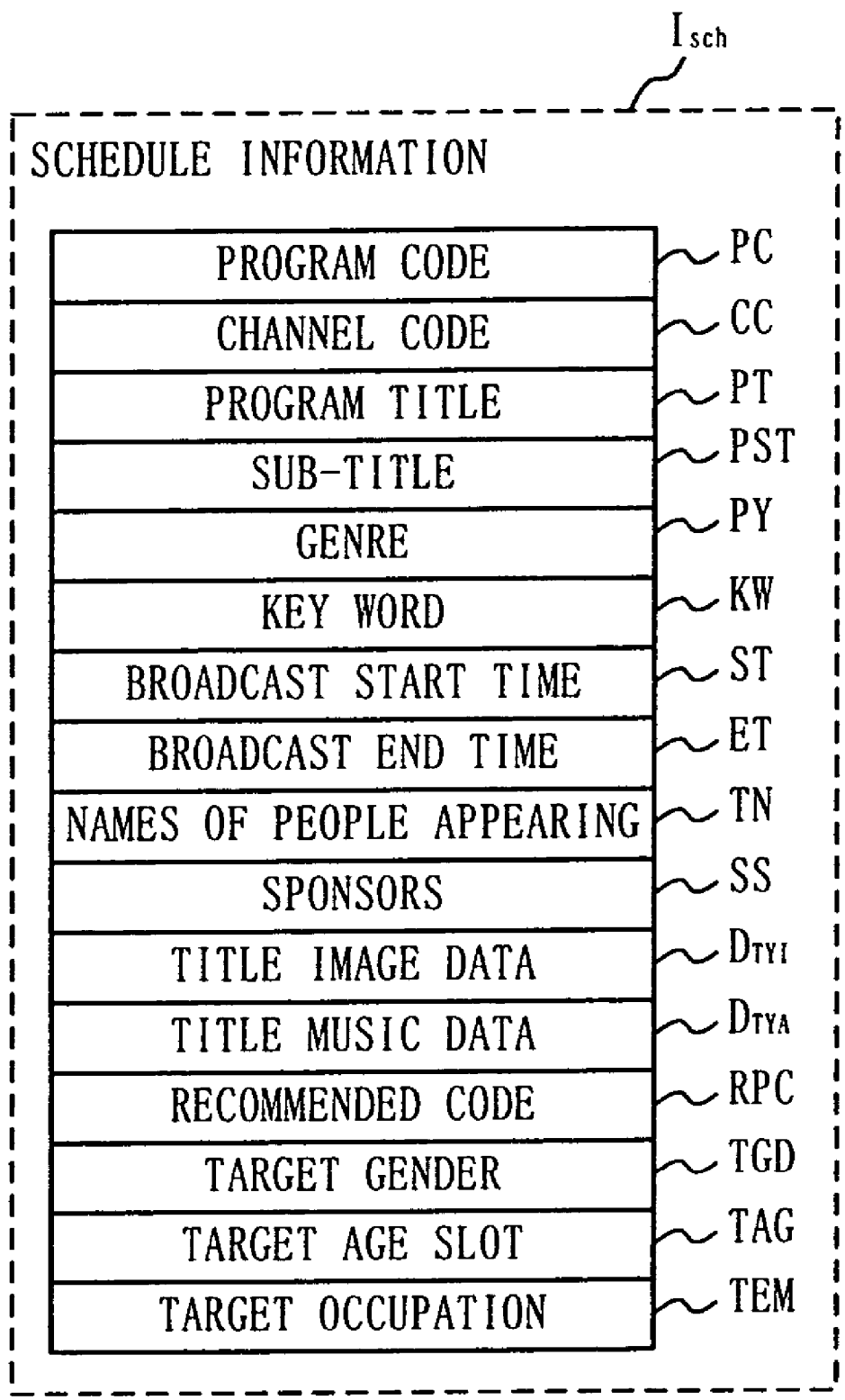
FIG. 48 is a schematic diagram illustrating an exemplary structure of schedule information $I_{sch}$, including a recommended program RP, transmitted from a broadcast station 103 in FIG. 31.
Figure 49:
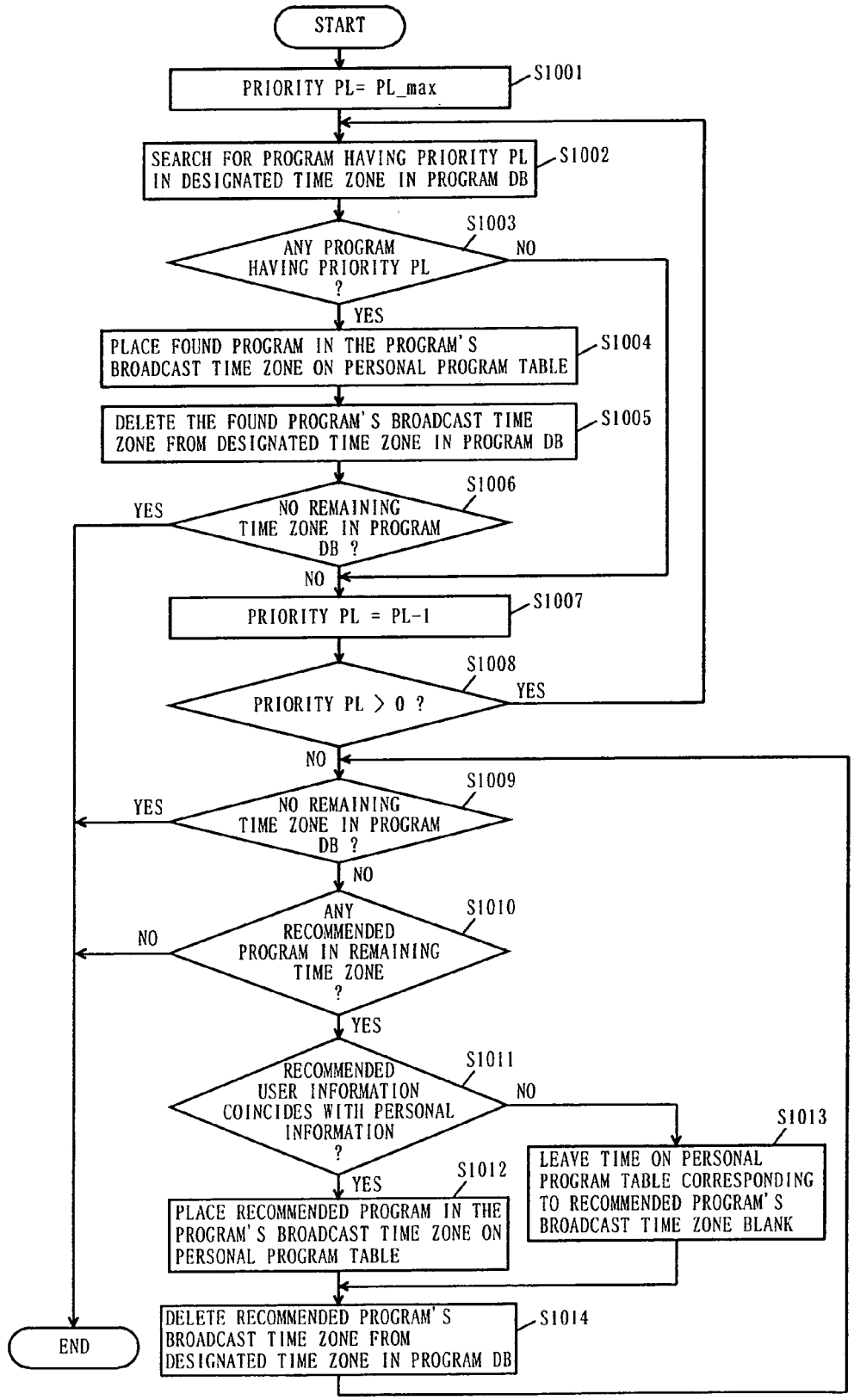
FIG. 49 is a flowchart illustrating a processing procedure of a program selection section 2008 according to a fourth embodiment of the present invention.

Hereinafter, referring to FIG. 48 to FIG. 50, a method for incorporating a recommended program RP in a program selection section 2008 of the transmission apparatus 102 will be described. FIG. 48 is a schematic diagram illustrating an exemplary structure of schedule information $I_{sch}$, including a recommended program RP, transmitted from the broadcast station 103. FIG. 49 is a flowchart illustrating a processing procedure of a program selection section 2008 according to the fourth embodiment. FIG. 50 is a schematic diagram illustrating an exemplary personal program table UPG which is generated by the program selection section 2008.

In FIG. 48, the schedule information $I_{sch}$ further contains, in addition to the information shown in FIG. 35, a recommended program code RPC for identifying the recommended program RP, as well as a target gender TGD, a target age slot TAG, and a target occupation TEM indicating a class of users to which it is recommended.

FIG. 49 differs from FIG. 32 in that steps S1009 to S1014 are further comprised. Since there are no other differences between these two flowcharts, identical step numbers are given to any steps in FIG. 49 that correspond to those in FIG. 32, and the descriptions thereof are omitted.

Next to step S1008, the program selection section 2008 determines whether or not the remaining time in a designated time zone m is "0" (step S1009). For example, if the program DB is as shown in (a) of FIG. 50, in the process down to step S1008, the program selection section 2008 is unable to select a program P to place in a time zone from 20:00 to 21:00 in the designated time zone m, as shown in (b) of FIG. 50.

If it is determined that there is remaining time in the designated time zone m, the program selection section 2008 determines whether or not a recommended program RP exists in the designated time zone m by referring to the recommended program codes RPC in the program DB (step S1010). If no recommended program RP exists in the designated time zone m, the process of FIG. 49 is completed.

Now, it is assumed that the program DB is as shown in (c) of FIG. 50, and that a drama γ on the broadcast channel $CH_1$ is a recommended program RP. Under this assumption, it is determined at step S1010 that a recommended program RP exists, and the program selection section 2008 determines from the program DB whether the target gender TGD, the target age slot TAG, and the target occupation TEM match the user's gender GD, age AG, and EM as stored in the personal information DB (step S1011).

If step S1011 determines non-matching, the program selection section 2008 leaves the designated time zone m empty (step S1013). On the other hand, if matching is determined, as shown in (d) of FIG. 50, the program selection section 2008 places the title PT (the drama γ) and the broadcast channel $CH_1$ of the recommended program RP in a one-hour slot from 20:00 on the personal program table UPG (step S1012).

Next, the program selection section 2008 excludes the broadcast time zone TP of the recommended program RP which is found at step S1010 from the searched range, thus updating the designated time zone m (step S1014). The program selection section 2008 repeatedly performs steps S1009 to S1014 until the designated time zone m becomes "0" at step S1009. As a result, as shown in (d) of FIG. 50, a personal program table UPG is generated, with the recommended program RP being placed in the empty time zone TP. Such a process of FIG. 49 may also be applied to step S44 in the second embodiment.

As described above, by describing a program RP which is recommended by the broadcast station 103 in the personal program table UPG, the transmission apparatus 102 (i.e., a program information servicing company) can allure the user to the program RP which is recommended by the broadcast station 103, possibly contributing to an improved rating thereof. As a result, the program information servicing company can direct its business in such a manner as to bill the broadcast station 103. Moreover, the recommended program RP may not be in line with the preferences of the user, contrary to the purpose of the personal program table UPG. Therefore, it is preferable that the transmission apparatus 102 transmits a title PT and a broadcast channel CH of a recommended program RP along with information (e.g., a color or identification mark) which enables distinction over the others on the personal program table UPG.

Fifth Embodiment

Next, an outline of a data communication system according to a fifth embodiment of the present invention will be described. Since the outline of the structure and process of the data communication system according to the fifth embodiment are similar to those according to the third embodiment (see FIG. 31 and FIG. 32), the descriptions thereof are omitted. However, the transmission apparatus 102 of the fifth embodiment differs in that a personal program table UPG, which is different from that of the third embodiment, is generated at step S105. Specifically, in a personal program table UPG according to the third embodiment, a program P which is expected to be the one which a user desires to view the most is placed in each time zone TP. Such a personal program table UPG has a problem in that the user cannot refer to other programs P. In order to address this, in the fifth embodiment, a transmission apparatus 102 is realized which can provide a personal program table UPG such that a plurality of programs P are placed in one time zone TP of the personal program table UPG.

Figure 51:
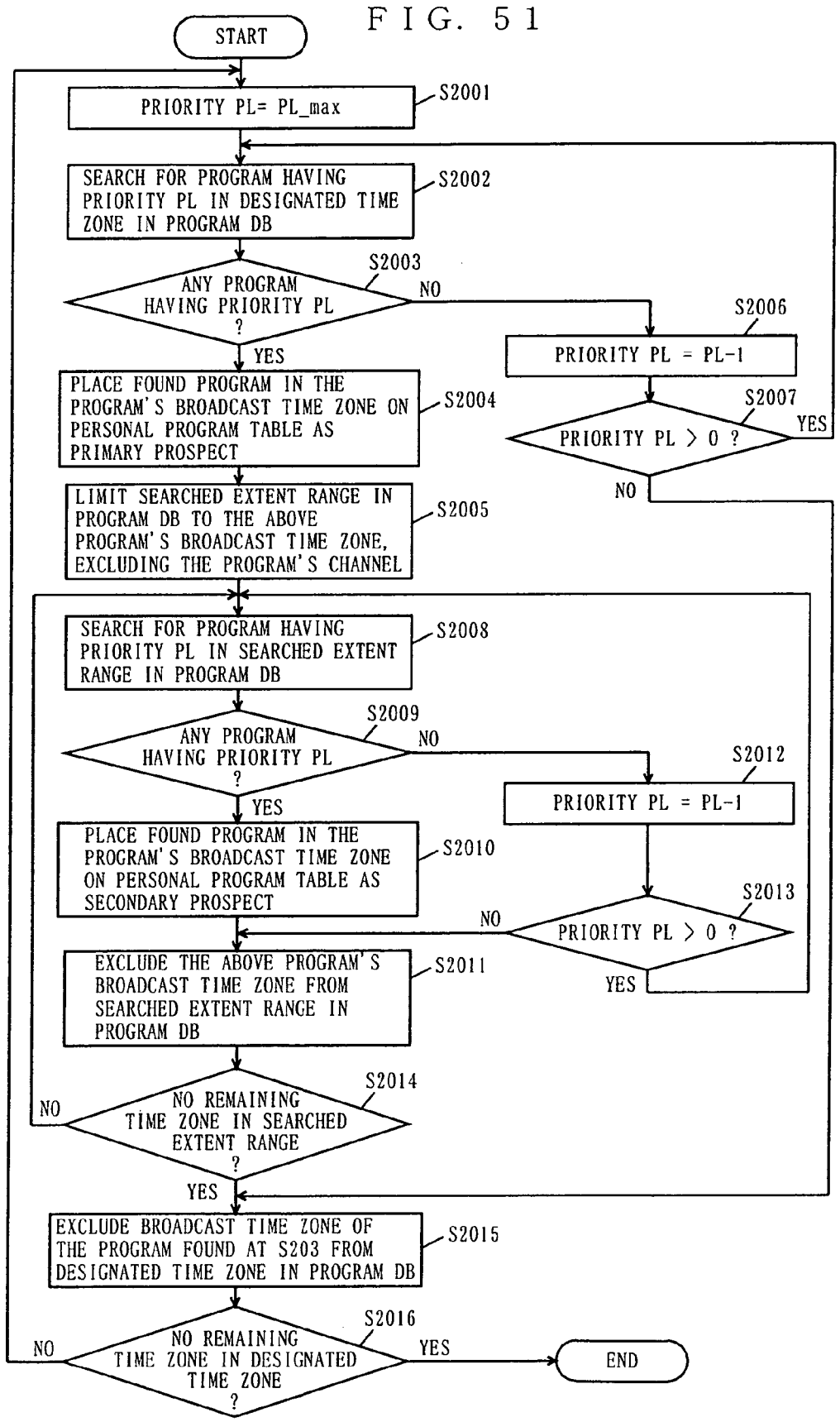
FIG. 51 is a flowchart illustrating a processing procedure of a program selection section 2008 according to a fifth embodiment of the present invention.

Hereinafter, referring to FIG. 51 to FIG. 53, a method for incorporating a plurality of programs P by a program selection section 2008 of the transmission apparatus 102 will be described. FIG. 51 is a flowchart illustrating a processing procedure of the program selection section 2008. FIG. 52 is a schematic diagram illustrating a searched extent in a program DB during a process of FIG. 51. FIG. 53 is a schematic diagram illustrating an exemplary personal program table UPG which is generated by the process of FIG. 51.

The program selection section 2008 sets the program viewing priority PL to a maximum value $PL_{max}$ (e.g., 5)(FIG. 51; step S2001). The program selection section 2008 reads, from the personal information DB, a genre (category) PY which is assigned with a priority that matches the maximum value $PL_{max}$ thus set. Hereinafter, the genre PY which is read here will be referred to as the "relevant genre PY". Next, the program selection section 2008 searches the program DB for a program P which is a primary prospect of a relevant genre PY in a designated time zone m (see the third embodiment), which is determined by itself (step S2002).

Next, if a primary prospective program P has been found at step S2002 (step S2003), the program selection section 2008 places a title PT and a broadcast channel CH of the found program P in a primary prospect slot, at a broadcast time zone TP, on the personal program table UPG (step S2004). For example, in the personal information DB exemplified in (a) of FIG. 52, a genre PY whose program priority PL is "5" is "movies". In this case, the program selection section 2008 searches for "movies" in the designated time zone m(=18:00 to 23:00) in the program DB. Then, since the movie α is going to be broadcast on the broadcast channel $CH_4$ during the two hours from 21:00, the found title PT (the movie α) and the broadcast channel $CH_4$ are placed in the two-hour slot from 21:00 on the personal program table UPG, as shown in (b) of FIG. 53.

If no program P was found at step S2002, the program selection section 2008 decrements the program viewing priority PL by one (step S2006). If the resultant program viewing priority PL is such that PL>0 (step S2007), step S2002 is again performed. If it is not that PL>0, step S2015 (described below) will be performed.

Next to step S2004, the program selection section 2008 sets a searched extent, which is the broadcast time zone TP of the program P found at step S2002 excluding the broadcast channel CH of the found program P (step S2005). For example, if the movie α from 21:00 to 23:00 is selected, as shown in (a) of FIG. 52, a searched extent (within the dotted line) which is the time zone from 21:00 to 23:00 in the program DB excluding the broadcast channel $CH_4$ will be set.

Next, from the personal information DB, the program selection section 2008 reads a genre PY which is assigned with a priority matching the current program viewing priority PL. Hereinafter, the genre PY matching the program viewing priority PL will be referred to as the "relevant genre PY". Next, within the searched extent set at step S2005, the program selection section 2008 searches the program DB for a program P of the relevant genre PY (step S2008).

If a program P of the relevant genre PY is found at step S2008 (step S2009), it is regarded as a secondary prospective program P, and the title PT and the broadcast channel CH of the found program P are placed in the secondary prospect slot on the personal program table UPG (step S2010).

The secondary prospective program P which is found at the first run of step S2009 has a program viewing priority PL matching that of the aforementioned primary prospective program P. However, in the example of (a) of FIG. 52, any program P having the current program viewing priority PL(=5), i.e., a program P of the relevant genre PY, cannot be found in the searched extent which is currently set. If a program P of the relevant genre PY cannot be found at step S2009 like this, the program selection section 2008 decrements the program viewing priority PL by one (step S2012). If the resultant program viewing priority PL is such that PL>0 (step S2013), step S2008 is again performed. Therefore, at step S2008, the program selection section 2008 searches the current searched extent for a program P of the relevant genre PY which corresponds to the current program viewing priority PL, or the program selection section 2008 repeats the series of processes of steps S2008, S2009, S2012, and S2013 until the program viewing priority PL reaches "0".

If it is not that PL>0 at step S2013, the program selection section 2008 performs step S2011.

If a secondary prospective program P is found through the above process, the program selection section 2008 places the title PT and the broadcast channel CH of the found program P in a secondary prospect slot, at a broadcast time zone TP, on the personal program table UPG (step S2010). Next, the program selection section 2008 excludes the broadcast time zone TP of the program P which is found at step S2009 from the searched range, thus updating the searched extent (step S2011). For example, if the movie α from 21:00 to 23:00 is selected, as shown in (a) of FIG. 53, the searched extent is updated to 21:30 to 23:00, thereby excluding the 30-minute slot (within the dotted line) from 21:00 to 21:30 in the program DB.

Next, the program selection section 2008 determines whether or not the remaining time in the searched extent is "0" (step S2014), and if it is not "0", returns to step S2008 to repeat the process from step S2008 to S2014 so as to search the current searched extent for a program P corresponding to the current program viewing priority PL.

Figure 54:
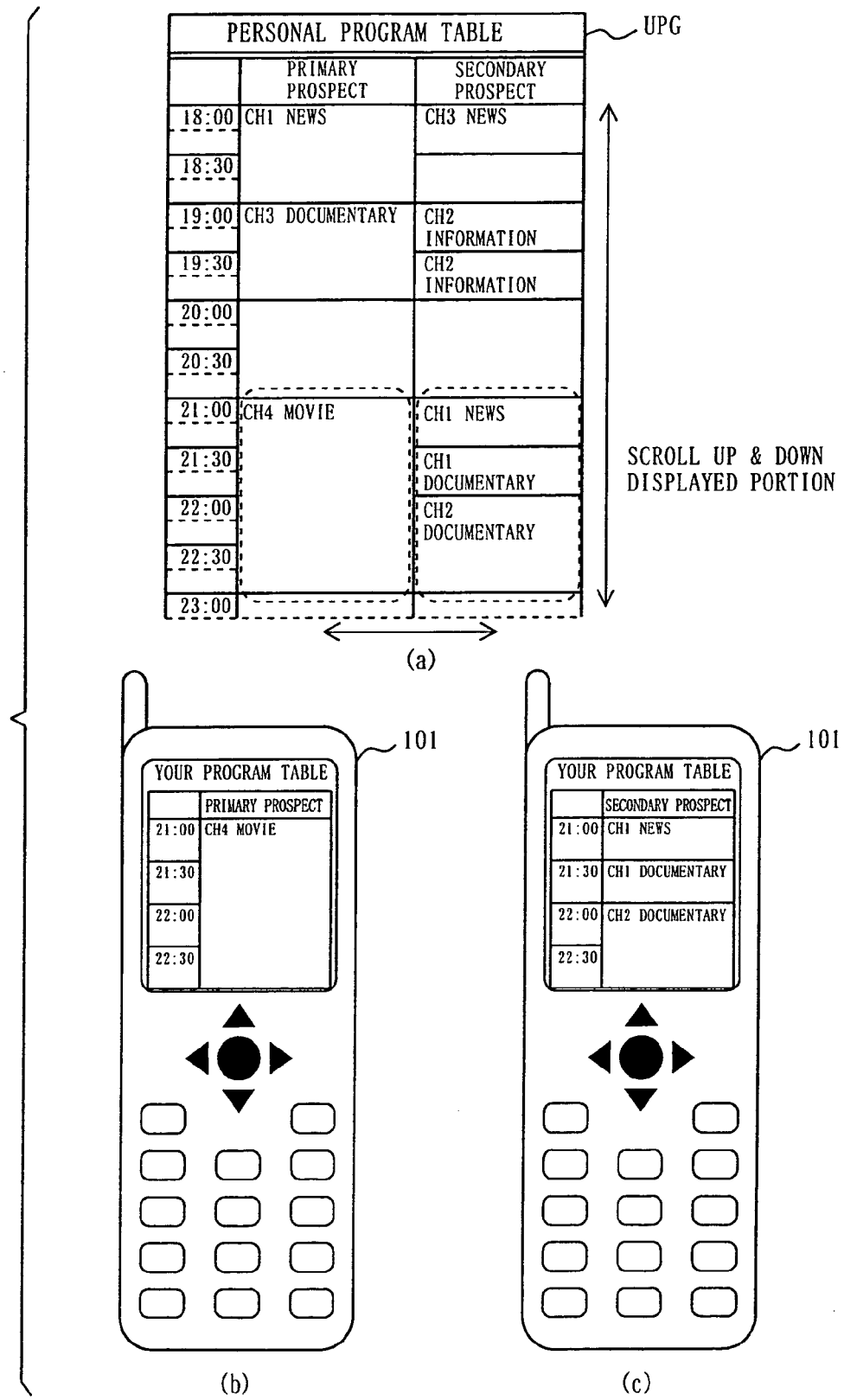
FIG. 54 is a schematic diagram illustrating an exemplary displayed image of a personal program table UPG on a reception apparatus 101 according to the fifth embodiment.

If step S2014 finds that the remaining time is "0", the program selection section 2008 excludes the broadcast time zone TP of the program P which is found at step S2003 from the searched range, thus updating the designated time zone m (step S2015). Next, the program selection section 2008 determines whether or not the remaining time in the designated time zone m is "0" (step S2016), and if the remaining time is not "0", returns to step S2001 to search the updated designated time zone m for primary prospective and secondary prospective programs P and place them in the personal program table UPG. If step S2016 finds that the remaining time is "0", it is determined that a personal program table UPG as shown in (a) of FIG. 54 has been completed, and the process of FIG. 51 is completed. The above process of FIG. 51 may also be applied to step S44 in the second embodiment.

As described above, the reception apparatus 101 receives m hours of personal program table UPG, including the current time, in which primary prospective and secondary prospective programs P are placed. Within the received personal program table UPG, the reception apparatus 101 switches the n hours which the reception apparatus 101 is capable of displaying (n<m, e.g., 1)×the primary prospective program P from the video of the program P by means of the display synthesis section 1009, and displays it on the display section 1010 as shown in (b) of FIG. 54. If the user wishes to display any time beyond the currently-displayed time zone, the user operates the scroll keys of the key input section 1014 to cause the relevant portion to be displayed on the display section 1010, as described earlier. When wishing to view the secondary prospect, the user operates a right key of the key input section 1014. As a result, as shown in (c) of FIG. 54, the display section 1010 displays the secondary prospect.

Sixth Embodiment

Figure 55:
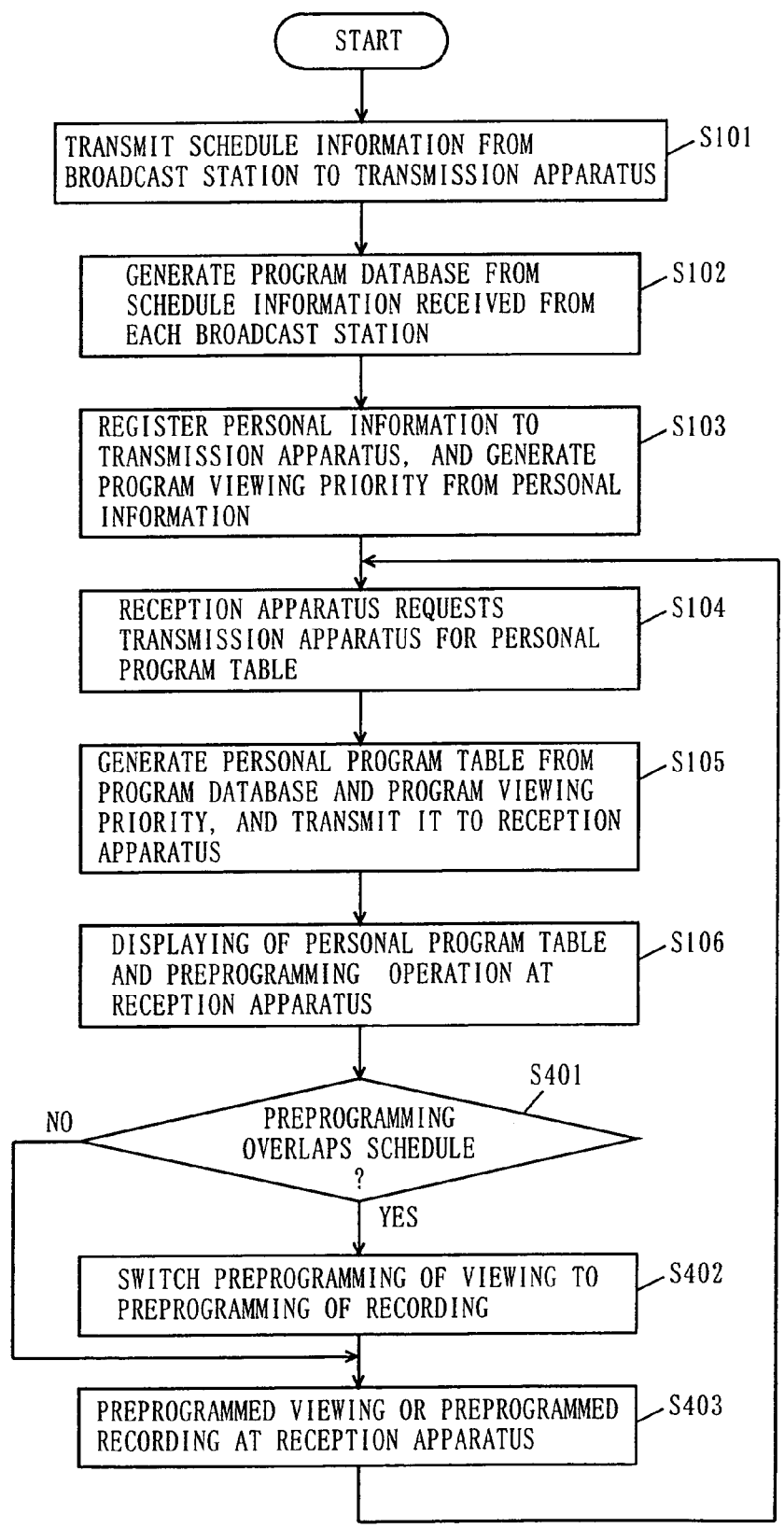
FIG. 55 is a flowchart illustrating an outline of a process which is performed by a data communication system according to a sixth embodiment of the present invention.

Next, an outline of a data communication system according to a sixth embodiment of the present invention will be described. Since the structure of the data communication system according to the sixth embodiment is similar to that according to the third embodiment (see FIG. 31), the descriptions thereof are omitted. FIG. 55 is a flowchart illustrating an outline of a process which is performed by the data communication system of the sixth embodiment. FIG. 55 differs from FIG. 32 in that steps S401 to S403 are further comprised. Since there are no other differences between these two flowcharts, identical step numbers are given to any steps in FIG. 55 that correspond to those in FIG. 32, and the descriptions thereof are omitted.

Figure 56:
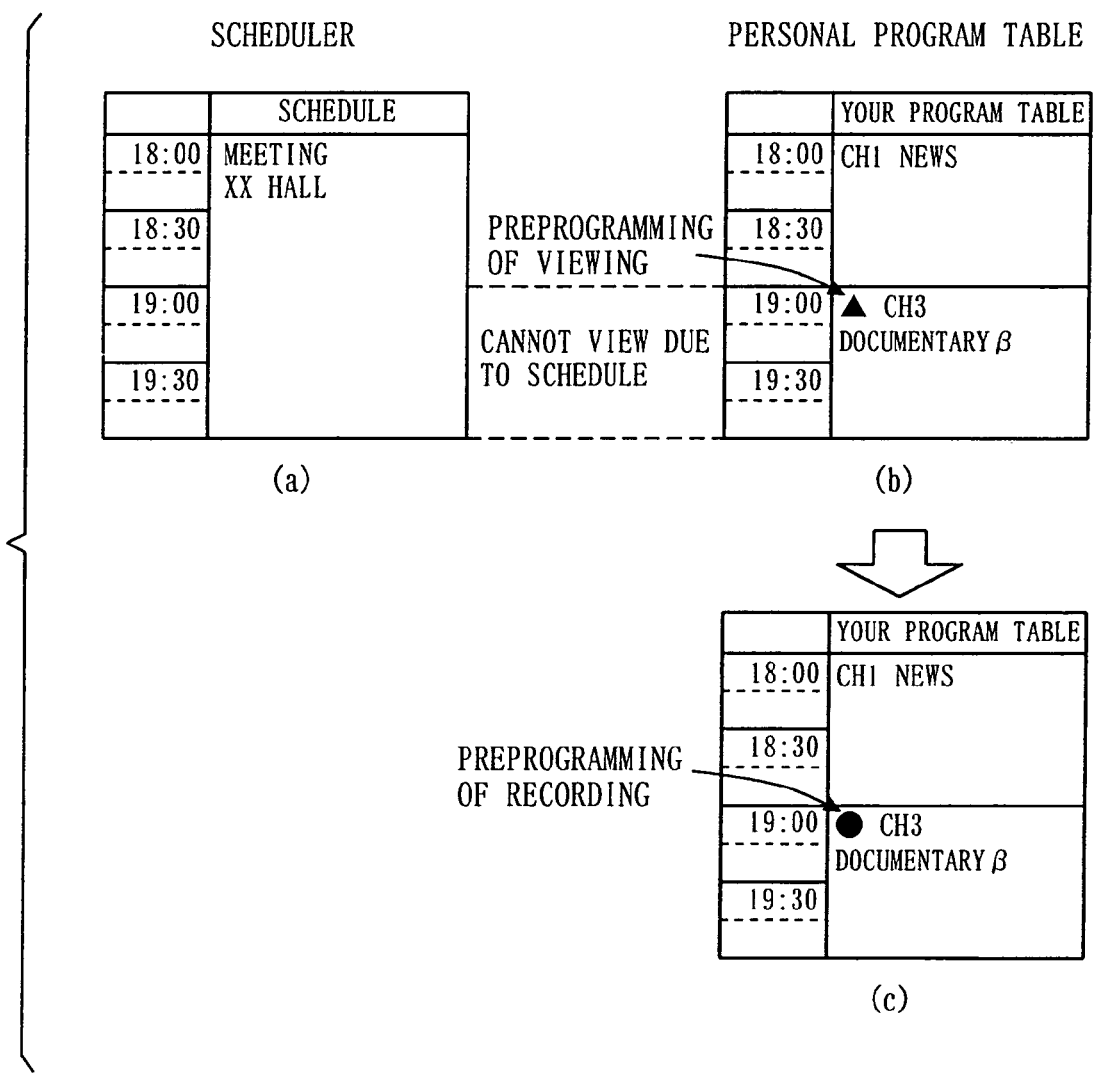
FIG. 56 is a schematic diagram illustrating an outline of a process which is performed by a reception apparatus 101 according to the sixth embodiment.

After step S106, the system control section 1004 determines whether or not the broadcast time zone TP of a program P which has been preprogrammed for viewing at step S106 overlaps a schedule (see (a) in FIG. 56) of the user which is memorized in the memory 1012 by a scheduler comprised in the reception apparatus 101 (step S401). If there is no overlap, the preprogramming of a viewing at step S106 is determined to be valid, and step S107 as described above is performed.

On the other hand, if the broadcast time zone TP overlaps the schedule, the user cannot view the program P which has been preprogrammed for viewing, and therefore, the system control section 1004 changes the preprogramming type RT in the preprogrammed program information $I_{RP}$ from preprogramming of a viewing to preprogrammed recording (step S402). For example, although a documentary program δ which is going to be broadcast from 19:00 is preprogramming of a viewing in (b) of FIG. 56, this broadcast time zone TP overlaps the schedule shown in (a) of FIG. 56. Therefore, as shown in (c) of FIG. 56, the documentary program δ is changed to be a subject of preprogrammed for viewing. The system control section 1004 records the program P which has thus been changed to be preprogrammed for recording in accordance with the updated preprogrammed program information $I_{RP}$ (step S403). Thus, since the reception apparatus 101 automatically changes from preprogramming of a viewing to preprogramming of a recording, the user will not miss the program P which has been preprogrammed for viewing due to his/her own schedule, and can view it later.

The above-described sixth embodiment may be arranged so that, if a user's schedule has been inputted when a preprogramming of a viewing is made, the system control section 1004 warns the user of such.

While the present invention has been described in detail, the foregoing description is in all aspects illustrative and not restrictive. It is to be understood that numerous other modifications and variations can be devised without departing from the scope of the present invention.

What is claimed is:

1. A transmission apparatus operable to communicate with a reception apparatus which is constructed to be operable to receive a program within a broadcast area, the transmission apparatus comprising:
   a reception section operable to receive position information indicating a current position of the reception apparatus;
   a program DB storage section operable to store a broadcast program database at least containing a broadcast channel, a broadcast time zone and a program title for a predetermined broadcast area;
   a generation section operable to, based on the position information and the broadcast program database, select one program for each time zone and generate a personal program table, by using the selected program, which is created based on personal data of a user of the reception apparatus, and
   a transmission section operable to transmit the personal program table to the reception apparatus.

2. The transmission apparatus according to claim 1, further comprising a personal information DB storage section operable to store a personal information database containing user information of the reception apparatus,
   wherein said generation section, based on the position information, the broadcast program database and the user information, is operable to select one program for each time zone, and generate the personal program table by using the selected program.

3. The transmission apparatus according to claim 2, wherein:
   said personal information DB storage section is further operable to store priority information; and
   said generation section, in accordance with the priority information, is operable to select another program for each time zone, and generate the personal program table by using each selected program.

4. The transmission apparatus according to claim 3, wherein the priority information is assigned with respect to a category of each broadcast program.

5. The transmission apparatus according to claim 1, further comprising a first determination section operable to determine , based on the position information, whether or not the reception apparatus has moved from a broadcast area to another broadcast area,
   wherein said generation section is operable to generate the personal program table when said first determination section determines that the reception apparatus has moved between the broadcast areas.

6. The transmission apparatus according to claim 1, further comprising a first determination section operable to determine , based on the position information, whether or not the reception apparatus has moved from a broadcast area to another broadcast area, wherein:
   said reception section is further operable to receive a broadcast channel and a program code which are preprogrammed program information identifying a program which has been preprogrammed for viewing or preprogrammed for recording and being generated at the reception apparatus;

said generation section is operable to generate, when said first determination section determines that the reception apparatus has moved between broadcast areas, notice data indicating that it is necessary to correct the preprogrammed program information based on the position information and the broadcast program database; and said transmission section is operable to transmit the notice data to the reception apparatus.

7. The transmission apparatus according to claim 6, wherein the notice data further contains a broadcast channel of the program which is the target of the preprogramming for viewing or preprogramming for recording in the other broadcast area.

8. The transmission apparatus according to claim 7, wherein the notice data further contains a broadcast start time and a broadcast end time of the program which is the target of the preprogramming for viewing or preprogramming for recording in the other broadcast area.

9. The transmission apparatus according to claim 1, wherein:

said reception section is further operable to receive a broadcast channel and a program code which are preprogrammed program information identifying a program which has been preprogrammed for viewing or preprogrammed for recording and being generated at the reception apparatus;

said transmission apparatus further comprises:

a first determination section operable to determine, based on the position information, whether or not the reception apparatus has moved from a broadcast area to another broadcast area, and a second determination section operable to, if said first determination section determines that the reception apparatus has moved between the broadcast areas, determine whether or not the program which is identified by the program code is broadcast in the other broadcast area; and said generation section is operable to generate, if said second determination section determines that the same program identified by the program code is not broadcast in the other broadcast area, notice data containing a broadcast start time and a broadcast end time of a substitute program to replace the program which is the target of the preprogramming for viewing or reprogramming for recording.

10. The transmission apparatus according to claim 1, wherein:

said reception section is further operable to receive a broadcast channel and a program code which are preprogrammed program information identifying a program which has been preprogrammed for viewing or preprogrammed for recording and being generated at the reception apparatus, said transmission apparatus further comprises:

a first determination section operable to determine, based on the position information, whether or not the reception apparatus has moved from a broadcast area to another broadcast area, and a second determination section operable to, if said first determination section determines that the reception apparatus has moved between the broadcast areas, determine whether or not the program which is identified by the program code is broadcast in the other broadcast area, and said generation section is operable to generate, if said second determination section determines that the same program identified by the program code is not broadcast in the other area, a command containing a broadcast channel, a program code, a broadcast start time, and a broadcast end time of the program which is the target of the preprogramming for viewing or preprogramming for recording; and said transmission section is operable to transmit the command to an external stationary type video recording apparatus.

11. A transmission method for transmitting data to a reception apparatus which is constructed to operable to receive a program within a broadcast area, the transmission method comprising:

receiving position information indicating a current position of the reception apparatus;

selecting, based on the position information and a broadcast program database at least containing a broadcast channel, a broadcast time zone, and a program title in a predetermined area, one program for each time zone;

generating a personal program table by using the program selected in said selecting, which is created based on personal data of a user of the reception apparatus and transmitting the personal program table generated in said generating to the reception apparatus.

12. A reception apparatus constructed to operable to receive a broadcast program and communicate with a transmission apparatus which provides information regarding the broadcast program, the reception apparatus comprising:

a user information transmission section operable to receive a input of user information of a user operating the reception apparatus, and transmitting the user information to the transmission apparatus;

a transmission section operable to transmit position information indicating a current position to the transmission apparatus;

a reception section operable to receive a personal program table, which is designated for the user operating the reception apparatus and which is generated based on the transmitted user information and the position information, and which is created based on personal data of the user; and an output section operable to output the personal program table received from said reception section, wherein the received personal program table is set with one program for a time zone.

* * * * *

UNITED STATES PATENT AND TRADEMARK OFFICE
CERTIFICATE OF CORRECTION

| | | |
|---|---|---|
| PATENT NO. | : 7,689,163 B2 | Page 1 of 1 |
| APPLICATION NO. | : 11/319058 | |
| DATED | : March 30, 2010 | |
| INVENTOR(S) | : Hidenori Tatsumi et al. | |

It is certified that error appears in the above-identified patent and that said Letters Patent is hereby corrected as shown below:

In the Claims

In column 42, claim 11, line 23, "constructed to operable to" should read --constructed to be operable to--.

In column 42, claim 12, line 37, "constructed to operable to" should read --constructed to be operable to--.

In column 42, claim 12, line 42, "a input" should read --an input--.

Signed and Sealed this
Fourth Day of January, 2011

David J. Kappos
*Director of the United States Patent and Trademark Office*